US006467850B1

(12) United States Patent
Kawai et al.

(10) Patent No.: US 6,467,850 B1
(45) Date of Patent: Oct. 22, 2002

(54) SEAT BELT ASSEMBLY AND METHOD FOR PRODUCING THE THROUGH ANCHOR

(75) Inventors: Osamu Kawai, Kanagawa (JP); Kazuo Yamamoto, Kanagawa (JP); Katsuyasu Ono, Kanagawa (JP); Masuo Matsuki, Kanagawa (JP); Hiroyuki Saito, Kanagawa (JP); Yuichi Takimizu, Kanagawa (JP); Yukio Suzuki, Kanagawa (JP)

(73) Assignee: NSK Autoliv Co. Ltd., Tokyo (JP)

( * ) Notice: Subject to any disclaimer, the term of this patent is extended or adjusted under 35 U.S.C. 154(b) by 0 days.

(21) Appl. No.: 09/570,603

(22) Filed: May 12, 2000

(30) Foreign Application Priority Data

| May 12, 1999 | (JP) | 11-131499 |
| Sep. 9, 1999 | (JP) | 11-256260 |
| Oct. 4, 1999 | (JP) | 11-283120 |
| Nov. 19, 1999 | (JP) | 11-330067 |
| Mar. 8, 2000 | (JP) | 2000-063821 |

(51) Int. Cl.⁷ .................................................. B60R 21/00
(52) U.S. Cl. ................................. 297/468; 29/458
(58) Field of Search .................. 297/464, 483, 297/463.1, 468; 280/808, 801.1; 24/164; 29/429, 3, 408, 458, 460

(56) References Cited

U.S. PATENT DOCUMENTS

| 4,023,826 | A | * | 5/1977 | Kokubo et al. | |
| 4,582,340 | A | * | 4/1986 | Fohl | |
| 4,618,165 | A | | 10/1986 | Seifert et al. | 280/808 |
| 5,516,148 | A | | 5/1996 | Ohira | 280/808 |
| 6,138,328 | A | * | 10/2000 | Iseki | |

FOREIGN PATENT DOCUMENTS

| DE | 3318849 | 7/1985 | A62B/35/02 |
| DE | 3808459 | 9/1989 | B60R/22/42 |
| EP | 78940 | 5/1983 | B60R/21/10 |
| JP | 57-36209 | 8/1982 | A62B/35/02 |
| JP | 10-95308 | 4/1998 | B60R/22/24 |
| JP | 10-119718 | 5/1998 | B60R/22/24 |

* cited by examiner

Primary Examiner—Milton Nelson, Jr.
(74) Attorney, Agent, or Firm—Sughrue Mion, PLLC

(57) ABSTRACT

In a through anchor (10), a webbing sliding contact surface (15) is formed by bending in a curved fashion a lower edge of an opening (14) formed in a metal insert (11) toward a side. The through anchor (10) is covered over portions of the metal insert (11) other than the webbing sliding contact surface (15) with a coating resin (13). Accordingly, it is possible to provide a seat belt assembly that can continue to provide good sliding contact between a webbing guide and webbing, with simple construction.

16 Claims, 40 Drawing Sheets

SEAT BELT ASSEMBLY AND METHOD FOR PRODUCING THE THROUGH ANCHOR

BACKGROUND OF THE INVENTION

1. Field of the Invention

The present invention relates to a seat belt assembly for restraining the body of an occupant seated in a seat of an automobile or an airplane in the seat at the time of emergency.

In addition, the present invention also relates to a seat belt assembly provided with a through anchor having a webbing sliding contact surface and a method for producing the through anchor.

2. Description of the Related Art

Conventionally, there exists a three-point seat belt assembly using continuous webbing as a seat belt assembly for restraining an occupant of a vehicle in a seat in which he or she is seated.

Referring to FIG. 52, in a seat belt assembly 910, one end of a webbing 911 is wound and stored in a retractor 912 in such a manner as to be freely pulled out thereof. The other end thereof is locked to an anchor plate 914 via a through anchor 915 which functions as a webbing guide. The anchor plate 914 is supported rotatably at a lower portion of a center pillar 913. A through tongue 916 disposed between the anchor plate 914 and the through anchor 915 is engaged with a buckle 918 which is provided so as to erect from a vehicle body in the vicinity of the seat 917. With this engaging, the webbing 911 restraints an occupant (not shown) in a seat 917.

In addition to the through anchor 915 and the through tongue 916, the seat belt assembly 910 also has a through belt(not shown), a webbing guide at an exit of the retractor and the like, which all function as a webbing guide for guiding the webbing 911.

An elongated hole-shaped belt slot (a gap through which the webbing passes) is formed in the respective webbing guides. The webbing 911 is brought into sliding contact with the belt slot when the webbing 911 is allowed to pass therethrough, whereby the belt slot guides the webbing 911.

In order to secure good retractability of the webbing 911 and good operating feeling when the webbing 911 is pulled out, the friction resistance generated where the webbing 911 is in sliding contact with the belt slot should be maintained as low as possible. To cope with this, a coating resin is applied to make the shaped surface of the belt slot smooth, or as described, for instance, in the U.S. Pat. No. 4,582,340, a low friction material is applied to treat the surface of the belt slot.

Of those webbing guides, the through anchor 915 can be constructed, for example, by applying a coating resin to a metal insert through insert molding. The through anchor 915 must bear a load generated when vehicles collide with each other. To make this possible, a mechanical strength, which is sufficient to prevent the deformation thereof when a load is applied thereto, is required for the coating resin. In general, however, a resin material having a high mechanical strength cannot provide good slidableness relative to the webbing 911, whereas a low friction material having a low friction coefficient and providing good slidableness cannot provide the sufficient mechanical strength. Thus, it has been difficult to improve the slidableness relative to the webbing 911 while maintaining the required mechanical strength.

In addition, with the through anchor formed through insert molding of the metal insert with the coating resin, depending on a molding material used, the frictional resistance between the through anchor and the webbing increases while a user repeatedly uses the seat belt assembly in the market place, and therefore the retraction and extension of the webbing gets heavy with time (deterioration with age in sliding contact performance). Extremely speaking, there may be caused a problem that the webbing is not completely retracted into the retractor when the seat belt is not fastened (when the through tongue is disengaged).

To solve these problems, for example, Japanese Utility Model Examined Publication No. Sho. 57-36209 discloses a webbing guide for reducing the sliding resistance between a webbing and therewith.

In other words, this webbing guide is constructed by axially cutting away a pipe formed of a low friction material along one side thereof such that the width of the cut becomes smaller than the outside diameter of a core metal and placing the pipe so cut over the core metal by making use of the resiliency of the pipe. The webbing is hooked and wound around the outer circumference of the pipe placed over the core metal.

With the webbing guide described in the above-mentioned Japanese Utility Model Examined Publication No. Sho. 57-36209, there exists a problem that tremendous manpower and time are required for placing the pipe over the core metal and securing a required accuracy in dimensions of respective structural portions, resulting in increased costs.

In addition, when a large magnitude of force is applied to the pipe when the webbing is brought into sliding contact therewith, the pipe may rotate relative to the core metal and moreover there may be a risk of failure of the pipe.

Moreover, as a through anchor having a webbing sliding contact surface constituted by a metallic surface, there is provided a through anchor formed by pressing a piece of sheet metal so as to form a webbing pass-through hole, a webbing sliding contact surface and a bolt attachment hole therein.

For example, the U.S. Pat. No. 4,618,165 describes a deflecting device 980 (a through anchor 980) formed through a single pressing process as shown in FIG. 53. In the deflecting device 980, a base plate 982 having a bolt attachment hole 981 formed therein is surrounded by a fitting frame 983 and a webbing pass-through hole 984 and a webbing sliding contact surface 985 are formed in a lower portion of the fitting frame 983.

With the conventional through anchor 980 described above, since the webbing sliding contact surface 985 is constituted by the metallic surface, the friction between the webbing and the webbing sliding contact surface can be maintained low, thereby making it possible to obtain good retractability and durability of the webbing.

With the aforesaid through anchor 980, however, there are caused some problems: the pressing process becomes complicated; the cost is increased; and configurations that can be obtained are limited.

In addition, there is caused another problem that at least a part of the external surface of the through anchor 980 needs to be covered with such as a cover constituted by a resin molded article in view of suitability for attachment to the vehicle body, and this also serves to increase the cost.

SUMMARY OF THE INVENTION

Accordingly, a first object thereof is to provide a seat belt assembly providing superior sliding contact between a webbing guide and webbing while having a simple construction.

In addition, a second object of the invention is to provide a seat belt assembly provided with a through anchor and a method for producing the through anchor, the through anchor being free from limitation to configurations that can be obtained while good webbing retractability and durability are obtainable, whereby reduction in cost is aimed at by making the production thereof easy.

The first object of the invention is attained by a seat belt assembly comprising webbing for restraining the body of an occupant in a seat and a webbing guide adapted to be brought into sliding contact with the webbing for guiding the webbing, wherein the webbing guide is constructed by insert molding a metal insert into a coating resin, and wherein the metal insert so molded is exposed at at least a part of a portion of the webbing guide where the webbing guide is brought into sliding contact with the webbing.

According to the above construction of the invention, the webbing restraints the body of an occupant which is guiding while being brought into sliding contact with the webbing guide. The metal insert is exposed at at least a part of the portion of the webbing guide where the webbing guide is brought into sliding contact with the webbing, whereby superior sliding contact between the webbing guide and the webbing can be secured.

Additionally, the first object of the invention is also attained by a seat belt assembly comprising webbing for restraining the body of an occupant in a seat and a webbing guide adapted to be brought into sliding contact with the webbing for guiding the webbing, wherein the webbing guide is constructed by insert molding a metal insert into a coating resin and winding a metal plate around a portion of the webbing guide where the webbing guide is brought into sliding contact with the webbing, and wherein at least a part of the portion of the webbing guide where the webbing guide is brought into sliding contact with the webbing constitutes a metal surface finished with a plated metal or stainless steel.

According to the above construction of the invention, the webbing, restraints the body of an occupant which is guiding while being brought into sliding contact with the webbing guide. At least a part of the portion of the webbing guide where the webbing guide is brought into sliding contact with the webbing constitutes the metal surface finished with the metal which is plated on the surface thereof or stainless steel, and therefore the adhesion of foreign particles is suppressed and deterioration with age in sliding contact with the webbing is reduced, whereby good sliding contact can be maintained.

Here, raised as the above plated metal surface are a metal surface constructed by winding another metal plate which is plated on the surface thereof around the coating resin for sliding contact with the webbing, or a metal surface constructed by exposing a part of the metal insert molded with the coating resin therefrom and plating the exposed portion (or the whole metal insert) for sliding contact with the webbing.

As plating, while any of chrome, nickel, electroless plating, cobalt, tin-cobalt and rigid chrome plating is preferred, any other plating may be used as long as the adhesion of foreign particles is suppressed.

Furthermore, the first object of the invention is also attained by a seat belt assembly comprising webbing for restraining the body of an occupant in a seat and a webbing guide adapted to be brought into sliding contact with the webbing for guiding the webbing, wherein the webbing guide is constructed by insert molding a metal insert with a coating resin and wherein a plated resin cover is fitted over a portion of the coating resin where the webbing is brought into sliding contact so that the surface of the resin cover constitutes a webbing sliding contact surface.

According to the above construction of the invention, the webbing, restraints the body of an occupant in a seat which is guiding while being brought into sliding contact with the webbing guide. The plated resin cover is fitted over the portion of the webbing guide where the webbing guide is brought into sliding contact with the webbing. The surface of the resin cover constitutes the webbing sliding contact surface.

Accordingly, since the adhesion of foreign particles is suppressed by the plating on the resin cover, there is no deterioration with age in sliding contact with the webbing, whereby good sliding contact can be maintained.

Here, raised as a specific material for the resin cover are POM, nylon, ABS or the like, and it is preferable to use a plating grade item when using any of them. Raised as representatives of the plating grade item are Lennie E40 polyamide resin by Mitsubishi Engineering Plastics Co., Ltd. and Toyobo Nylon-6 (T-777-02, T-779) by Toyobo Co., Ltd.

As the type of plating, rigid chrome plating is preferred, but any other type of plating may be used including chrome, nickel, electroless, cobalt and tin-cobalt plating.

Moreover, the second object of the invention is attained by a seat belt assembly provided with a through anchor having a webbing sliding contact surface which is constituted by a metal surface, the through anchor comprising a metal insert having a webbing pass-through opening, a coating resin having a pair of fitting grooves formed in an external surface thereof and adapted to cover the periphery of the webbing pass-through opening in the metal insert and a metal plate inserted in the webbing pass-through opening in the metal insert along a direction in which the webbing is allowed to pass therethrough, adapted to fit to an external surface configuration of the coating resin on the periphery of a lower edge portion of the webbing pass-through opening and fitted in the respective fitting grooves formed in the coating resin at edge portions thereof in the webbing pass-through direction to thereby be secured to the external surface of the coating resin.

In the through anchor according to the invention, the metal plate is inserted in the webbing pass-through opening of the metal insert along the direction in which the webbing is allowed to pass through the opening. The metal plate so inserted is adapted to ft to the external surface of the coating resin on the periphery of the lower edge portion of the webbing pass-through opening. Then the edge portions of the metal plate so adapted in the webbing pass-through direction are fitted respectively in the fitting grooves of the coating resin to thereby be secured to the external surface of the coating resin.

Thus, the webbing sliding contact surface is constituted by the external surface of the metal plate.

In the above construction, it is preferable to construct the respective fitting grooves of the coating resin as a space expanding inwardly and to provide, at the distal ends of the edge portions of the metal plate in the webbing pass-through direction, pawl portions which are each formed into serrations extending along a direction substantially normal to the webbing pass-through direction.

According to this construction, there is no likelihood that the edge portions of the metal plate in the webbing pass-through direction are dislocated from the respective fitting grooves, and in addition, when fitted in the fitting grooves, the pawl portions bite into the coating resin, the pawl portions being each formed into serrations extending along a direction substantially normal to the webbing pass-through direction.

Accordingly, the metal plate is securely fixed to the external surface of the coating resin.

Preferably, the through anchor of the seat belt assembly is produced using a method for producing a through anchor having a webbing sliding contact surface constituted by a metal surface, comprising the steps of coating the periphery of a webbing pass-through opening formed in a metal insert with a coating resin and forming a pair of fitting grooves in an external surface of the coating resin, thereafter inserting a metal plate in the webbing pass-through opening in the metal insert along a direction in which webbing is allowed to pass through the opening and causing the metal plate to fit to the external surface configuration of the coating resin on the periphery of a lower edge portion of the webbing pass-through opening, and fitting the edge portions of the metal plate in the webbing pass-through direction in the respective fitting grooves so that the metal plate is secured to the external surface of the coating resin.

In the method for producing a through anchor according to the invention, first, the periphery of the webbing pass-through opening formed in the metal insert is coated with the coating resin and forming the pair of fitting grooves in the external surface of the coating resin.

Next, the metal plate is inserted into the webbing pass-through opening of the metal insert along the direction in which the webbing is allowed to pass through the opening, and the plate is allowed to fit to the external surface of the coating resin on the periphery of the lower edge portion of the webbing pass-through opening.

Thereafter, the edge portions of the metal plate in the webbing pass-through direction are fitted in the respective fitting grooves of the coating resin to thereby secure the metal plate to the external surface of the coating resin.

In the above through anchor producing method, preferably projections provided on a fixture in such a manner as to project therefrom are allowed to pass through guide holes formed in the edge portions of the metal plate in the webbing pass-through direction. In this state, the respective edge portions of the metal plate are pressed inwardly of the fitting grooves of the coating resin by means of the fixture, whereby the edge portions of the metal plate in the webbing pass-through direction are respectively fitted in the respective fitting grooves of the coating resin while the metal plate is allowed to fit to the external surface of the coating resin on the periphery of the lower edge portion of the webbing pass-through opening.

The reason for this is because the metal plate can be secured to the external surface of the coating resin in a simple fashion while preventing the positional deviation of the metal plate by using the fixture.

DETAILED DESCRIPTION OF THE PREFERRED EMBODIMENTS

The present invention will be described in detail below while referring to embodiments shown in the accompanying drawings. First, referring to FIGS. 1 to 14, first to eleventh embodiments of the invention will be described.

Figure 1:
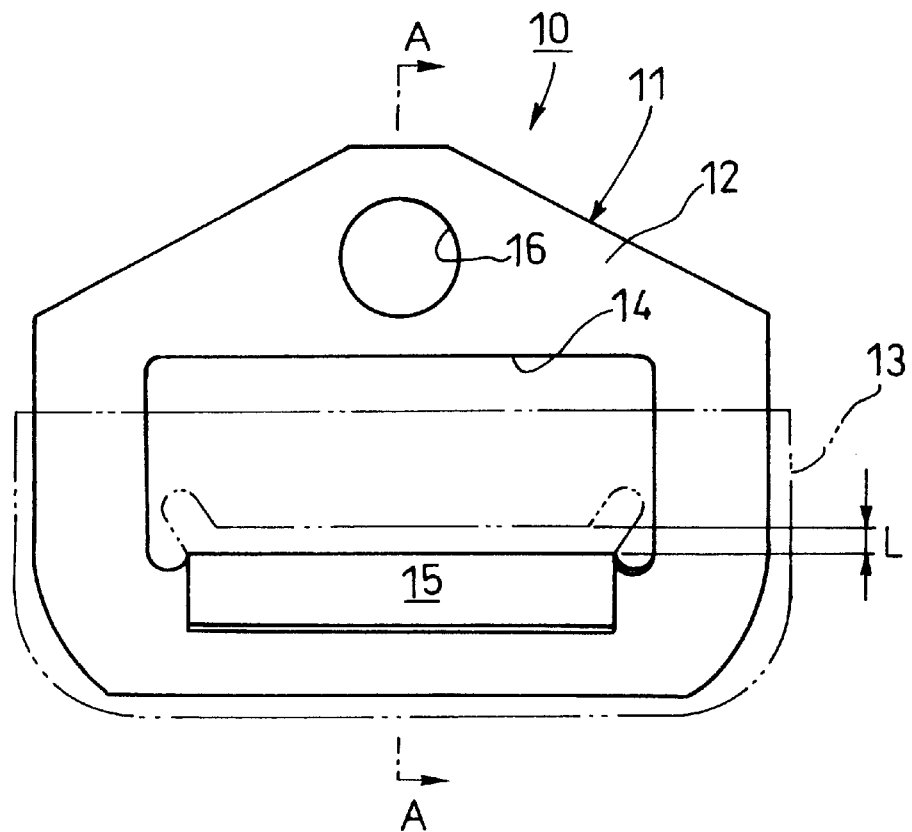
FIG. 1 is a front view of a through anchor of a seat belt assembly according to a first embodiment of the present invention.
Figure 2:
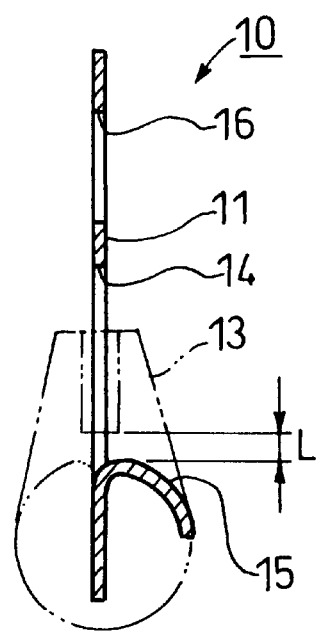
FIG. 2 is a sectional view of the through anchor shown in FIG. 1 as viewed in a direction indicated by arrows A therein.

FIG. 1 is a front view showing a through anchor of a seat belt assembly according to a first embodiment of the invention, and FIG. 2 is a sectional view of the through anchor of FIG. 1 as viewed in a direction indicated by arrows A.

In the seat belt assembly, one end of webbing is wound and stored in a retractor in such a manner as to freely pulled out or extended. The other end thereof is locked to an anchor plate via a through anchor which is a webbing guide. The anchor plate is rotatably supported at a lower portion of a center pillar of a vehicle. A through tongue disposed between the anchor plate and the through anchor is engaged with a buckle which is provided so as to erect from a vehicle body in the vicinity of the seat. With this engaging, the webbing restraints an occupant (not shown) in a seat.

Referring to FIGS. 1 and 2, a through anchor 10 is constructed by integrally insert molding a metal insert 11 which is formed to be a required configuration from a metal plate 12 with a coating resin 13. A metal surface is exposed from the coating resin at a portion of the through anchor 10 where the through anchor is brought into sliding contact with the webbing. In other words, in the through anchor 10, a lower edge of an opening 14 formed in the metal insert 11 is bent in a curved fashion toward a side of the metal insert as shown in FIG. 1 to thereby form a sliding contact surface 15 with which the webbing is brought into sliding contact (hereinafter, referred to as a "webbing siding contact surface 15"). The through anchor 10 is covered with the coating resin 13 which is molded over portions of the metal insert 11 other than the webbing sliding contact surface 15 into a configuration indicated by phantom lines in the figure.

Formed in an upper portion of the metal insert 11 shown in FIG. 1 is a bolt pass-through hole 16 through which a bolt or the like (not shown) for rotatably supporting the through anchor 10 on a center pillar of a vehicle body is allowed to pass. The metal insert 11 is formed into a required configuration by stamping the metal plate 12 such as a piece of sheet steel to thereby secure a load withstanding performance required for the through anchor 10. With a view to withstanding a predetermined load, for example, a steel material of carbon steel (a JISSC material) of a predetermined thickness is raised as a material for the metal plate 12. Additionally, the material may be heat treated.

The coating resin 13 is molded on the periphery of the opening 14 in the metal insert 11 in such a manner as to form a required configuration as indicated by the phantom lines in FIG. 1. The coating resin 13 forms a predetermined gap L through which the webbing is allowed to pass between the webbing sliding contact surface 15 and itself within the opening 14 in the metal insert 11 (hereinafter, referred to as a "webbing pass-through gap L"). The folding back angle of the webbing is made large by covering the portions of the metal insert 11 other than the webbing sliding contact surface 15 with the coating resin 13, thereby preventing the sliding contact between the webbing and the other portions of the metal insert 11 other than the webbing sliding contact surface 15.

The coating resin 13 comprises a resin having a high mechanical strength. Raised as specific examples of materials for the coating resin 13 are a polyamide resin such as polyamide 6, polyacetal and a resin formed from polypropylene filled with a reinforcing agent, or polycarbonate.

The operation of the first embodiment of the invention will be described below.

In the seat belt assembly, the webbing for restraining the occupant in the seat is allowed to pass through the webbing pass-through gap L in the through anchor 10 and the webbing is guided by the through anchor 10 when it is brought into sliding contact with the webbing sliding contact surface 15. The through anchor 10 allows the webbing to be brought into sliding contact with the webbing sliding contact surface 15 which is a metal surface for guiding, with superior sliding contact being provided therebetween.

Figure 3:
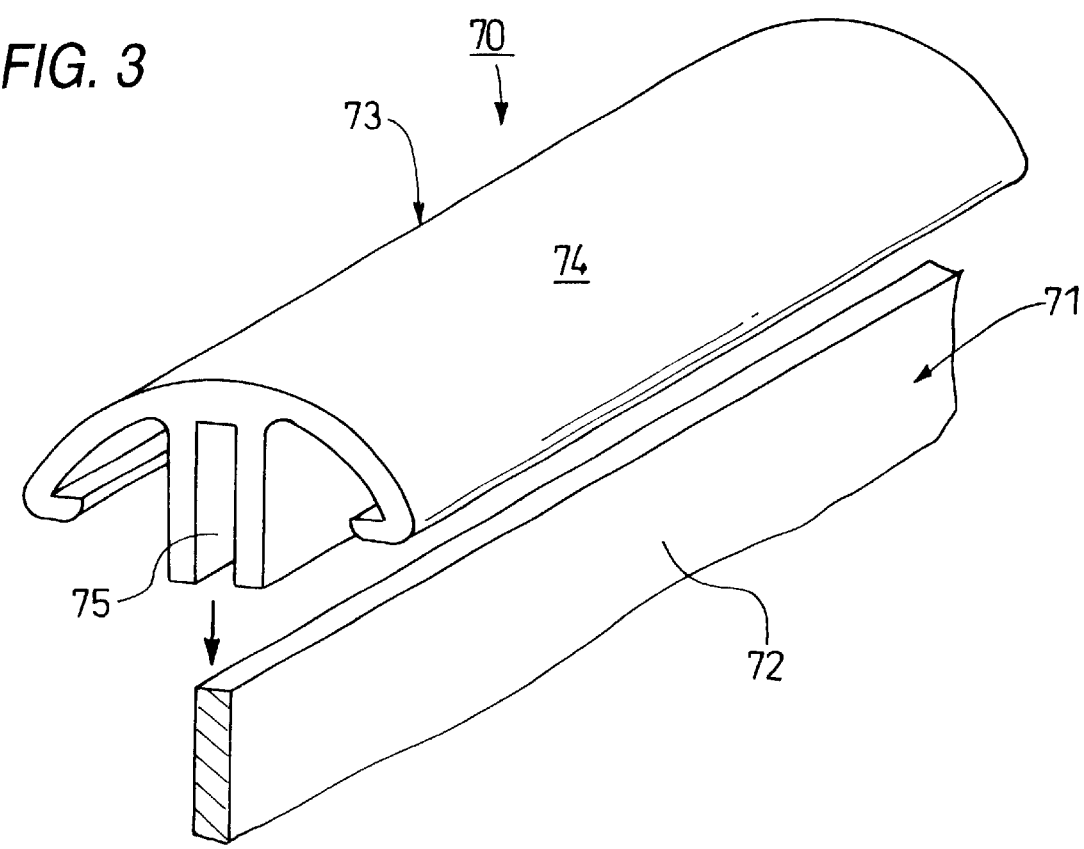
FIG. 3 is a perspective view of a main part of a through anchor of the seat belt assembly according to a second embodiment of the invention showing a metal material having a webbing sliding contact surface.

FIG. 3 is a perspective view of a main part of a through anchor of the seat belt assembly according to a second embodiment of the invention showing a metal material having a webbing sliding contact surface.

In this embodiment, a lower edge 72 of an opening in a metal insert 71 of a through anchor 70 is not bent in a curved fashion, but a metal material 73 formed into a required configuration by using a drawing process (or a lost wax casting process) is fittingly placed on the opening lower edge 72 to thereby form a webbing sliding contact surface 74. Namely, the metal material 73 has an arc-shaped surface constituting the webbing sliding contact surface 74 and a fitting portion 75 adapted to be fitted on the opening lower edge 72.

Features of the construction of the through anchor other than those described above and operation thereof remain the same as the features of the first embodiment.

Figure 4:
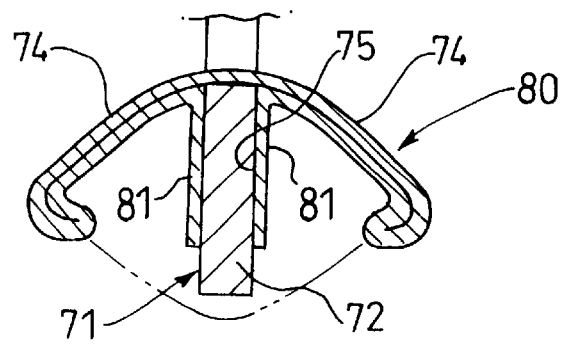
FIG. 4 is a sectional view of a main part of a through anchor of the seat belt assembly according to a third embodiment of the invention showing a metal material having a webbing sliding contact surface.

FIG. 4 is a sectional view of a main part of a through anchor of the seat belt assembly according to a third embodiment of the invention showing a metal material having a web sliding contact surface.

In this embodiment, a metal material 80 is formed into a required configuration by bending a piece of sheet metal, without using the drawing process(or the lost wax casting process) so as to form an arc-shaped surface which constitutes the webbing siding contact surface 74, and a fitting portion 75 is formed by the edge portions 81 of the metal material 80.

Features of the construction of the through anchor other than those described above and operation thereof remain the same as the features of the second embodiment.

Figure 5:
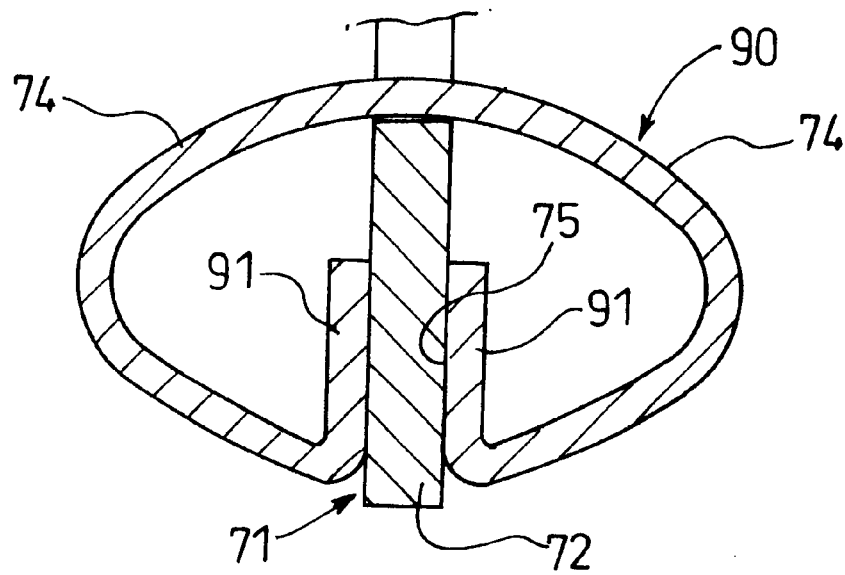
FIG. 5 is a sectional view of a main part of a through anchor of the seat belt assembly according to a fourth embodiment of the invention showing a metal material having a webbing sliding contact surface.

FIG. 5 is a sectional view of a main part of a through anchor of the seat belt assembly according to a fourth embodiment of the invention showing a metal material having a webbing sliding contact surface.

In this embodiment, edge portions 91 of a webbing sliding contact surface 74 of a metal material 90 shown in FIG. 5 are folded inwardly upwardly through a bending process to thereby form a fitting portion 75.

Features of the construction of the through anchor other than those described above and operation thereof remain the same as the features of the second embodiment.

Figure 6:
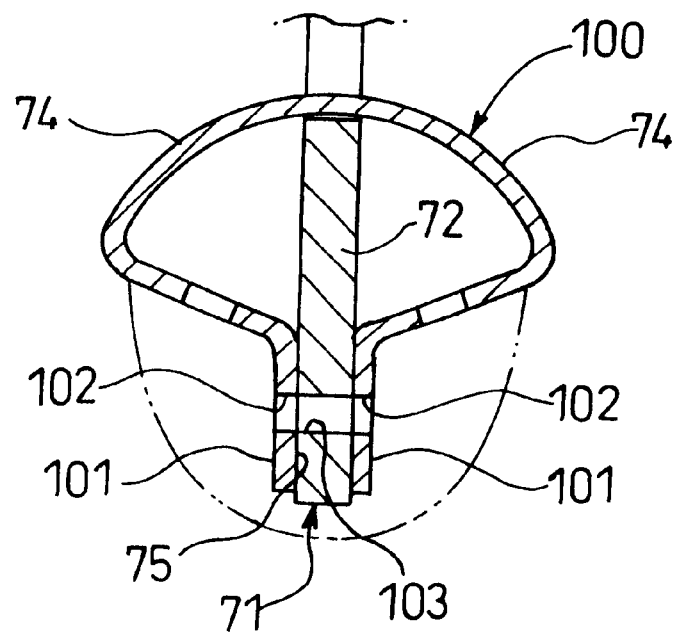
FIG. 6 is a sectional view of a main part of a through anchor of the seat belt assembly according to a fifth embodiment of the invention showing a metal material having a webbing sliding contact surface.

FIG. 6 is a sectional view of a main part of a through anchor of the seat belt assembly according to a fifth embodiment of the invention showing a metal material having a webbing sliding contact surface.

In this embodiment, edge portions 101 of a webbing sliding contact surface 74 of a metal material 100 shown in FIG. 6 are folded downwardly through a bending process to thereby form a fitting portion 75. In addition, through-holes 102 are formed in the fitting portion. The respective through-holes 102 are caused to communicate with a through hole 103 formed in an opening lower edge 72 of a metal insert 71, and in this state a rivet or the like (not shown) is allowed to pass through those holes, whereby the metal material 100 is coupled to the metal insert 71.

Features of the construction of the through anchor other than those described above and operation thereof remain the same as the features of the second embodiment.

Figure 7:
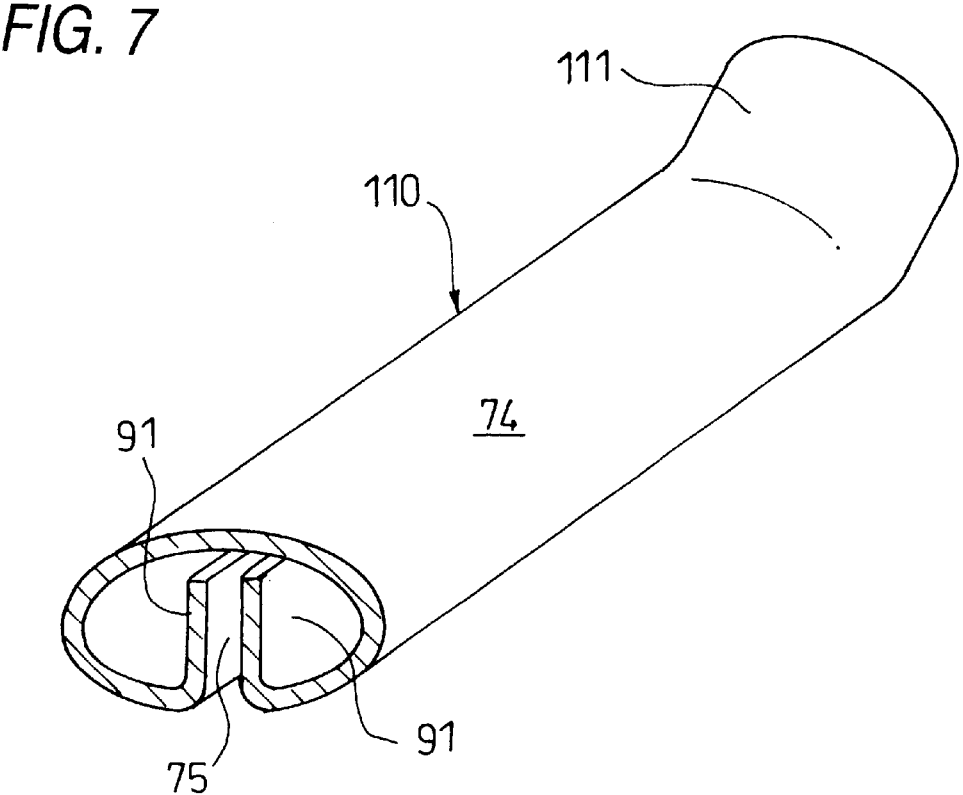
FIG. 7 is a perspective view of a main part of a through anchor of the seat belt assembly according to a sixth embodiment of the invention showing a metal material having a webbing sliding contact surface.

FIG. 7 is a perspective view of a main part of a through anchor of the seat belt assembly according to a sixth embodiment of the invention showing a metal material having a webbing sliding contact surface.

In this embodiment, a longitudinal end portion of a webbing sliding contact surface 74 of a metal material 110 is curled diagonally upwardly as viewed in FIG. 7 to thereby form a surface for regulating an edge of the webbing.

Features of the construction of the through anchor other than those described above and operation thereof remain the same as the features of the fourth embodiment.

In the above second to sixth embodiments, a plurality of through holes (not shown) may be formed in portions of the metal materials 73, 80, 90, 100, 110 other than the webbing surface 74 or slits (not shown) may be formed similarly. With this construction, when molding the coating resin 13, the resin can be uniformly distributed to every portion needing it.

Figure 8:
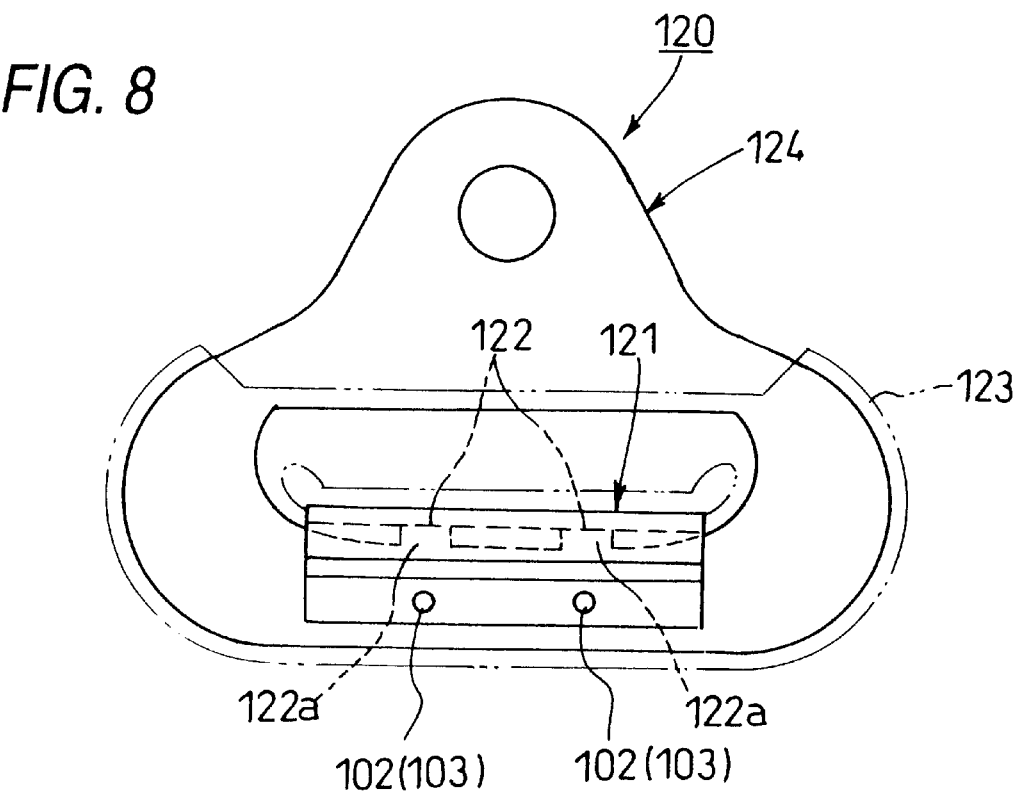
FIG. 8 is a front view of a through anchor of the seat belt assembly according to a seventh embodiment of the invention.

FIG. 8 is a front view of a through anchor of the seat belt assembly according to a seventh embodiment of the invention.

In this embodiment, a webbing sliding contact surface 122 side of a metal insert 124 of a through anchor 120 is formed as an irregular surface with raised portions 122a being in abutment with a metal material 121. When molding a coating resin 123, this allows the resin to be distributed into depressed portions in the irregular surface.

In addition, in view of strength, coupling positions (positions along the transverse direction of through holes 102, 103 as viewed in FIG. 8) of the metal material 121 and the metal insert 124 are located at portions below the raised portions 122a of the webbing sliding contact surface 122 as viewed in FIG. 8.

Features of the construction of the through anchor other than those described above and operation thereof remain the same as the features of the fifth embodiment shown in FIG. 6.

Figure 9:
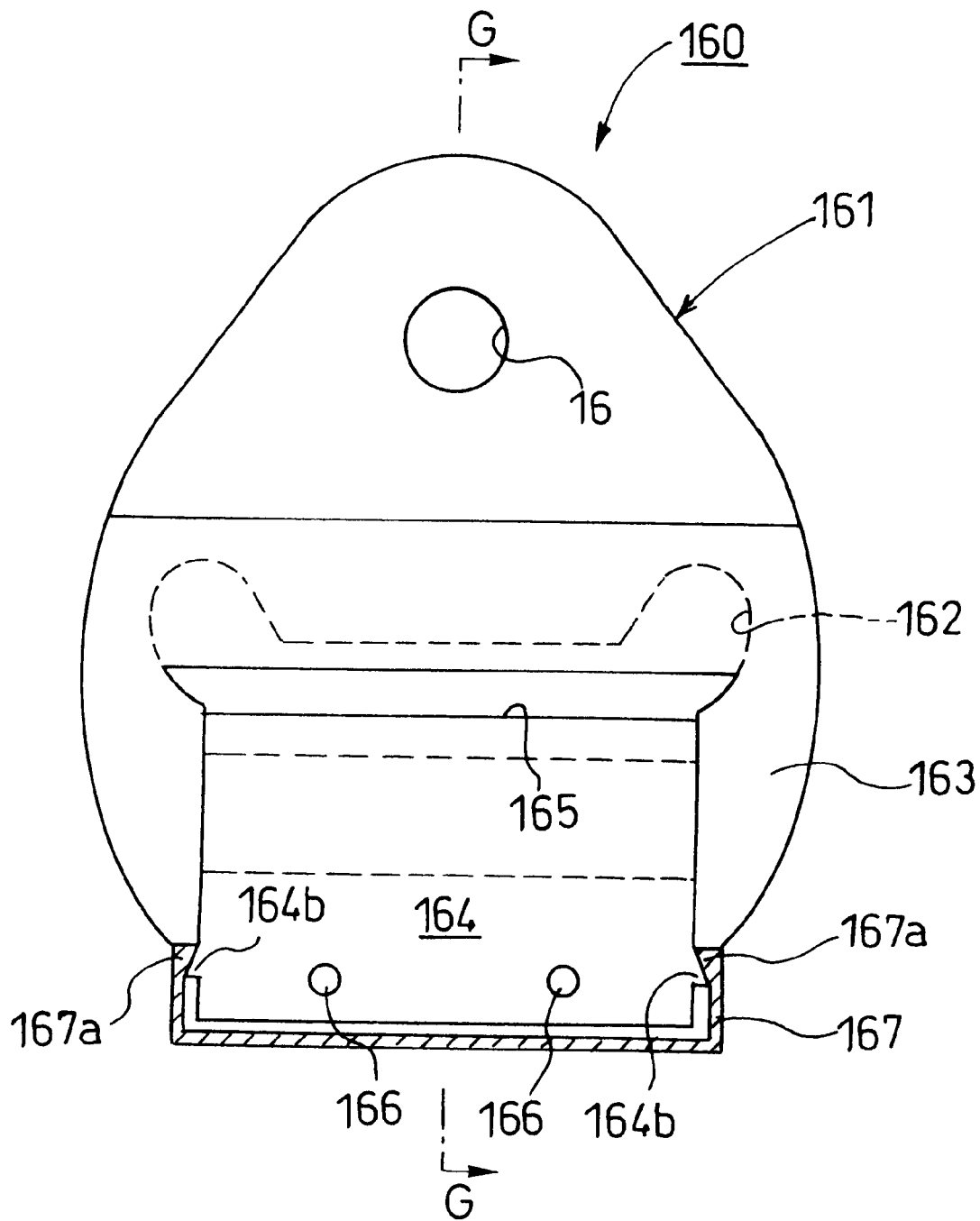
FIG. 9 is a front view of a through anchor of the seat belt assembly according to an eighth embodiment of the invention.
Figure 10:
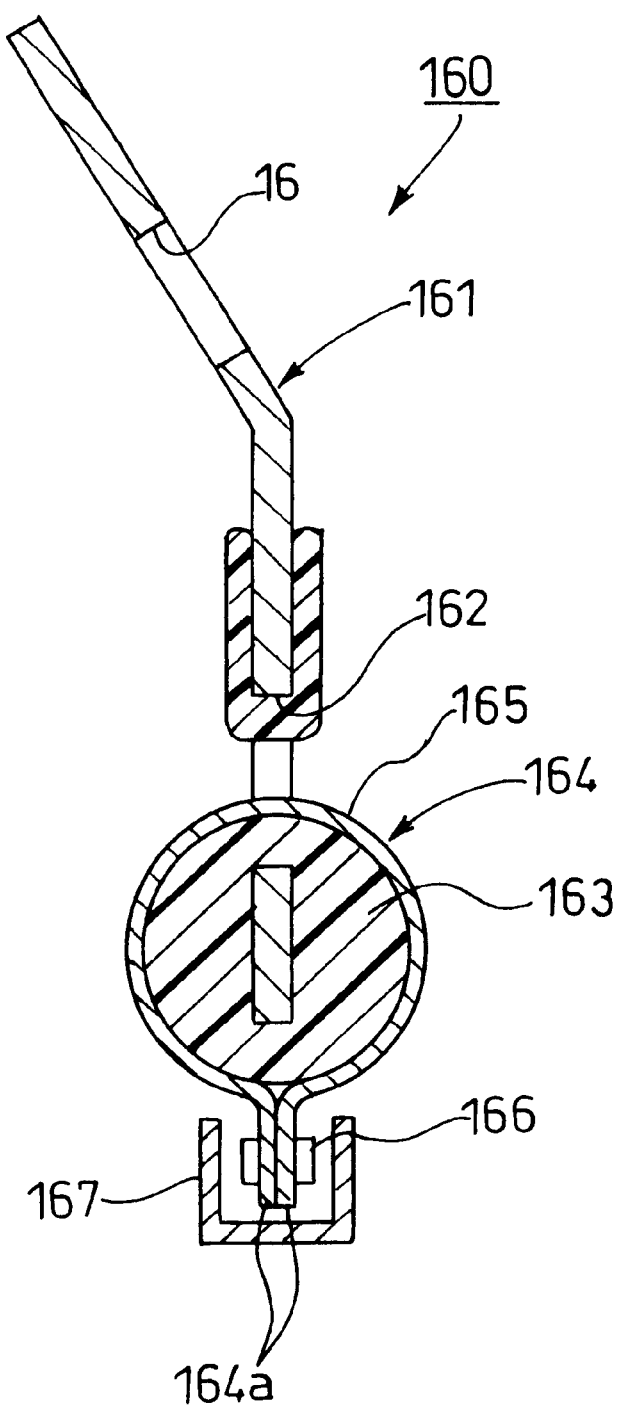
FIG. 10 is a sectional view of the through anchor of FIG. 9 as viewed in a direction indicated by arrows G therein.

FIG. 9 is a front view showing a through anchor of the seat belt assembly according to an eighth embodiment of the invention, and FIG. 10 is a sectional view of the through anchor of FIG. 9 as viewed in a direction indicated by arrows G.

In this embodiment, a lower edge of an opening 162 of a metal insert 161 of a through anchor 160 is not bent, but a metal material 164 of sheet iron is curved and then wound around the perimeter of a coating resin 163 after the resin is molded to thereby form a webbing sliding contact surface 165 at a part of the surface of the metal material 164. Edge portions 164a (lower end portions as viewed in FIG. 10) of the metal material 164 wound around the periphery of the coating resin 163 are coupled together with rivets or screws 166 and are covered with a cover 167. The cover 167 is held to the metal material 164 by allowing locking claws 167a shown at transverse ends of the cover 167 in FIG. 9 to be locked in claw portions 164b of the metal material 164.

Features of the construction of the through anchor other than those described above and operation thereof remain the same as the features of the first embodiment.

Figure 11:
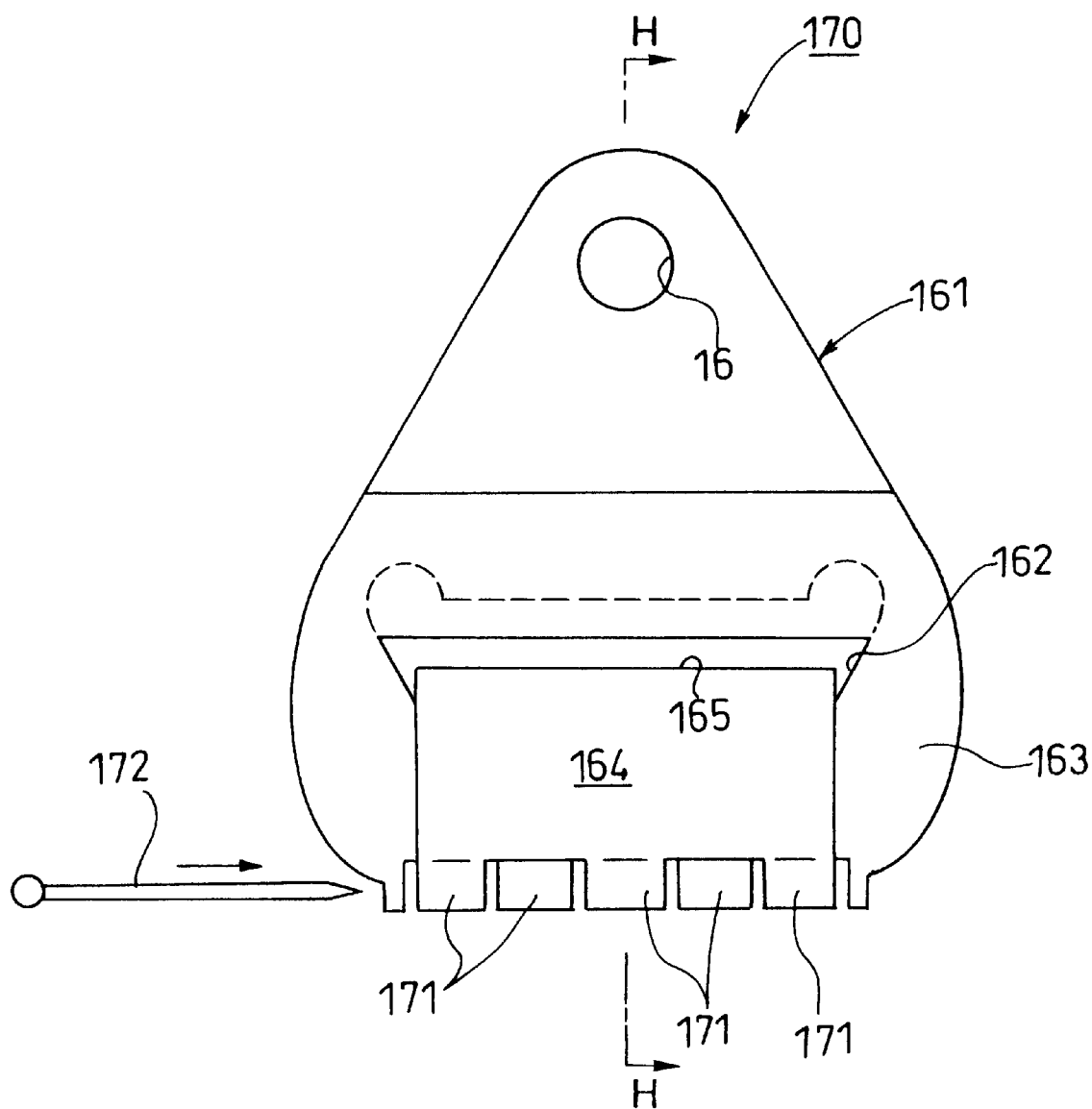
FIG. 11 is a front view of a through anchor of the seat belt assembly according to a ninth embodiment of the invention.
Figure 12:
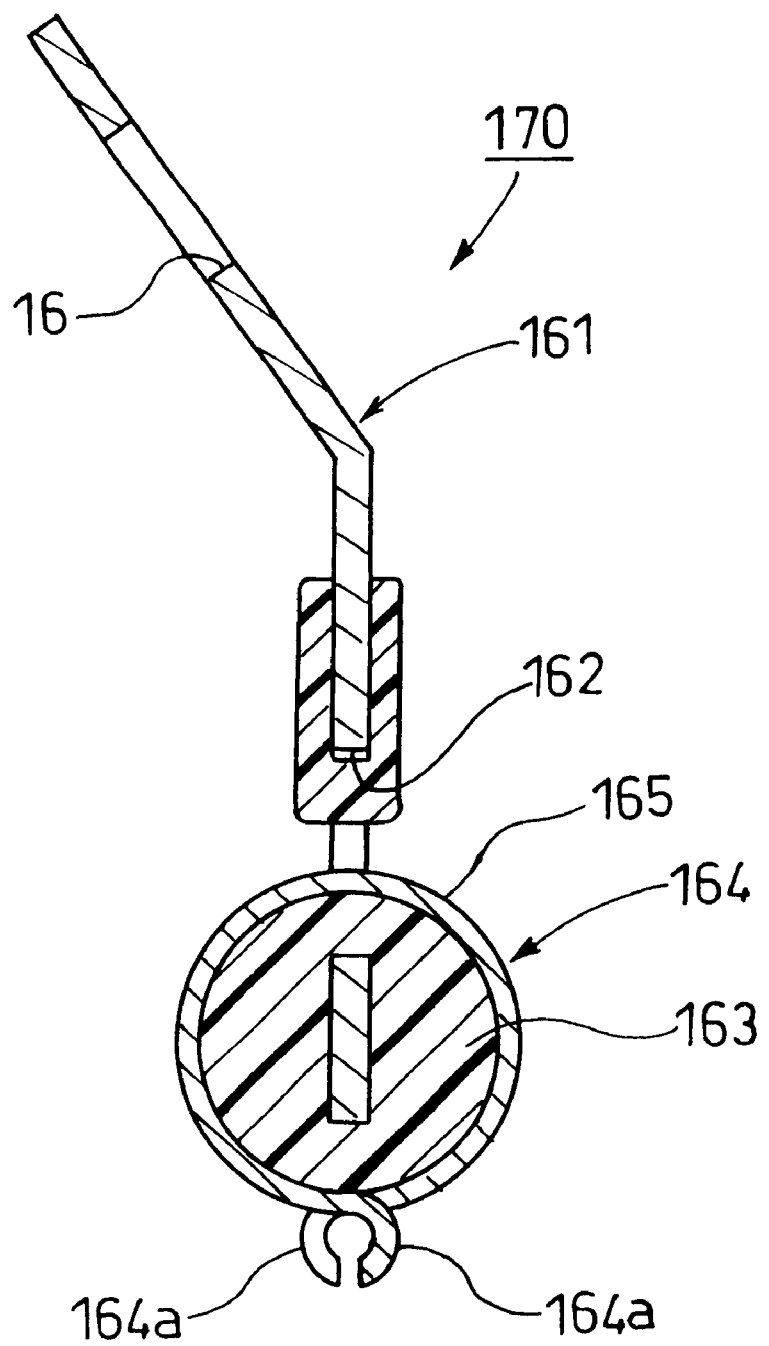
FIG. 12 is a sectional view of the through anchor of FIG. 10 as viewed in a direction indicated by arrows H therein.

FIG. 11 is a front view of a through anchor of the seat belt assembly according to a ninth embodiment of the invention, and FIG. 12 is a sectional view showing the through anchor of FIG. 11 as viewed in a direction indicated by arrows H.

In a through anchor 170 according to this embodiment, cylindrical portions 171 are formed, respectively, at the edge portions 164a of the metal material 164 wound around the perimeter of the coating resin 163. A single pin 172 is inserted into the respective cylindrical portions 171 in a state in which the cylindrical portions are caused to communicate with each other in the transverse direction as viewed in FIG. 11.

Features of the construction of the through anchor other than those described above and operation thereof remain the same as the features described in the eighth embodiment.

Figure 13:
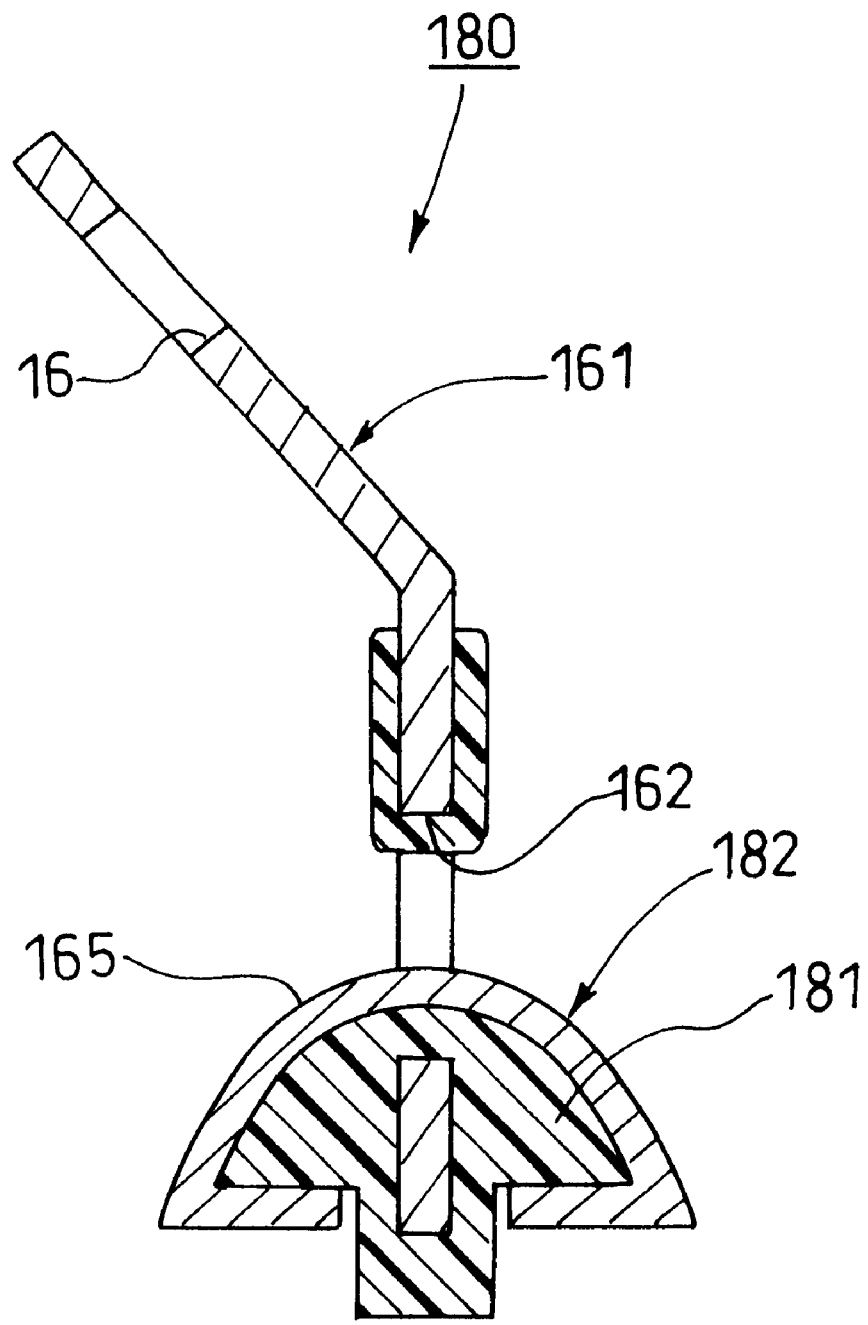
FIG. 13 is a sectional view of a through anchor of the seat belt assembly according to a tenth embodiment of the invention.

FIG. 13 is a sectional view showing a through anchor of the seat belt assembly according to a tenth embodiment of the invention.

In a through anchor 180 according to this embodiment, a metal material 182 that is to be wound around the perimeter of a coating resin 181 is formed of a shape memory alloy shaped so as to match the configuration of the coating resin 181.

Features of the construction of the through anchor other than those described above and operation thereof remain the same as the features described in the eighth embodiment.

Figure 14:
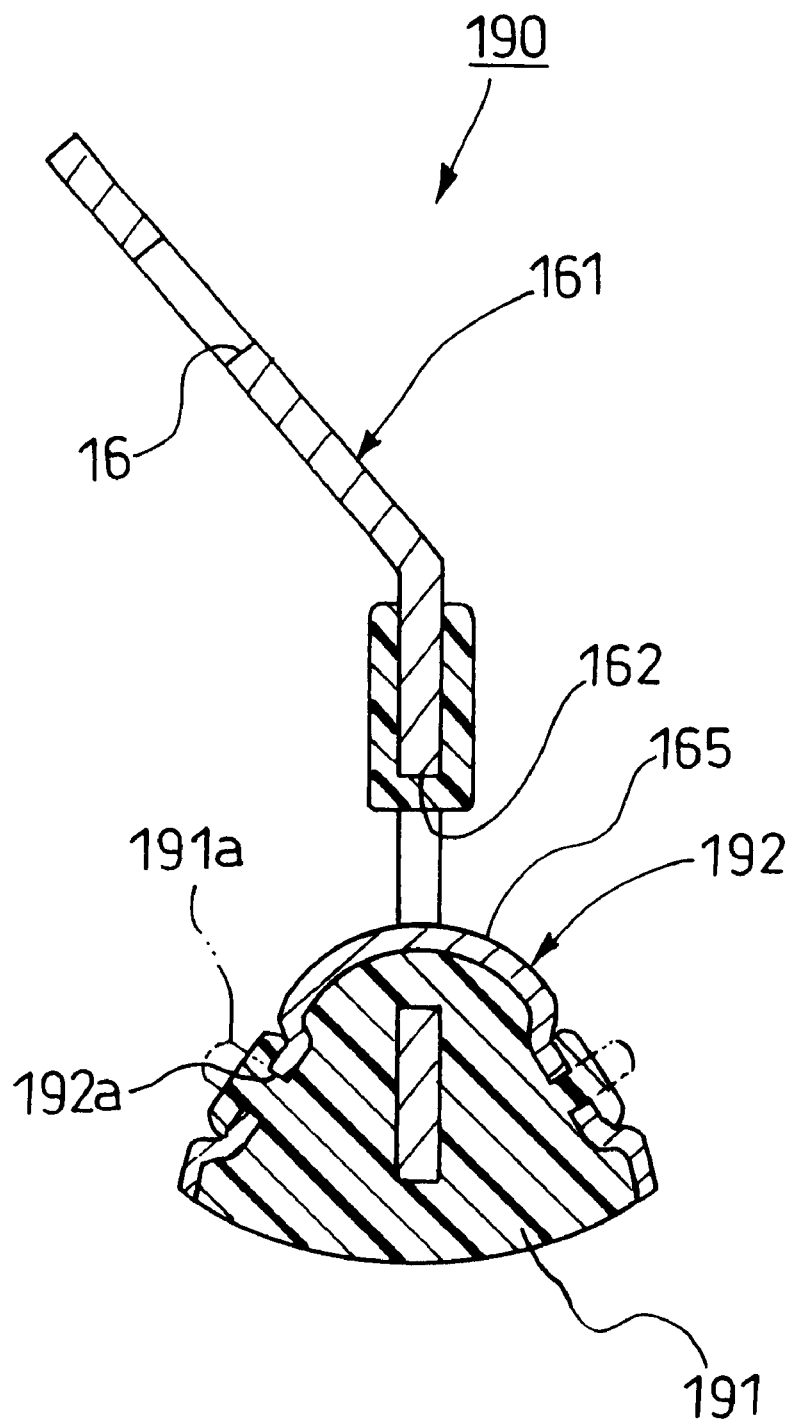
FIG. 14 is a sectional view showing a through anchor of the seat belt assembly according to an eleventh embodiment of the invention.

FIG. 14 is a sectional view showing a through anchor of the seat belt assembly according to an eleventh embodiment of the invention.

In a through anchor 190 according to this embodiment, raised portions 191a are provided on a coating resin 191, while hole portions 192a are formed in a metal material 192 in such a manner as to confront the raised portions 191a, and the metal material 192 is placed over the coating resin 191 in such a manner that the raised portions 191a are inserted through the hole portions 192a. Then, the raised portions 191a are fused with ultrasonic waves or the like for caulking.

Features of the construction of the through anchor other than those described above and operation thereof remain the same as the features of the eighth embodiment.

Thus, according to the above first to eleventh embodiments, the through anchor 10, 70, 120, 160, 170, 180, 190 which is the webbing guide is constructed by insert molding the metal insert 11, 71, 124, 161 with the coating resin 13, 123, 163, 181, 191, and the metal surface is exposed at at least a part of the surface with which the webbing is brought into sliding contact.

Namely, according to the first embodiment, the webbing sliding contact surface 15 is formed by bending the lower edge of the opening 14 in the metal insert 11 in a curved fashion.

In addition, according to the second to seventh embodiments, the opening lower edge 72 of the metal insert 71, 124 of the through anchor 70, 120 is not bent, and the metal material 73, 80, 90, 100, 110, 121 which is formed into the required configuration through the drawing process, lost wax casing process or bending process is fittingly placed over the opening lower edge 72 to thereby form the webbing sliding contact surface 74, 122.

According to the eighth to eleventh embodiments, the opening lower edge 162 of the metal insert 161 of the through anchor 160, 170, 180, 190 is not bent, and the metal material 164, 182, 192 of sheet iron is wound around or placed over the perimeter of the coating resin 163, 181, 191 after the coating resin is molded 163, 181, 191 to thereby form the webbing sliding contact surface 165 at a part of the surface of the metal material 164, 182, 192.

Thus, even in any of the embodiments, while the cost reduction can be aimed at with the simple construction, the superior sliding contact can be secured between the through anchor 10, 70, 120, 160, 170, 180, 190 and the webbing, thereby making it possible to secure in turn good maneuverability and superior durability of the webbing.

Next, referring to FIGS. 15 to 30, twelfth to seventeenth embodiments of the invention will be described in detail below.

Figure 15:
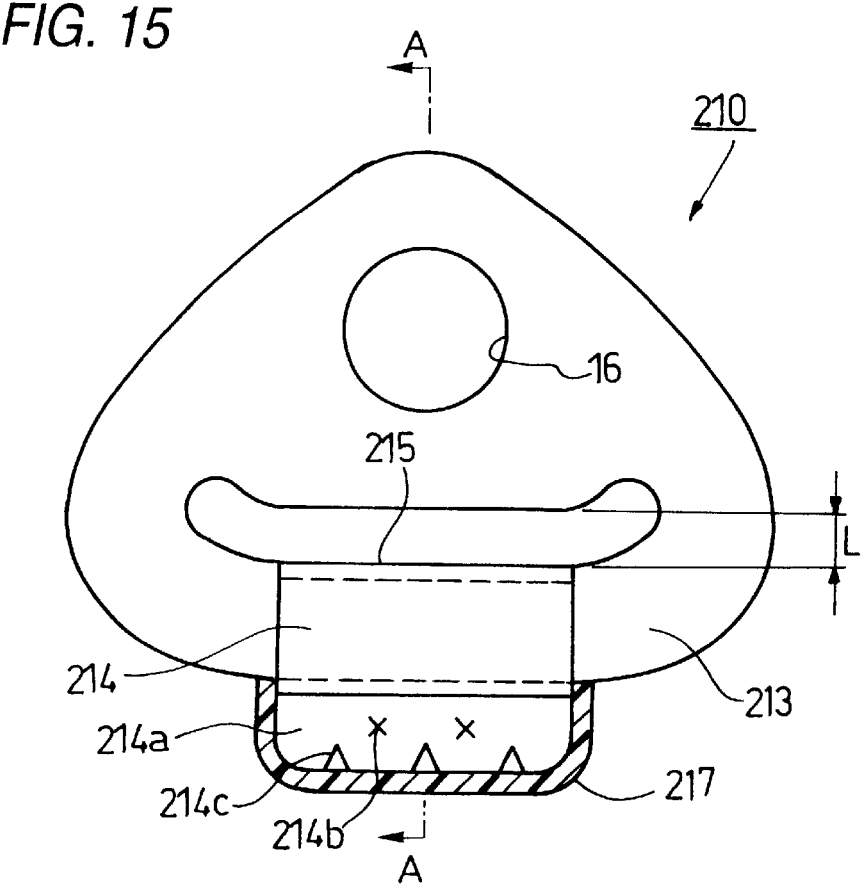
FIG. 15 is a front view showing a through anchor of the seat belt assembly according to a twelfth embodiment of the invention.
Figure 16:
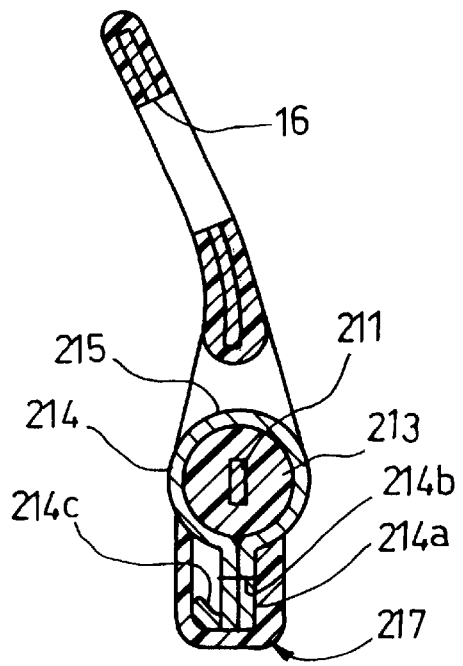
FIG. 16 is a sectional view of the through anchor of FIG. 15 as viewed in a direction indicated by arrows A.

FIG. 15 is a front view showing a through anchor of the seat belt assembly according to a twelfth embodiment of the invention, and FIG. 16 is a sectional view of the through anchor of FIG. 15 as viewed in a direction indicated by arrows A.

Referring to FIGS. 15 and 16, a through anchor 210 is constructed by integrally insert molding a metal insert 211 which is formed to be a required configuration from a metal plate 212 with a coating resin 213. The coating resin 213 is molded on the perimeter of the metal insert 211 in such a manner as to form a required configuration.

A metal plate 214 of sheet metal such as stainless steel, iron, aluminum alloy or titanium alloy that can withstand a predetermined load is curved and wound around the perimeter of the coating resin 213 to thereby form a sliding contact surface 215 with which webbing is brought into sliding contact on a part of the surface of the metal plate 214 (hereinafter, referred to as a "webbing sliding contact surface 215"). The surface of this metal plate 214 is plated so as to suppress the adhesion of foreign particles thereto to thereby continuously maintain good sliding contact between the webbing and the webbing sliding contact surface 215. In addition, in a case where the metal plate 214 is constituted by a stainless steel plate, no plating may be applied to the metal plate 214. As plating, any of chrome, nickel, electroless plating, cobalt, tin-cobalt and rigid chrome plating is preferred. In addition, edge portions 214a (lower end portions in FIG. 16) of the metal plate 214 wound around the perimeter of the coating resin 213 are coupled together through spot welding (welded portions are denoted by reference numeral 214b) and are covered with a resin cover 217 so as to provide good external appearance. This cover 217 is held on the metal plate 214 by allowing the cover 217 to be locked at the internal surface thereof by top portions of claw portions 214c formed by cutting into the metal plate 214 and erecting portions of the metal plate 214 so cut into.

Features of the construction of the through anchor other than those described above and the materials of the metal insert and coating resin remain substantially the same as the features and materials described in the first embodiment.

Next, the operation of this embodiment will be described.

In the seat belt assembly, the webbing for restraining an occupant in a seat in which he or she is seated is allowed to pass through a webbing pass-through gap L in the through anchor 210 and is guided by the through anchor 210 when the webbing is brought into sliding contact with the webbing slide contact surface. The through anchor 210 allows the webbing to be brought into sliding contact with the webbing sliding contact surface 215 for guiding, with superior sliding contact being provided between the webbing and the webbing sliding contact surface 215. Since the webbing sliding contact surface 215 is constituted by the plated metal surface or stainless steel surface, the adhesion of foreign particles thereto is reduced, whereby as will be clear from an embodiment that will be described later, good sliding contact can be continuously maintained.

Figure 17:
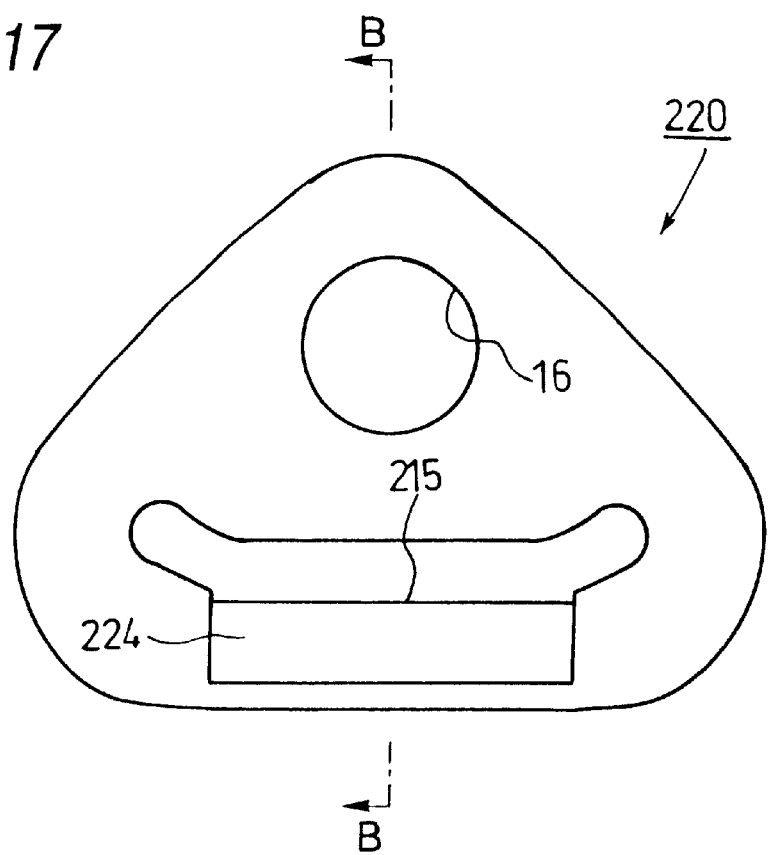
FIG. 17 is a front view showing a through anchor of the seat belt assembly according to a thirteenth embodiment of the invention.
Figure 18:
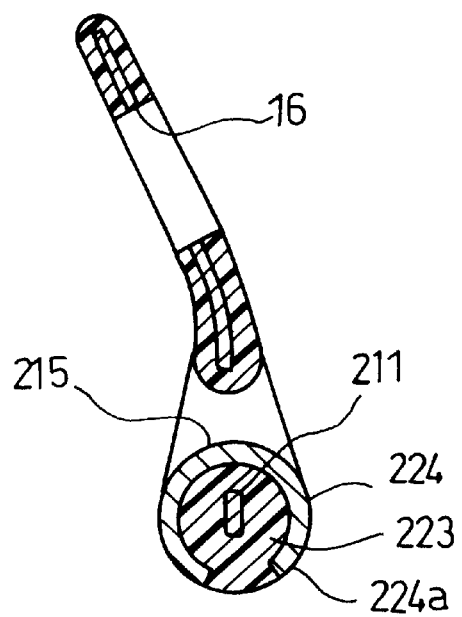
FIG. 18 is a sectional view of the through anchor of FIG. 17 as viewed in a direction indicated by arrows B.

FIG. 17 is a front view showing a through anchor of the seat belt assembly according to a thirteenth embodiment of the invention, and FIGS. 18 is a sectional view of the through anchor of FIG. 17 as viewed in a direction indicated by arrows B.

In this embodiment, a coating resin 223 is molded over a metal insert 211 of a through anchor 220, and a metal plate 224 which is bent in a curved fashion is then fitted over the perimeter of the coating resin 223 by making use of the resilient force of the metal plate 224, whereby a webbing sliding contact surface 215 is formed on a part of the surface of the metal plate 224. The material of and surface treatment applied to this metal plate 224 are similar to those of the twelfth embodiment of the invention.

Figure 19:
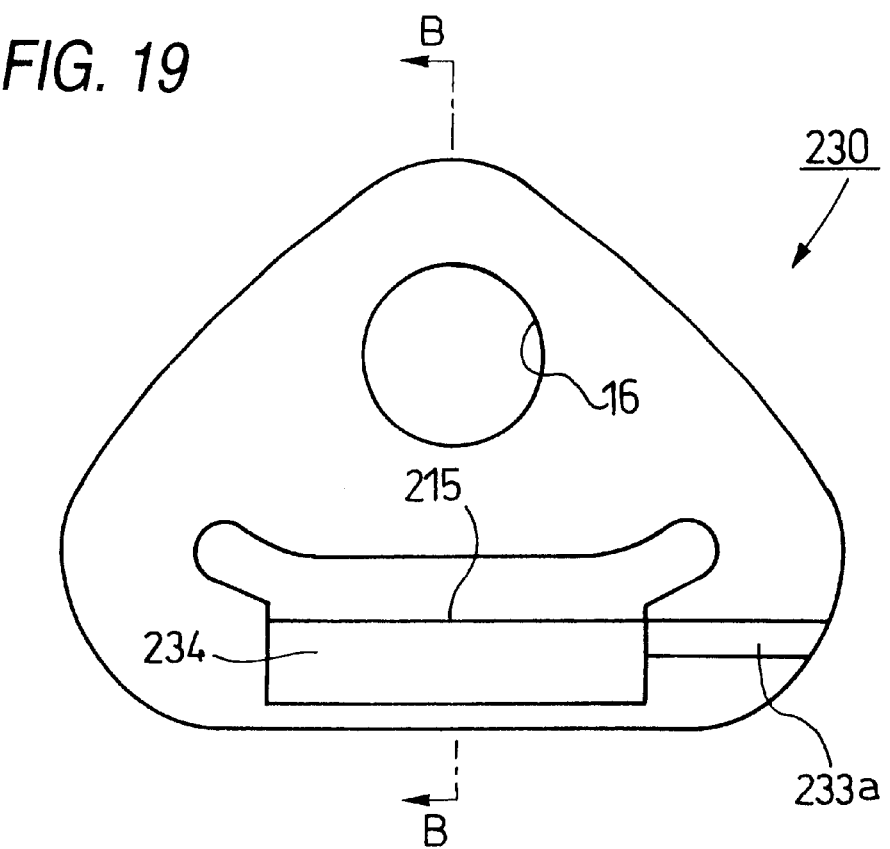
FIG. 19 is a front view showing a through anchor of the seat belt assembly according to a fourteenth embodiment of the invention.
Figure 20A:
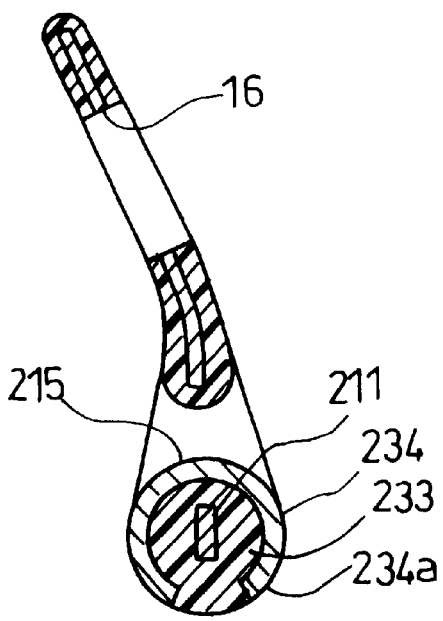
FIG. 20A is a sectional view of the through anchor of FIG. 19 as viewed in a direction indicated by arrows B.
Figure 20B:
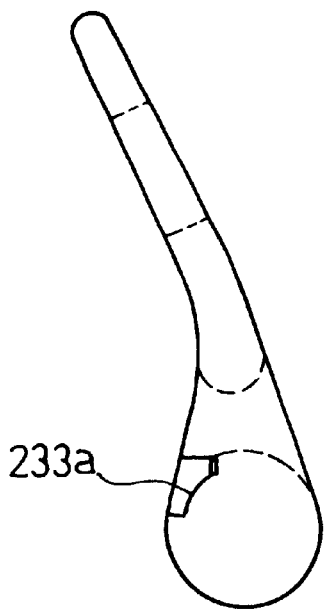
FIG. 20B is a side view of the through anchor of FIG. 19.
Figure 21:
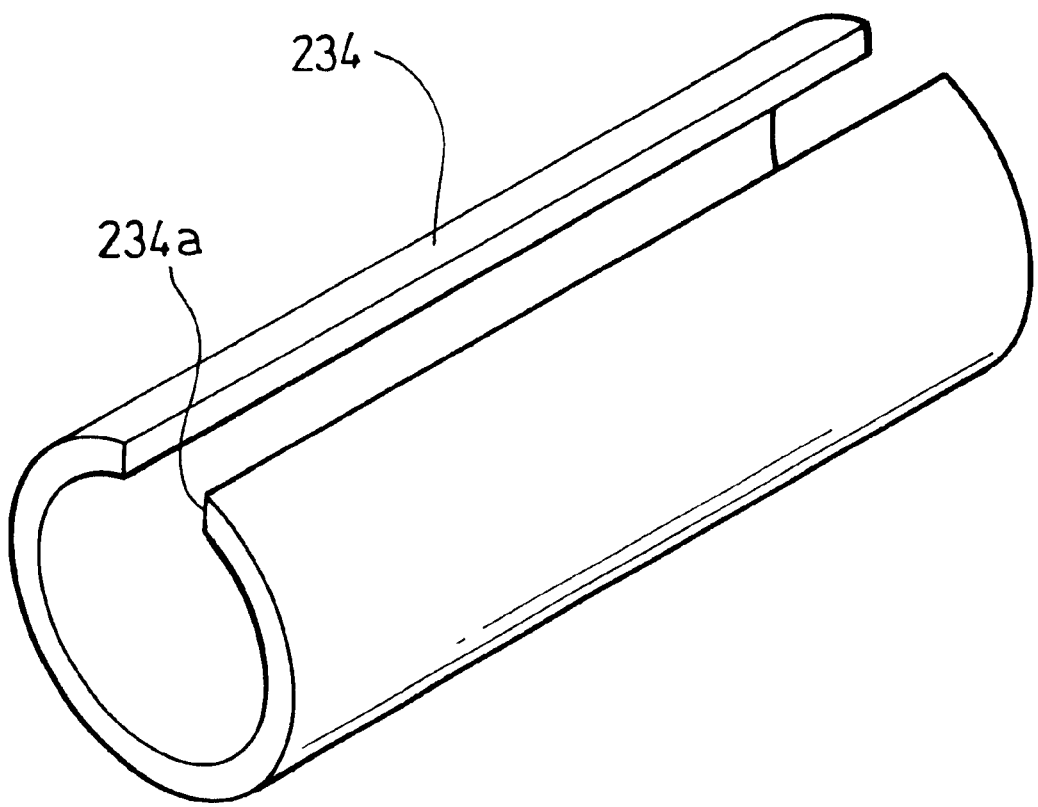
FIG. 21 is a perspective view of a metal plate of the through anchor shown in FIG. 19.

FIG. 19 is a front view showing a through anchor of the seat belt assembly according to a fourteenth embodiment of the invention, FIG. 20A is a sectional view of the through anchor of FIG. 19 as viewed in a direction indicated by arrows B, FIG. 20B is a side view of the through anchor of FIG. 19, and FIG. 21 is a perspective view of a metal plate of the through anchor shown in FIG. 19.

A through anchor 230 according to this embodiment is constructed substantially similarly to the thirteenth embodiment described above, and a metal plate 234 as shown in FIG. 21 is assembled to a coating resin 233 of the through anchor 230 by introducing the metal plate 234 over the coating resin 233 from the right as viewed in FIG. 19. In other words, an edge portion 234a of the metal plate 234 is inserted into a groove 233a formed in a part of the coating resin 233, and thereafter the metal plate 234 is rotated such that the webbing sliding contact surface 215 thereof is located a top as seen in FIGS. 19 and 20A, when the assembly is completed.

The material of and surface treatment applied to the metal plate, as well as features of the construction of the through anchor other than those described above and operation thereof remain substantially the same as those of the twelfth embodiment described above.

Figure 22:
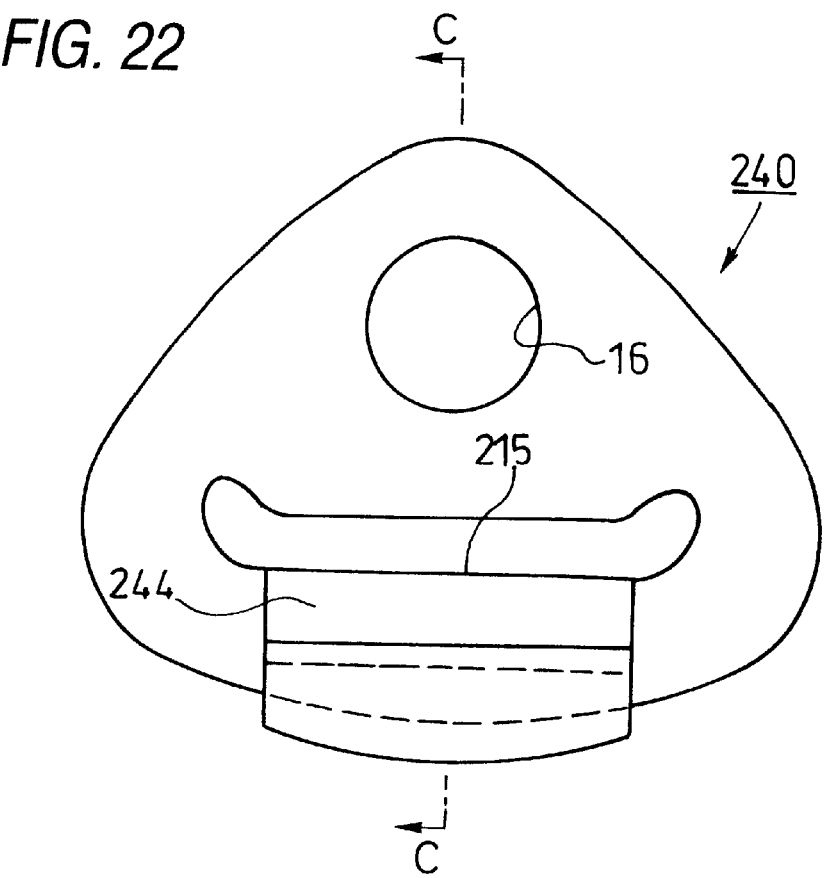
FIG. 22 is a front view showing a through anchor of the seat belt assembly according to a fifteenth embodiment of the invention.
Figure 23:
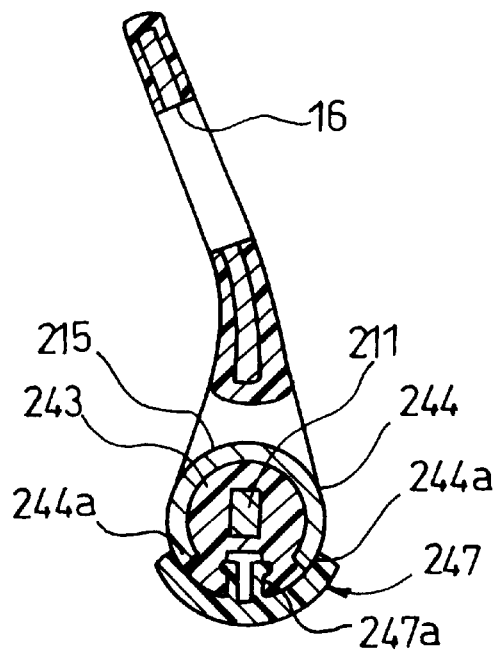
FIG. 23 is a sectional view of the through anchor of FIG. 22 as viewed in a direction indicated by arrows C.

FIG. 22 is a front view showing a through anchor of the seat belt assembly according to a fifteenth embodiment of the invention, and FIG. 23 is a sectional view of the through anchor of FIG. 22 as viewed in a direction indicated by arrows C.

In this embodiment, a coating resin 243 is molded over a metal insert 211 of a through anchor 240, and thereafter a metal plate 244 which is bent in a curved fashion is fitted around the perimeter of the coating resin 243 by making use of resilient force of the metal plate 244 to thereby form a webbing sliding contact surface 215 on a part of the surface of the metal plate 244. In addition, edge portions 244a (lower end portions in FIG. 23) of the metal plate 244 are covered with a resin cover 247. This cover 247 is held on the coating resin 243 by allowing a claw portion 247a formed on the inside thereof to be locked in a depressed portion in the coating resin 243.

The material of and surface treatment applied to the metal plate, as well as features of the construction of the through anchor other than those described above and operation thereof remain substantially the same as those of the twelfth embodiment described above. In addition, even in this fifteenth embodiment, the metal plate assembling method described in the fourteenth embodiment may be adopted.

Figure 24:
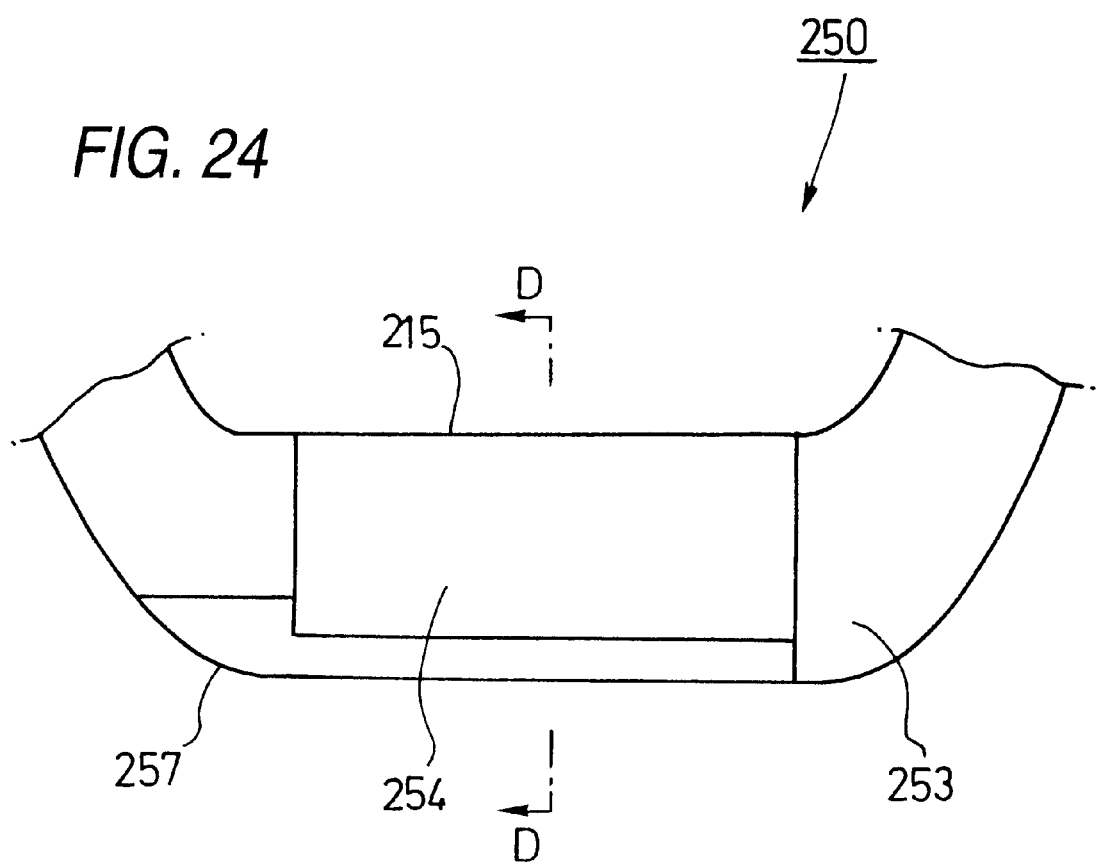
FIG. 24 is a partial front view of a through anchor of the seat belt assembly according to a sixteenth embodiment of the invention.
Figure 25:
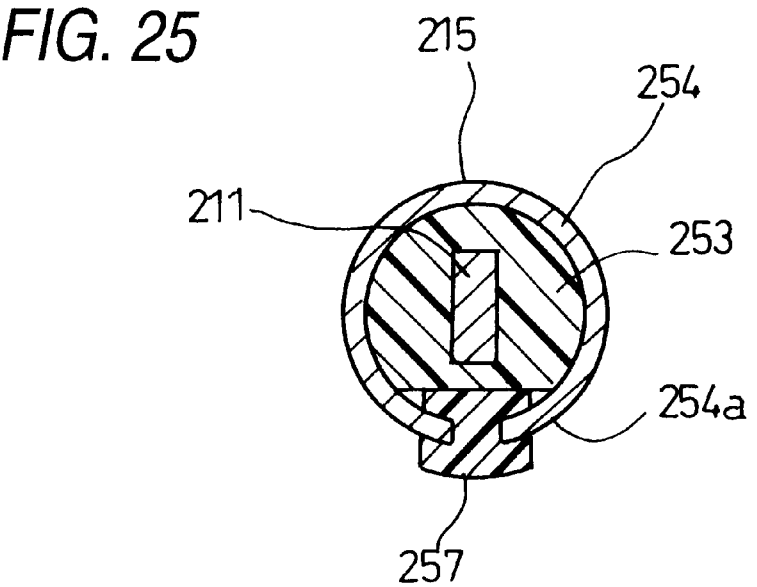
FIG. 25 is a sectional view of the through anchor of FIG. 24 as viewed in a direction indicated by arrows D.
Figure 26:
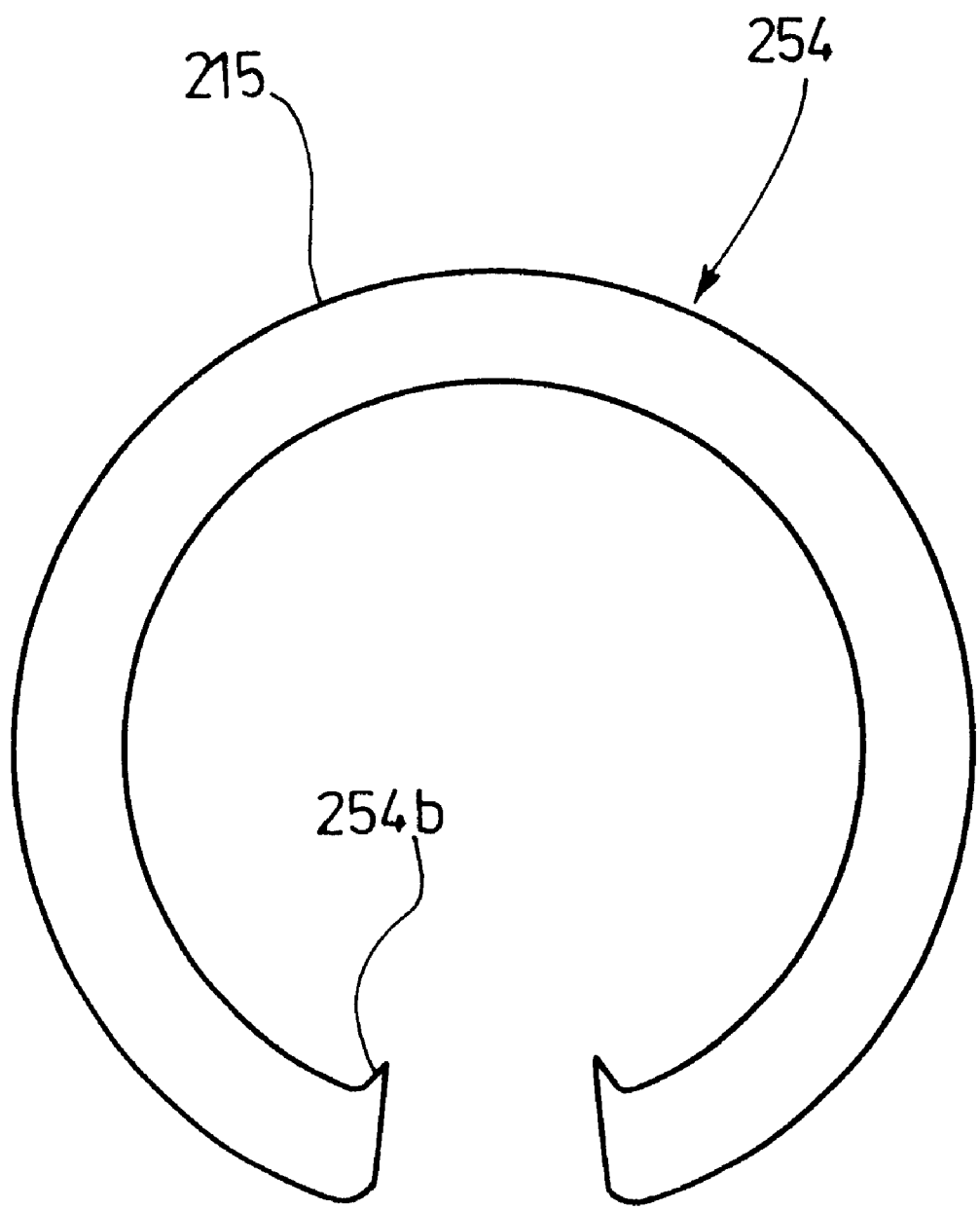
FIG. 26 is a side view of a metal plate.

FIG. 24 is a partial front view showing a through anchor of the seat belt assembly according to a sixteenth embodiment of the invention, and FIG. 25 is a sectional view as viewed in a direction indicated by arrows D.

In this embodiment, a coating resin 253 is molded over a metal insert 211 of a through anchor 250, and thereafter a metal plate 254 which is bent in a curved fashion is wound around the perimeter of the coating resin 253 to thereby form a webbing sliding contact surface 215 on a part of the surface of the metal plate 254. In addition, edge portions 254a (lower end portions in FIG. 25) of the metal plate 254 are covered with a resin cover 257. This cover 257 has a substantially H-shaped cross-section, and the cover 257 is held on the metal cover 254 by allowing depressed portions of the cover 257 to be introduced on the edge portions 254a of the metal plate 254 from the left as viewed in FIG. 24.

The material of and surface treatment applied to the metal plate, as well as features of the construction of the through anchor other than those described above and operation thereof remain substantially the same as those of the twelfth embodiment described above.

In the sixteenth embodiment described above, as shown in FIG. 26, the webbing sliding contact surface 215 side of the metal plate 254 is desirably constituted by a so-called sag surface side (an opposite side to a side where burrs 254b are produced) formed during a pressing process. With this construction, the webbing sliding contact surface 215 is free from burrs and the webbing is thus prevented from being damaged by burrs that would otherwise be produced. It is needless to say that this applies to the other embodiments.

Figure 27:
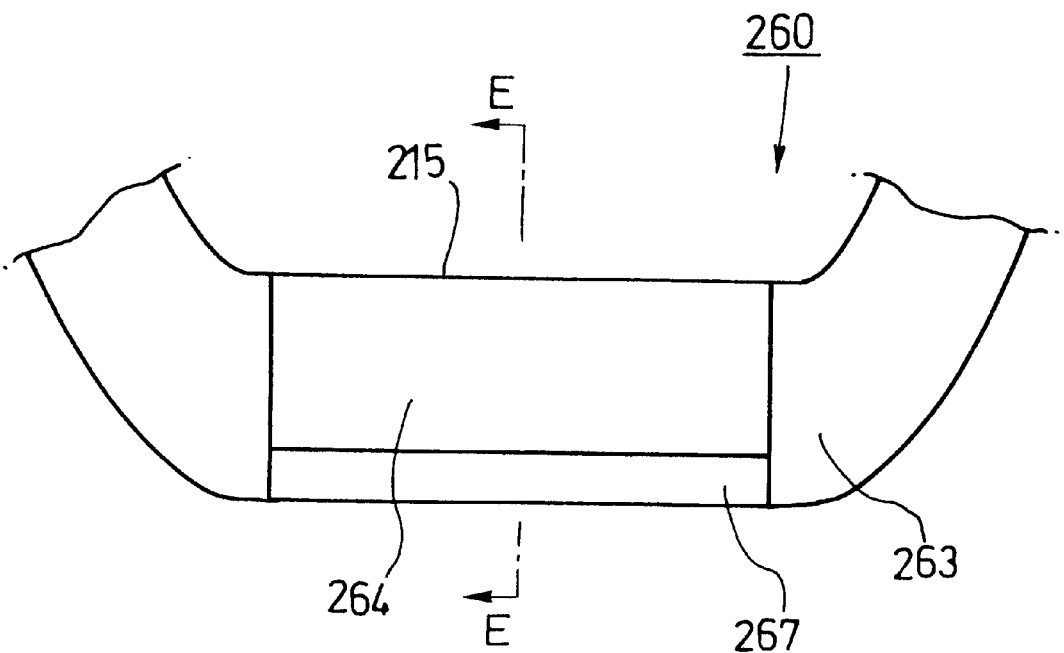
FIG. 27 is a front view showing a through anchor of the seat belt assembly according to a seventeenth embodiment of the invention.
Figure 28:
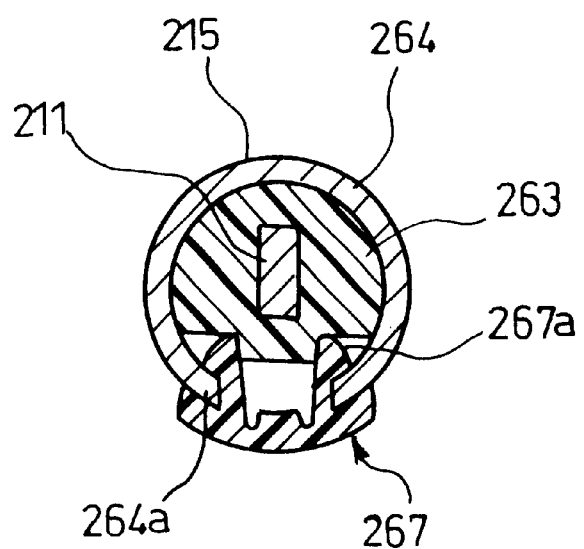
FIG. 28 is a sectional view of the through anchor of FIG. 27 as viewed in a direction indicated by arrows E.

FIG. 27 is a partial front view showing a through anchor of the seat belt assembly according to a seventeenth embodiment of the invention, and FIG. 28 is a sectional view of the through anchor of FIG. 27 as viewed in a direction indicated by arrows E.

In this embodiment, a coating resin 263 is molded over a metal insert 211 of a through anchor 260, and thereafter a metal plate 264 which is bent in a curved fashion is wound around the perimeter of the coating resin 263 to thereby form a webbing sliding contact surface 215 on a part of the surface of the metal plate 264. In addition, edge portions 264a (lower end portions in FIG. 28) of the metal plate 264 are covered with a resin cover 267. This cover is held on the metal plate 264 by allowing claw portions 264a thereof to be locked at the edge portions 264a of the metal cover 264.

The material of and surface treatment applied to the metal plate, as well as features of the construction of the through anchor other than those described above and operation thereof remain substantially the same as those of the twelfth embodiment described above.

Thus, according to the twelfth to seventeenth embodiments described above, the through anchor 210, 220, 230, 240, 250, 260 which is the webbing guide is constructed by insert molding the metal insert 211 with the coating resin 213, 223, 233, 243, 253, 263, and at least a part of the surface of the through anchor where the webbing is bought into sliding contact is constituted by the plated metal surface or stainless steel surface.

In other words, according to the twelfth to seventeenth embodiments, the coating resin 213, 223, 233, 243, 253, 263 is molded over the metal insert 211 of the through anchor 210, 220, 230, 240, 250, 260, and thereafter, for example, the metal plate of an iron material the surface of which is plated or a stainless steel plate 214, 224, 234, 244, 254, 264 is wound around the perimeter of the coating resin 213, 223, 233, 243, 253, 263, whereby the webbing sliding contact surface 215 is formed by the plated or stainless surface of the metal plate 214, 224, 234, 244, 254, 264.

In any of the embodiments, therefore, while the cost reduction can be aimed at through the simple construction, the deterioration with age in sliding contact between the through anchor 210, 220, 230, 240, 250, 260 and the webbing is reduced, thereby making it possible to continuously maintain the superior siding contact therebetween.

The present invention is not limited to the embodiments described heretofore and may suitably be changed or modified. For example, with respect to the metal surface to which plating is applied, the metal surface with which the webbing is brought into sliding contact does not have to be formed by winding the metal plate which is separately plated on the surface thereof around the coating resin as with the first to sixth embodiments, but a part of the metal insert is exposed from the coating resin and this exposed portion (or the whole metal insert) is plated to constitute the metal surface where the webbing comes into sliding contact.

EXAMPLE

Next, the effect of plating on the prevention of deterioration with age will be described below.

Figure 29:
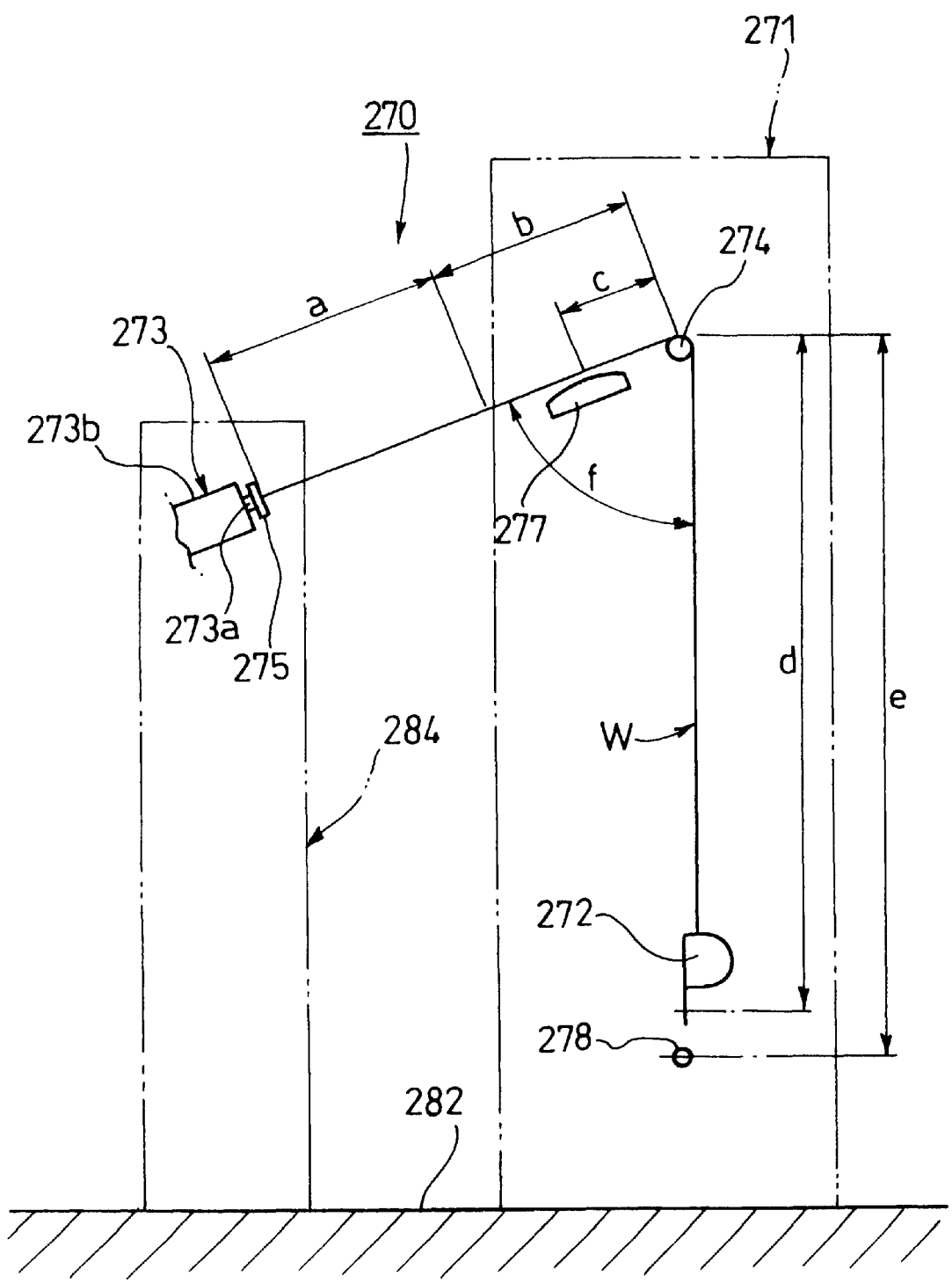
FIG. 29 is a schematic side view of a retractive excess force testing device.

FIG. 29 shows a schematic side view of a retractive excess force testing device for measuring retractive excess forces of various types of through anchors (A to C which will be described later). First, the construction of a retractive excess force testing device for use for this experiment will be described.

As shown in FIG. 29, in a retractive excess force testing device 270, webbing W of a seat belt assembly held on a seat belt holding stand 271 repeats operations of extension from and retraction into a retractor 272 in conjunction with the operation of a webbing extension and retraction air cylinder 273.

The seat belt holding stand 271 is provided on a base 282 so as to erect therefrom and holds the retractor 272 for the seat belt assembly, a through anchor 274, a simulated shoulder member 277 and the webbing W respectively at substantially the same positions as when they are actually mounted on a vehicle. Namely, the seat belt holding stand 271 holds the retractor 272 in which the webbing W is wound and stored in the vicinity of the distal end portion (at a lower end portion as viewed in FIG. 29), the through anchor 274 through which the webbing W is allowed to pass in the vicinity of an upper end portion as viewed in FIG. 29 a predetermined distance vertically apart from the retractor 272 and the simulated shoulder member 277 disposed in the vicinity of the through anchor 274.

The air cylinder 273 for extending and retracting the webbing is supported on an air cylinder supporting stand 284 with a predetermined posture and fixes the webbing W to an attachment plate 275 fixed to a cylinder rod 273a via a hunger member.

The air cylinder holding stand 284 is secured to the base 282 in a predetermined positional relationship with the seat belt supporting stand 271.

The webbing extension and retraction air cylinder 273 extends the webbing W which is in substantially the same state as a non-use state a predetermined amount a from the retractor 272 until the webbing W is put in substantially the same state as an occupant restraining state and allows the retractor 272 to retract thereinto the webbing W so extended until the webbing W returns to substantially the same state as a non-use state, i.e., only the predetermined amount a as a cylinder rod 273a advances from and withdraws into a cylinder main body 273b. In this example, the predetermined amount is set at 500 mm.

The radius of curvature of the simulated shoulder member 277 is set at about 500 mm, and the attachment position of the simulated shoulder member is set such that the center thereof is offset a predetermined amount c from the through anchor 274. In this example, the predetermined amount c is set at 200 mm. The surface of the simulated shoulder member 277 is covered with a polyester fabric, and after whether or not the tip of an upper surface of this polyester fabric comes into contact with the webbing W is confirmed, in this example the simulated shoulder member 277 is set such that it is pressed about 10 mm against the webbing W.

The retractor 72 is located a predetermined amount d, in this example about 690 mm, vertically below the through anchor 274. In addition, an angle formed by the webbing W via the through anchor 274 is set, in this example, at 70 degrees when viewed from the side f and 45 degrees when viewed from the top, respectively.

In addition, a lap outer 278 is provided a predetermined amount e, in this example about 780 mm, vertically below the through anchor 274. This lap outer 278 is used when the retractive excess force is measured by removing the webbing W attached to the webbing extension and retraction air cylinder 273, attaching the webbing W to the lap outer 278 and suspending a weight from the webbing W.

In this example, artificial sebum liquid is used to produce a sample having a deterioration tendency similar to that exhibited when actually deteriorated with age. Various types of known artificial sebum liquid may be used and used in this embodiment is an artificial sebum liquid in which oleic acid and protein are used as an organic constituent and mud is used as an inorganic constituent.

An experiment was carried out in such a manner that a predetermined amount of an artificial sebum produced in accordance with the above formula was applied once to the surface of the simulated shoulder member 277 every 100 times of extension and retraction of the webbing (one extension and one retraction are counted as one time) and that every time the predetermined number of times of extension and retraction of the webbing was attained, weights of a unit weight of 5 g were attached to the webbing attached to the lap outer 278. In this example, the weight of this weight is regarded as the retractive excess force (gf).

Figure 30:
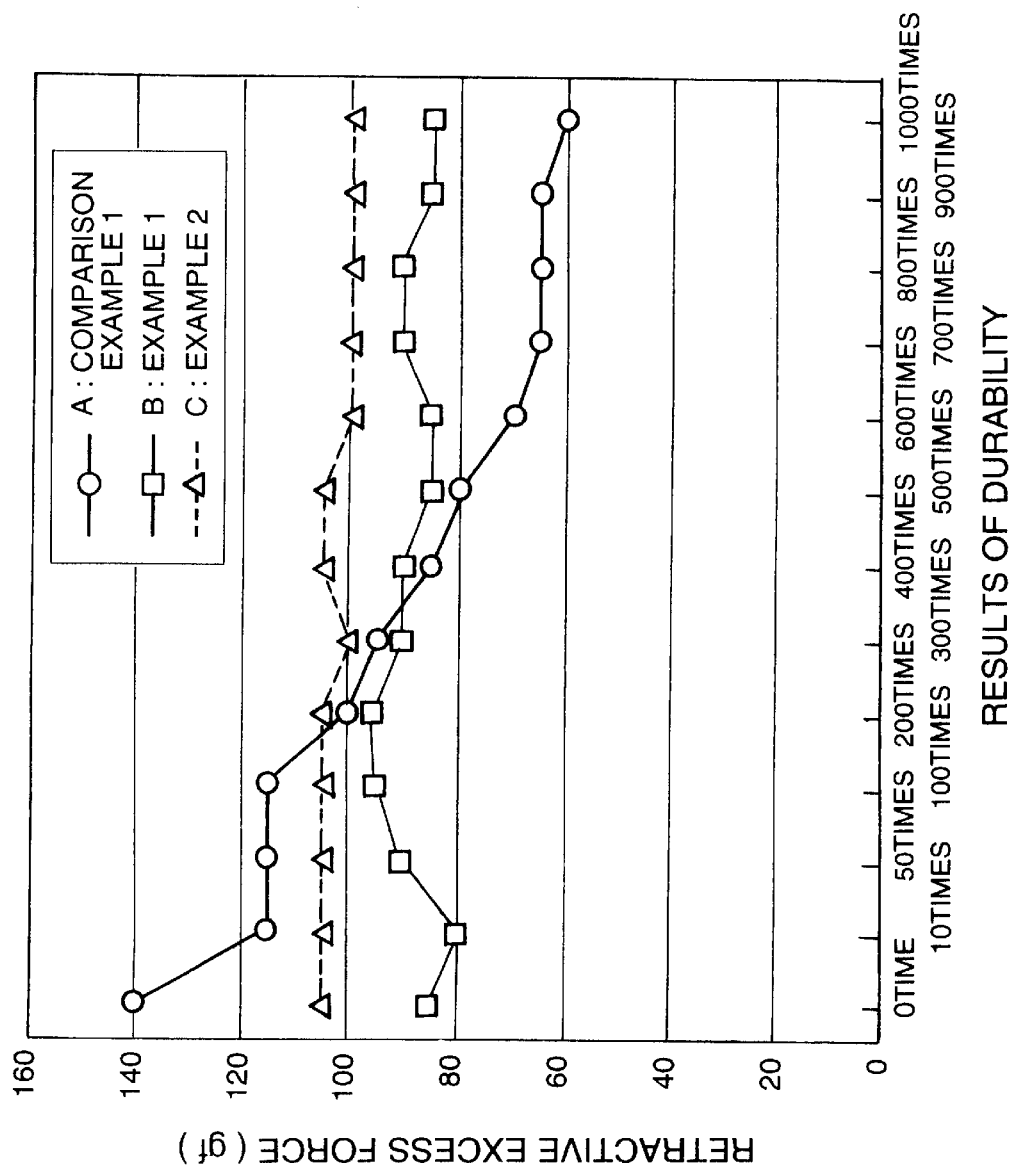
FIG. 30 is a graph plotting the results shown in Tables 1A and 1B.

The results of the experiment (Retractive Excess Force Durability Test for Various Types of Through Anchors) are shown in Tables 1A and 1B below, and a graph plotting Tables 1A and 1B2 are shown in FIG. 30. In Tables 1A and 1B, the through anchor A is a conventional through anchor in which a metal insert is insert molded in a coating resin (Comparison Example 1), the through anchor B is a through anchor in which an SUS plate is wound around a coating resin (Example 1), and the through anchor C is a through anchor in which a chrome plated steel plate is wound around a coating resin (Example 2). As to the method for winding the metal plates around the coating resin in Examples 1, 2, any of those described in the twelfth to seventeenth embodiments may be adopted.

TABLE 1A

| Sample | Number of Times for Durability (Number of Times of Extension and Retraction o Webbing) · Retractive Excess Force (gf) | | | | | |
|---|---|---|---|---|---|---|
| Through anchors | 0 time | 10 times | 50 times | 100 times | 200 times | 300 times |
| A | 140 | 115 | 115 | 115 | 100 | 95 |
| B | 85 | 80 | 90 | 95 | 95 | 90 |
| C | 105 | 105 | 105 | 105 | 105 | 105 |

TABLE 1B

| Sample | Number of Times for Durability (Number of Times of Extension and Retraction o Webbing) · Retractive Excess Force (gf) | | | | | | |
|---|---|---|---|---|---|---|---|
| Through anchors | 400 times | 500 times | 600 times | 700 times | 800 times | 900 times | 1000 times |
| A | 85 | 80 | 70 | 65 | 65 | 65 | 60 |
| B | 90 | 85 | 85 | 90 | 90 | 85 | 85 |
| C | 105 | 105 | 100 | 100 | 100 | 100 | 100 |

As is clear from Tables 1A and 1b and FIG. 30, it is found that although the through anchor A provided a relatively large value for the initial retractive excess force, the deterioration with age was great. On the contrary, with the through anchors B and C which are the objects of the invention, there was found almost no deterioration with age, and in particular, with the through anchor to which chrome plating was applied (the through anchor C), it is found that the retractive excess force was maintained stably at a certain value.

Next, referring to FIGS. 31 to 33, an eighteenth embodiment of the invention will be described below.

Figure 31:
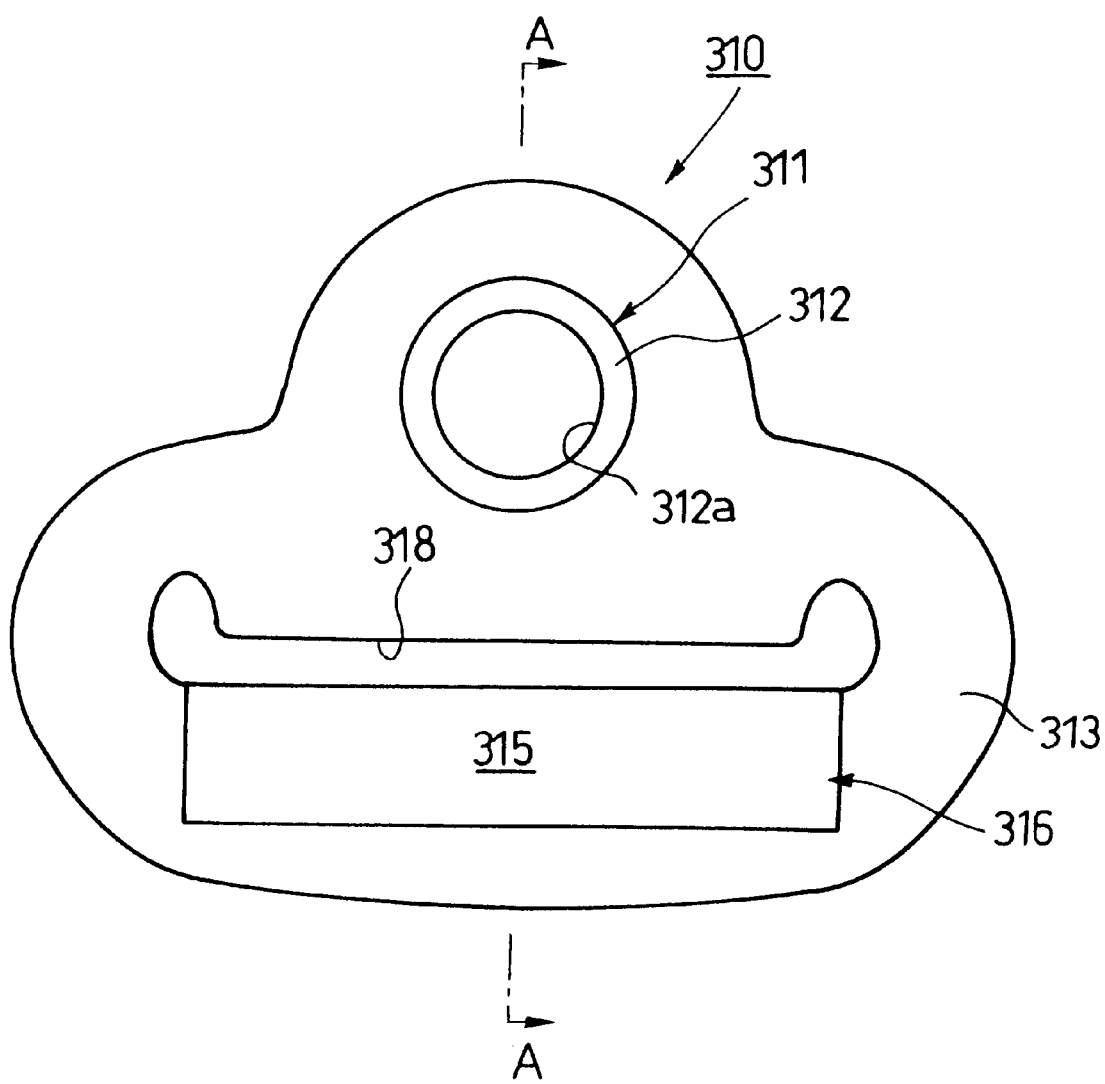
FIG. 31 is a front view showing a through anchor of the seat belt assembly according to an eighteenth embodiment of the invention.
Figure 32:
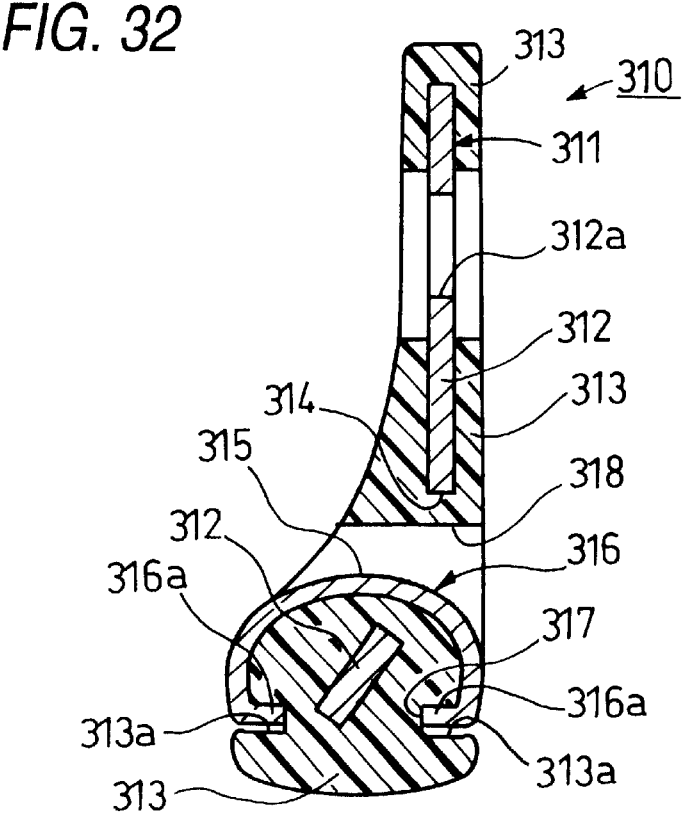
FIG. 32 is a sectional view of the through anchor of FIG. 31 as viewed in a direction indicated by arrows A.
Figure 33:
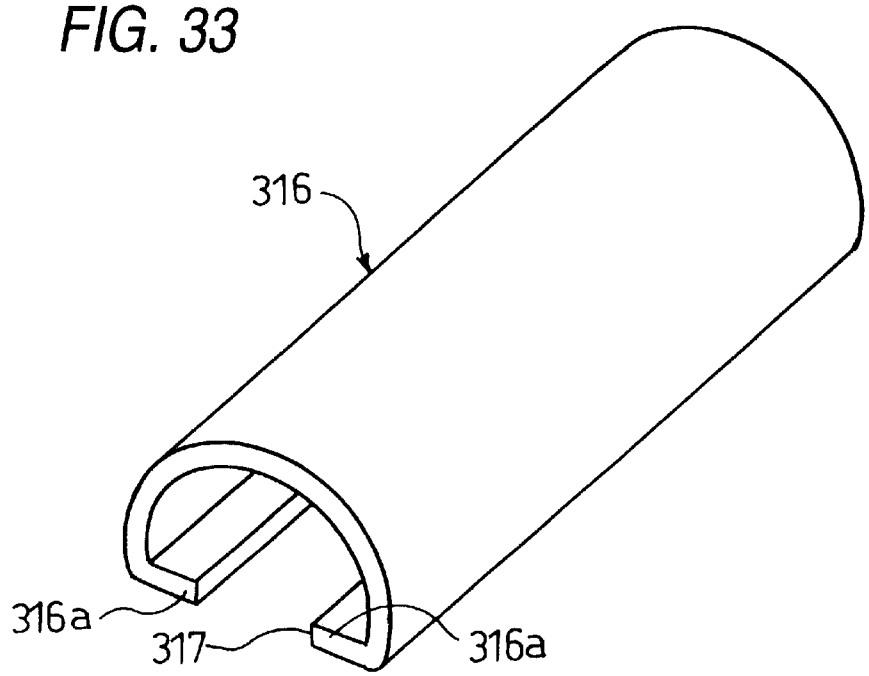
FIG. 33 is a perspective view showing a resin cover for the through anchor of FIG. 31.

FIG. 31 is a front view showing a through anchor of the seat belt assembly according to the eighteenth embodiment of the invention, FIG. 32 is a sectional view of the through anchor of FIG. 31 as viewed in a direction indicated by arrows A, and FIG. 33 is a perspective view of a resin cover for the through anchor.

Referring to FIGS. 31 to 33, in this embodiment, a through anchor 310 is constructed by insert molding a metal insert 311 which is formed to be a required configuration from a single metal plate with a coating resin 313. A resin cover 316 is fitted over the through anchor 310 at a position where webbing is brought into sliding contact therewith.

In other words, the through anchor 310 is covered with the coating resin 313, which is molded so as to form a required configuration in the periphery of an opening 314 formed in the metal insert 311. In the through anchor 310, the resin cover 316 is fitted over the coating resin 313 around a lower edge of the opening 314 to thereby form a sliding contact surface 315 with which the webbing is brought into sliding contact on the surface of the resin cover 316 (hereinafter, referred to as a "web sliding contact surface 15").

A bolt hole 312a is formed in the metal insert 311 at an upper portion thereof as shown in FIG. 31 through which a bolt (not shown) or the like is allowed to pass so as to rotatably support the through anchor 310 on a center pillar of a vehicle body.

The resin cover 316 is formed into a required configuration which is close to a cylindrical configuration and has a cut-out portion 317 formed along a longitudinal direction. The resin cover 316 is inserted into a webbing pass-through gap 318 formed in the through anchor 310 over which the coating resin 313 is molded and is fitted over the coating resin 313 molded around the lower edge of the opening 314 while being elastically deformed with the cut-out portion 317 being forced to open. Then edge portions 316a extending in a width direction of the resin cover 316 are eventually fitted in attachment grooves 313a formed in the coating resin 313 around the opening lower edge. The resin cover 316 is formed of a plating grade item such as POM, nylon and ABS and is plated on the surface thereof.

Namely, the adhesion of foreign particles to the surface of the resin cover 316 is suppressed by the plating applied thereto, and the surface so plated constitutes the webbing sliding contact surface 315 which can continue to provide good sliding contact with the webbing. Here, raised as representatives of the plating grade item are Lennie E40 polyamide resin by Mitsubishi Engineering Plastics Co., Ltd. and Toyobo Nylon 6 (T-777-02, T-779) by Toyobo Co., Ltd. In addition, as the type of plating, rigid chrome plating is preferred, but any other type of plating may be used including chrome, nickel, electroless, cobalt, tin-cobalt plating.

The data shown in Tables 1A and 1B and FIG. 30 can be used as supporting data to prove that the resin cover 316 which is plated on the surface thereof can continue to provide good sliding contact with the webbing. In other words, the data shown in Tables 1A and 1B and FIG. 30 prove that the plated metal surface can continue to provide good sliding contact with the webbing, but the same can be proved even when the object for plating is changed from the metal surface to the surface of the resin cover 316. Features of the construction of the through anchor 310 other than what is described above and the materials of the metal insert and the coating resin remain substantially the same as those described with reference to the first embodiment.

The operation of this embodiment will be described below.

In the seat belt assembly, webbing for restraining an occupant in a seat in which he or she is seated is allowed to pass through the webbing pass-through gap 318 in the through anchor 310 and is brought into sliding contact with the webbing sliding contact surface 315 of the resin cover 316, whereby the webbing is guided by the through anchor 310. The through anchor 310 guides the webbing while allowing the webbing to be in good sliding contact with the plated webbing sliding contact surface 315 of the resin cover 316.

Thus, according to this embodiment, since the plating is applied to the surface of the resin cover 316 fitted over the coating resin 313 molded around the lower edge of the opening 314 so as to form the webbing sliding contact surface 315, the adhesion of foreign particles to the webbing sliding contact surface 315 can positively be suppressed.

Therefore, this serves to secure good sliding contact between the through anchor 310 and the webbing, whereby the good sliding contact with the webbing can continue to be maintained for a long period of time.

Next, referring to FIGS. 34 to 51, nineteenth to twenty-fourth embodiments of the invention will be described below.

Figure 34:
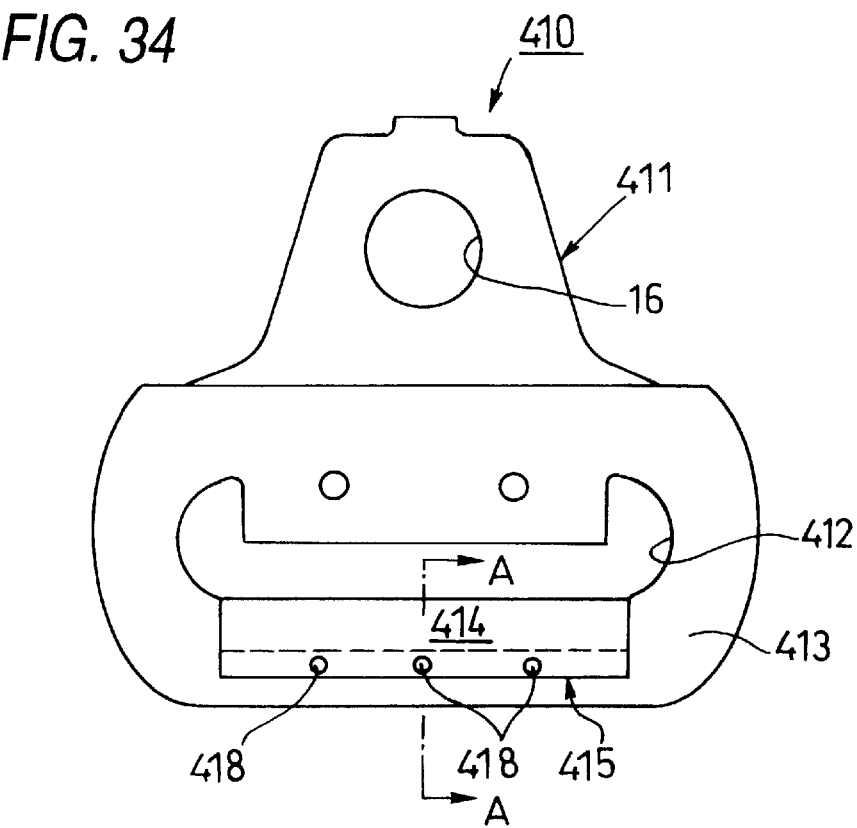
FIG. 34 is a front view showing a through anchor according to a nineteenth embodiment of the invention.
Figure 35:
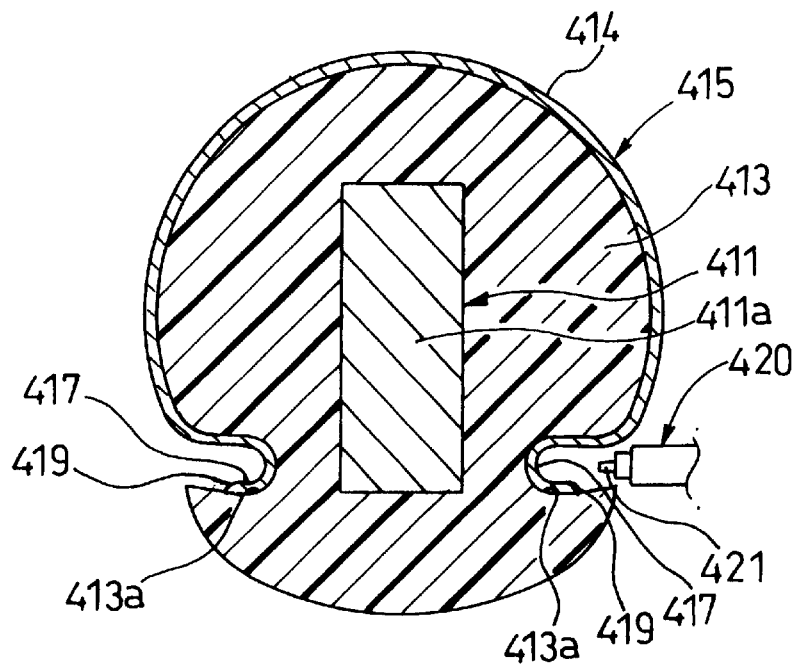
FIG. 35 is a sectional view of the through anchor of FIG. 34 as viewed in a direction indicated by arrows A.
Figure 36:
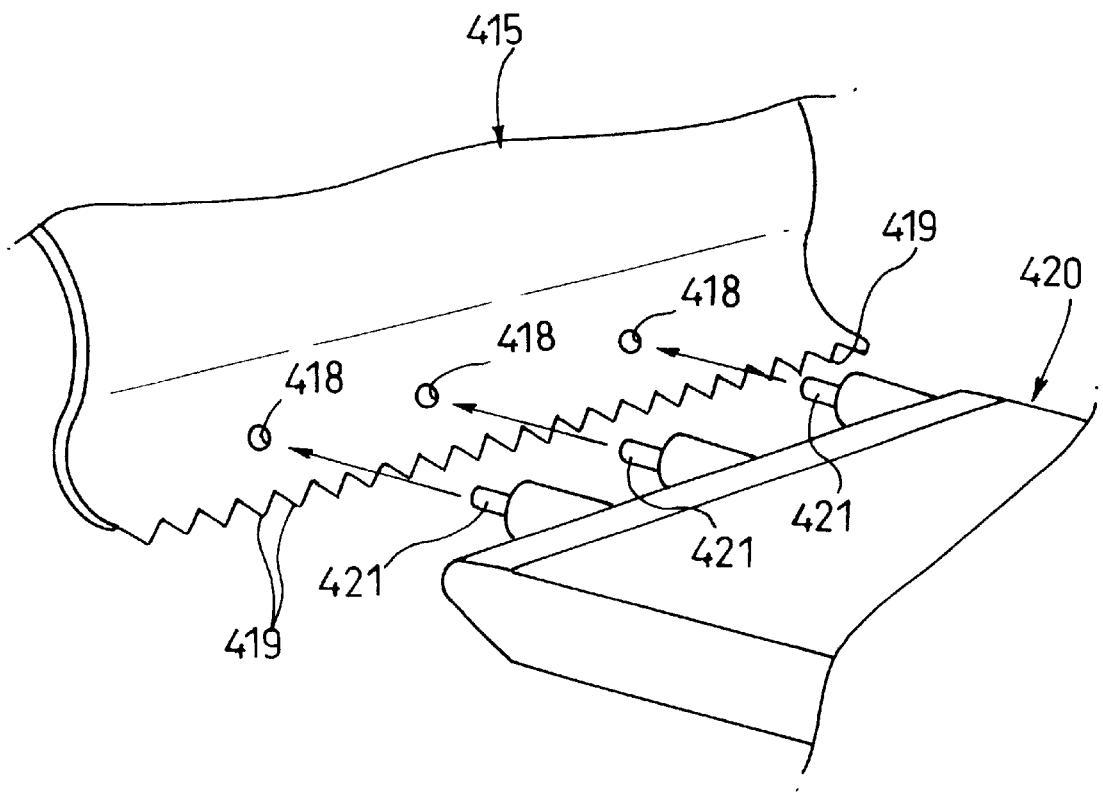
FIG. 36 is a perspective view showing one edge of a metal plate in a webbing pass-through direction and a fixture.
Figure 37:
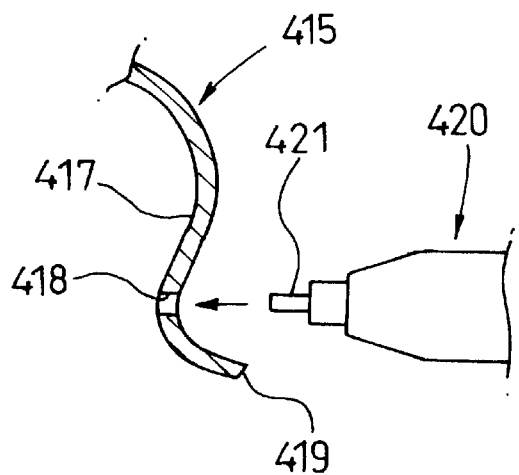
FIG. 37 is a sectional view of FIG. 36.

FIG. 34 is a front view showing a through anchor 410 according to a nineteenth embodiment of the invention, and FIG. 35 is a sectional view of the through anchor 410 of FIG. 34 as viewed in a direction indicated by arrows A. FIG. 36 is a perspective view showing one edge portion of a metal plate in a webbing pass-through direction and a fixture, and FIG. 37 is a sectional view of FIG. 36.

In these figures, the through anchor 410 is constructed integrally by insert molding a metal insert 411 which is formed to be a required configuration worked a single metal plate with a coating resin 413. A portion of the through anchor 410 with which webbing (not shown) is brought into sliding contact is constituted by a metal surface which is formed by fixing a metal plate 415 of a required configuration thereto.

In other words, the through anchor 410 is coated with the coating resin 413 which is molded around a webbing pass-through opening 412 of the insert metal 411 in a cross-sectional configuration as shown in FIG. 35. The metal plate 415 is fixed to an external surface of the coating resin 413 around a lower edge 411a of the webbing pass-through opening 412, and an external surface of the metal plate 415 constitutes a sliding contact surface 414 with which the webbing is brought into sliding contact (hereinafter, referred to as a "webbing sliding contact surface 414").

A pair of fitting grooves 413a comprising inwardly expanding spaces is formed in predetermined positions on both left- and right-hand sides of an external surface of the coating resin 413 molded around the lower edge 411a of the webbing pass-through opening 412 in conjunction with the forcible release (forcible removal) of a mold when molding the coating resin 413 using the mold. Edge portions 417 of the metal plate 415 in a webbing pass-through direction (a direction normal to the surface of the drawing as viewed in FIG. 34) are fitted respectively in the fitting grooves 413a to thereby secure the fixation of the metal plate 415 to the coating resin 413.

The respective edge portions 417 of the metal plate 415 constituting the webbing sliding contact surface 414 in the webbing pass-through direction are pre-worked in advance so as to be formed into a curved configuration matching the sectional configuration of the fitting groove 413a of the coating resin 413.

The metal plate 415 is inserted into the webbing pass-through opening 412 in the metal insert 411 in the webbing pass-through direction, so that the edge portions 417 in the webbing pass-through direction are pressed by a fixture 420, whereby the metal plate 415 is deformed so as to follow the external surface of the coating resin 413 molded around the lower edge 411a of the webbing pass-through opening 412 and the edge portions 417 of the metal plate 415 in the webbing pass-through direction are fitted respectively in the fitting grooves 413a in the coating resin 413.

A plurality of (three in FIG. 34) guide holes 418 are formed in the edge portions 417 of the metal plate 415 in the webbing pass-through direction at predetermined intervals in a width direction (a transverse direction in FIG. 34) of the metal plate 415. Projections 412 provided on the fixture 420 in such a manner as to project therefrom are inserted through the respective guide holes 418 when the metal plate 415 is pressed by the fixture 420. The widthwise deviation of the metal plate 415 taking place in conjunction with pressing by the fixture 420 is prevented by virtue of the insertion of the projections 421 of the fixture 420 into the respective guide holes 418.

In addition, claw portions 419 are formed in the tip of the respective edge portions 417 of the metal plate 415 in the webbing pass-through direction. The respective claw portions 419 are formed as serration shaped along the width direction of the metal plate 415 and are adapted to bite into the coating resin 413 as the metal plate 415 is pressed by the fixture 420, so that the fixation of the metal plate 415 to the coating resin 413 is secured.

Features of the construction of the through anchor other than what is described above and the materials of the metal insert and the coating resin remain substantially the same as those of the first embodiment.

Next, the operation of the nineteenth embodiment of the invention will be described below.

The through anchor 410 allows the webbing of the seat belt assembly (not shown) for restraining an occupant in a seat in which he or she is seated to pass through the webbing pass-through opening 412 in the metal insert 411 in such a manner as to be brought into sliding contact with the webbing sliding contact surface 414, whereby the webbing is guided by the through anchor 410. The through anchor 410 guides the webbing while allowing the webbing to be in good sliding contact with the webbing sliding contact surface 414 which is constituted by the external surface (metal surface) of the metal plate 415.

A method for producing the through anchor 410 will be described below.

First, the periphery of the webbing pass-through opening 412 formed in the metal insert 411 is covered with the coating resin 413 in such a manner as to form the required configuration as shown in FIG. 35, and the pair of the fitting grooves 413a are formed in the required configuration in the predetermined positions on the external surface of the coating resin 413 molded around the lower edge 411a of the lower edge of the webbing pass-through opening 412 in conjunction with the forcible release of the mold when molding the coating resin 413 using the mold.

Next, the metal plate 415 whose edge portions 417 in the webbing pass-through direction are worked so as to be formed into a configuration matching the respective fitting grooves 413a of the coating resin 413 is inserted into the webbing pass-through opening 412 of the metal insert 411 in the webbing pass-through direction.

Moreover, the projections 421 of the fixture 420 are inserted through the guide holes 418 formed in the respective edge portions 417 of the metal plate 415.

In this state, the edge portions 417 of the metal plate 415 are respectively pressed toward the respective fitting grooves of the coating resin 413 by means of the fixture 420. This deforms the metal plate 415 along the external surface of the coating resin 413 molded around the lower edge 411a of the webbing pass-through opening 412 and causes the edge portions 417 of the metal plate 415 to fit in the respective fitting grooves 413a in the coating resin 413. When this happens, since the respective grooves 413a are formed as an inwardly expanding space, it becomes difficult for the respective edge portions 417 to be dislocated.

Then, as the metal plate 415 is pressed by the fixture 420, the respective claw portions 419 formed in the tips of the respective edge portions 417 of the metal plate 415 bite into the coating resin 413.

This serves to securely fix the metal plate 415 to the external surface of the coating resin 413, whereby the webbing sliding contact surface 414 is constituted by the external surface of the metal plate 415.

Thus, according to the nineteenth embodiment of the invention, the metal plate 415 of the required configuration is inserted into the webbing pass-through opening 412 of the metal insert 411 along the webbing pass-through direction, and the projections 421 provided on the fixture 420 in such a manner as to project therefrom are inserted through the respective guide holes 418 formed in the respective edge portions 417 in the webbing pass-through direction. In this state, the edge portions 417 of the metal plate 415 are respectively pressed by the fixture 420 toward the interior of the respective fitting grooves 413a in the coating resin 413, whereby the metal plate 415 is caused to follow the external surface of the coating resin 413 molded around the lower edge of the webbing pass-through opening 412 and the respective edge portions 417 of the metal plate 415 are fitted in the respective fitting grooves 413a in the coating resin 413, whereby the metal plate 415 is fixed to the external surface of the coating resin 413. Thus, the webbing sliding contact surface 414 is constructed by the external surface of the metal plate 415.

Thus, this embodiment can easily be applied to the molded-type through anchor which currently constitutes the main stream of through anchors. While good retractability and durability of the webbing can be obtained by constituting the webbing sliding contact surface 414 composed of the metal surface, configurations that can be obtained may easily be changed by changing the shapes of the coating resin 413 and the metal plate 415. Thus, this serves to eliminate any limitation to obtainable configurations, and therefore the production thereof can be made simple, this reducing the costs.

Figure 38:
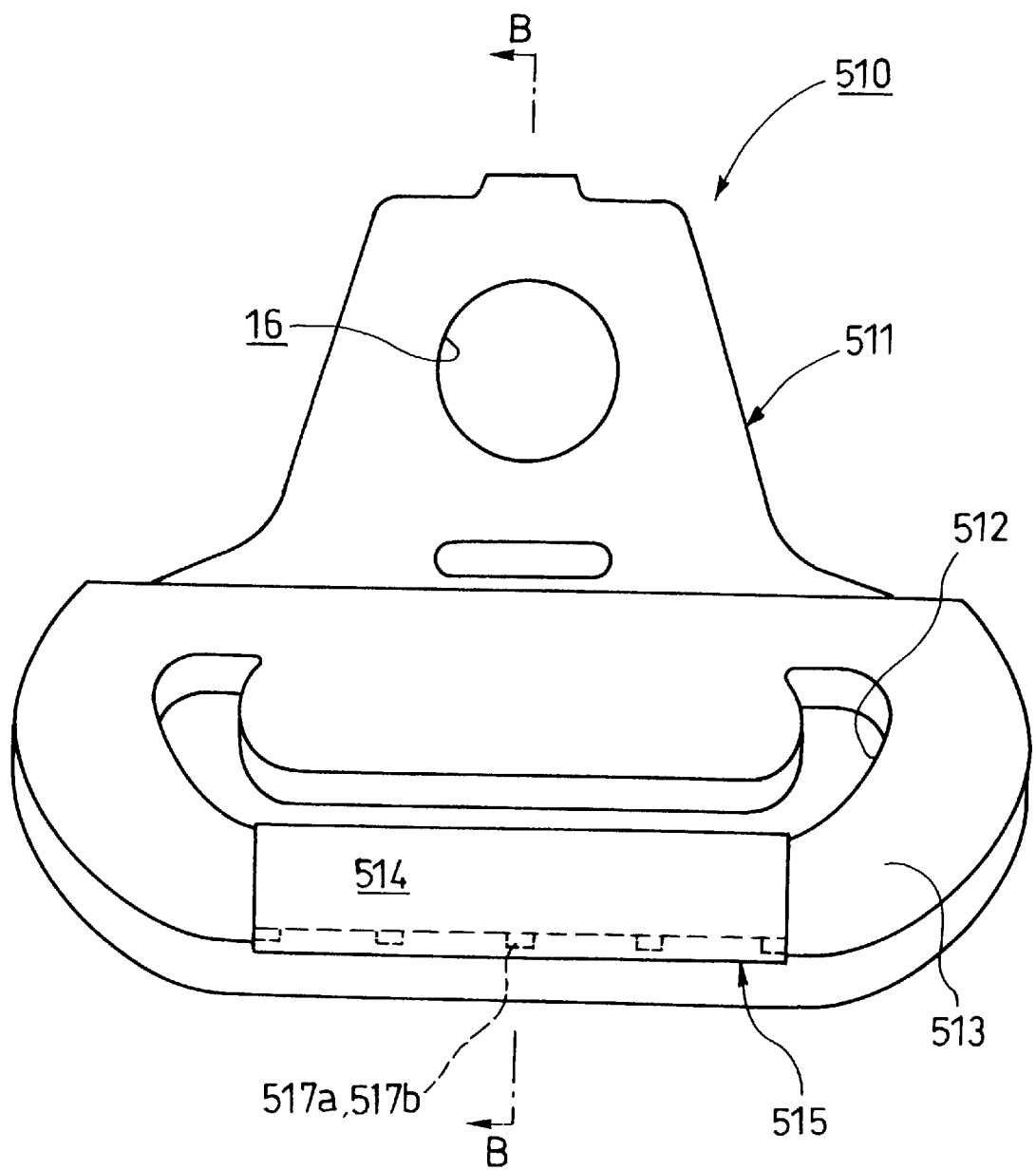
FIG. 38 is a front view showing a through anchor according to a twentieth embodiment of the invention.
Figure 39:
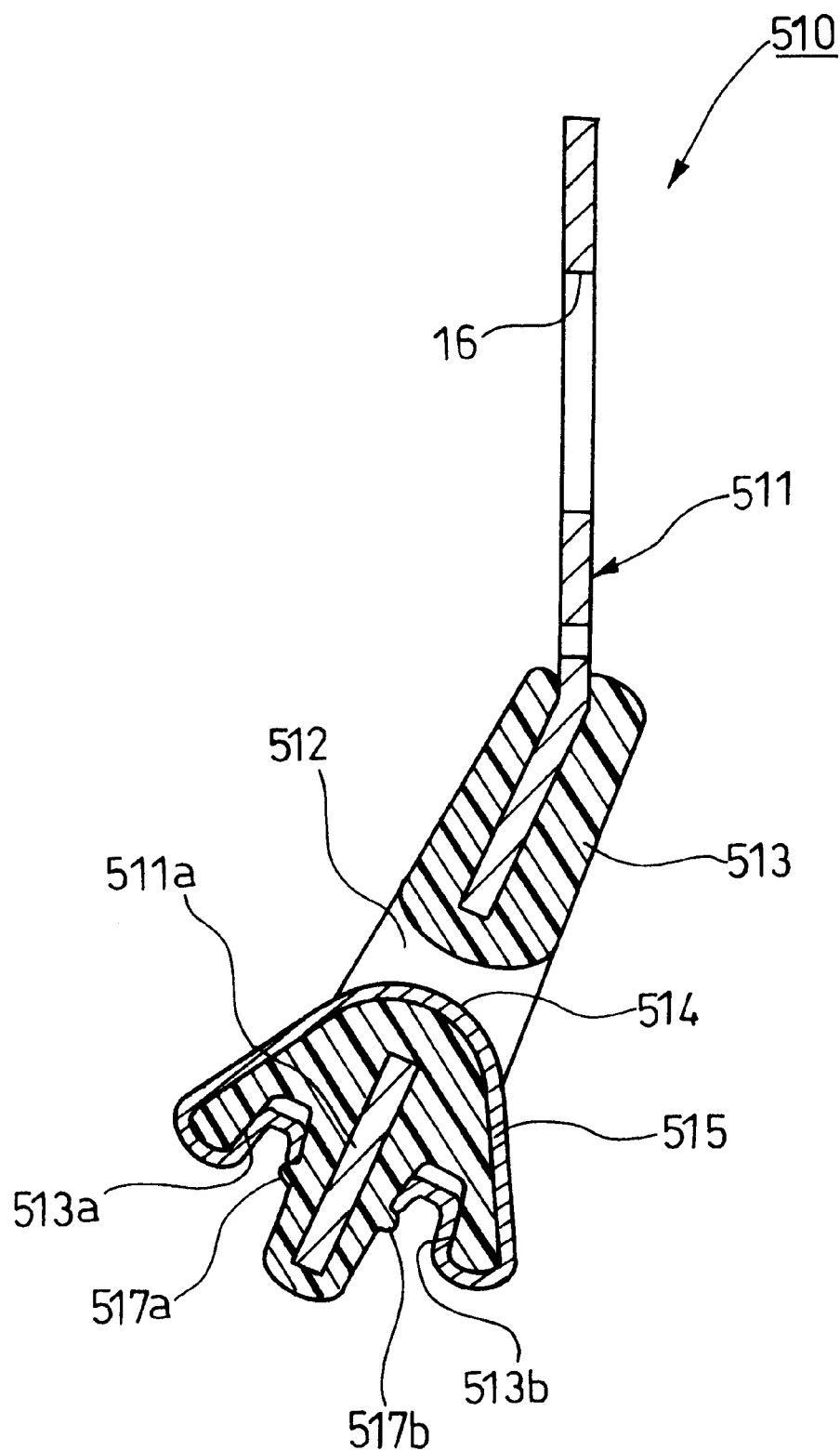
FIG. 39 is a sectional view of the through anchor of FIG. 38 as viewed in a direction indicated by arrows B.

Next, a twentieth embodiment of the invention will be described. FIG. 38 is a front view showing a through anchor 510 of the twentieth embodiment of the invention, and FIG. 39 is a sectional view of the through anchor 510 of FIG. 38 as viewed in a direction indicated by arrows B.

Similarly with the nineteenth embodiment, the through anchor 510 is constructed by integrally insert molding a metal insert 511 to be found a required configuration from a single metal plate with a coating resin. In addition, a bolt pass-through hole 16 is opened in the metal insert 511 at an upper portion thereof as shown in FIG. 38. A metal plate 515 of a required configuration is fixed to a portion of the through anchor 510 where webbing (not shown) is brought into sliding contact. That is, a webbing sliding contact surface 514 is formed by the metal surface In addition, the through anchor 510 of the twentieth embodiment is preferably formed from the same material as that used for the through anchor 410 of the nineteenth embodiment, and the thickness thereof preferably ranges in the order of 0.1 to 0.3 mm.

The through anchor 510 of the twentieth embodiment is different from the through anchor 410 of the nineteenth embodiment. The twentieth embodiment has fitting grooves 513a, 513b and projections 517a, 517b. The fitting grooves 513a, 513b is formed at positions on the under side of the external surface of the coating resin 513 molded around a lower edge 511a of a webbing pass-through opening 512. The projections 517a, 517b is formed on the surface of the coating resin forming the fitting grooves 513a, 513b on the sides closer to the metal insert. These projections 517a, 517b hold the metal plate 515 and prevent the dislocation of the metal plate 515 while the webbing slides. In FIG. 38, while the projections 517a, 517b are formed at a suitable interval, they may be formed continuously without any interval being provided therebetween.

Referring to FIGS. 40 to 43, a method for producing the through anchor 510 of the twentieth embodiment will be described.

FIGS. 40 to 43 show the lower edge 511a of the webbing pass-through opening 512 of the through anchor 510 of the twentieth embodiment, and an upper side of the through anchor 10 is omitted.

Figure 40:
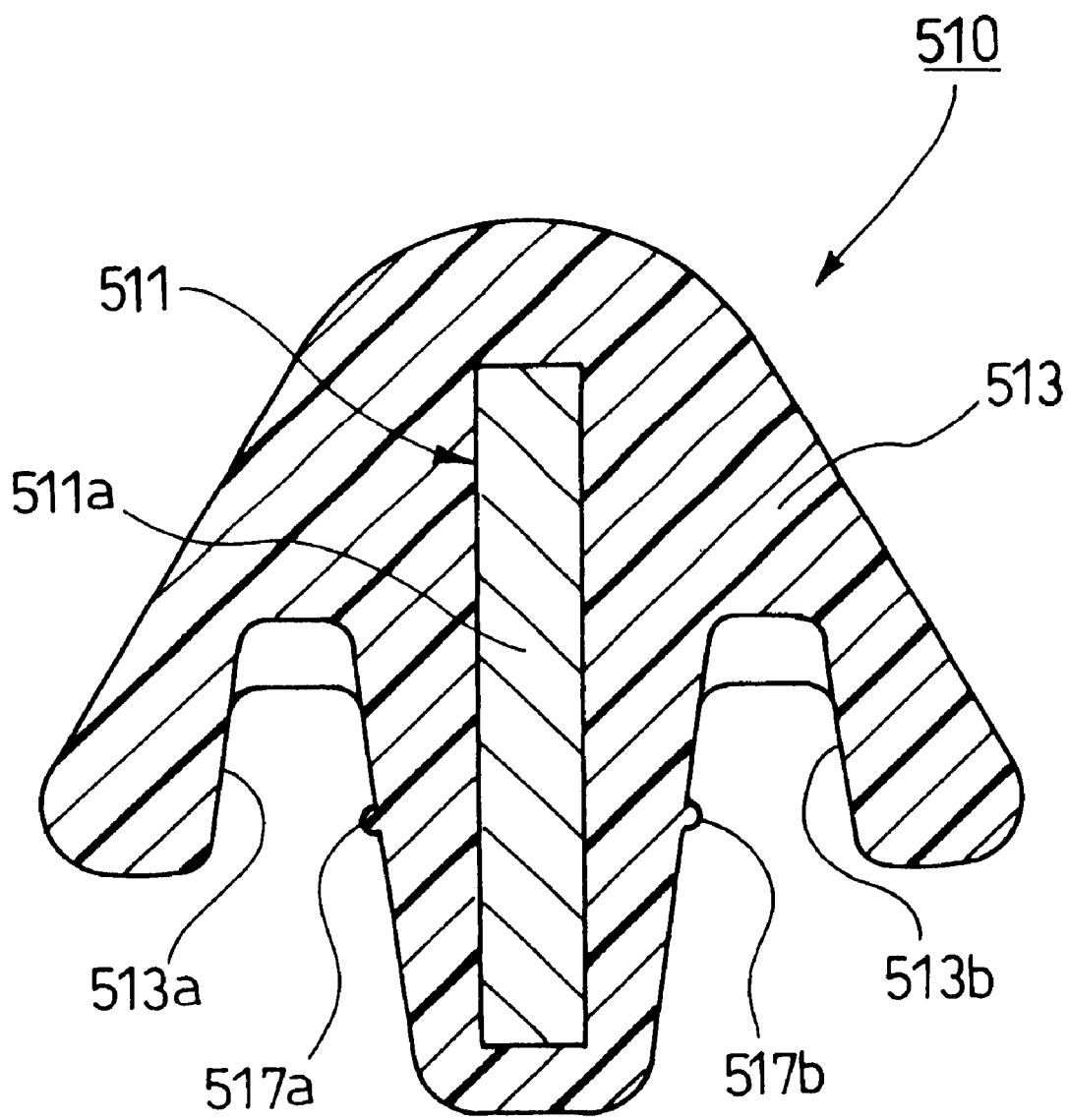
FIG. 40 is a sectional view showing a production process of the through anchor according to the twentieth embodiment.

First, the periphery of the webbing pass-through opening 512 formed in the metal insert 511 is coated with the coating resin 513 in a required configuration as shown in FIG. 40, while the fitting grooves 513a, 513b are formed in the positions on the under side of the external surface of the coating resin 513 molded around the lower edge 511a of the webbing pass-through opening 512. Then the projections 517a, 517b are formed on the coating resin surface forming the fitting grooves 513a, 513b on the sides closer to the metal insert side. The fitting grooves and projections are formed through, for example, an injection molding method. In order to form the fitting grooves 513a, 513b and the projections 517a, 517b at this process, for example, a slide core is used.

Figure 41:
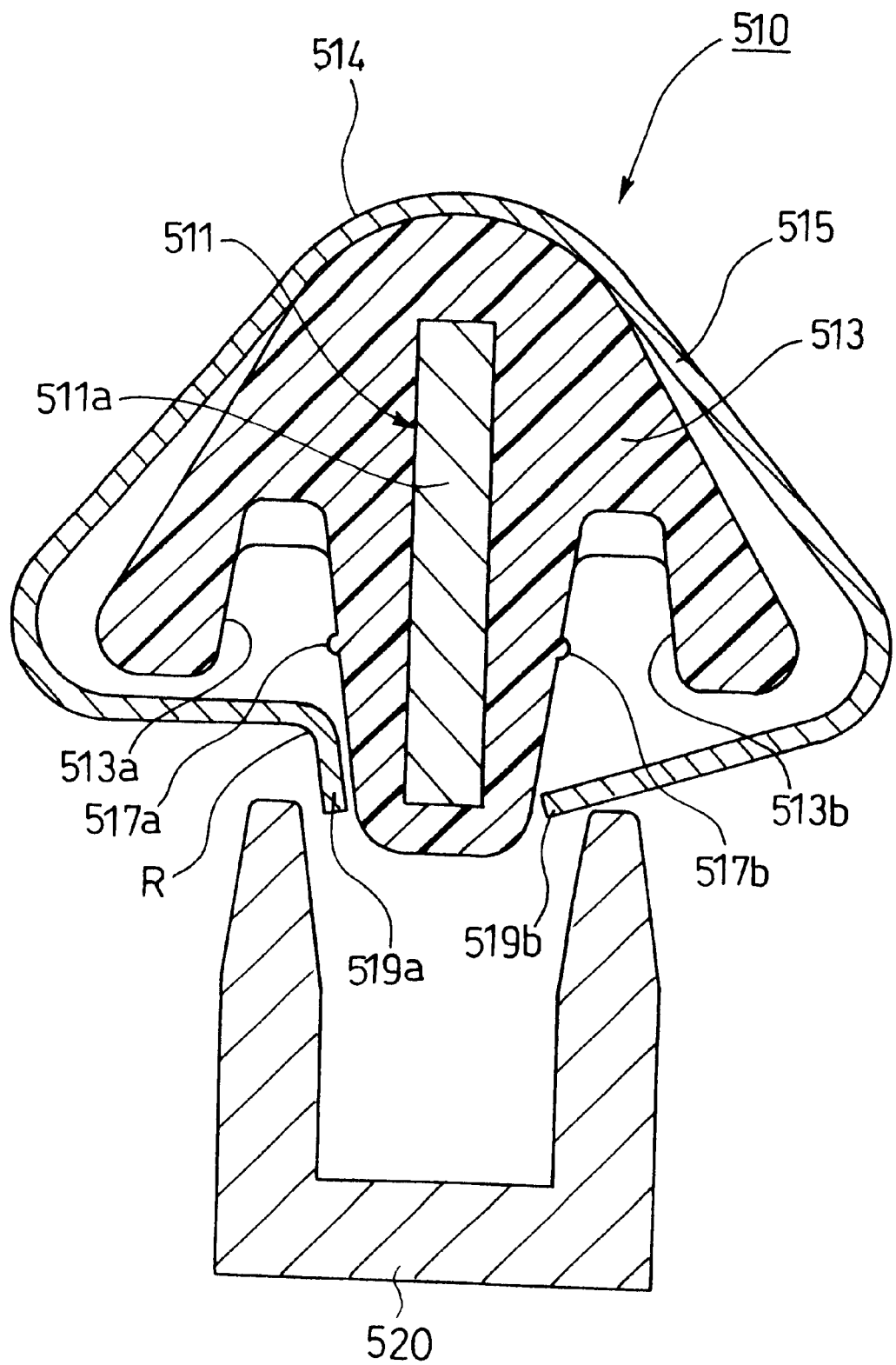
FIG. 41 is a sectional view showing the production process of the through anchor according to the twentieth embodiment.

Next, as shown in FIG. 41, the metal plate 515 is wound around the surface of the coating resin 513, and furthermore, the metal plate 515 is folded (reference sign R in FIG. 41) in the vicinity of at least one of edge portions 519a, 519b of the metal plate 515 in the webbing sliding contact direction in such a manner that the internal surface of the metal plate 515 comes into contact with the surface of the coating resin 313 positioned on the under side of the fitting grooves 513a, 513b. Furthermore, the fixture 520 is inserted from a under lower side toward an upper side of the through anchor 510 into the fitting grooves 513a, 513b, whereby the metal plate 515 is press fitted into the fitting grooves 513, 513b.

Figure 42:
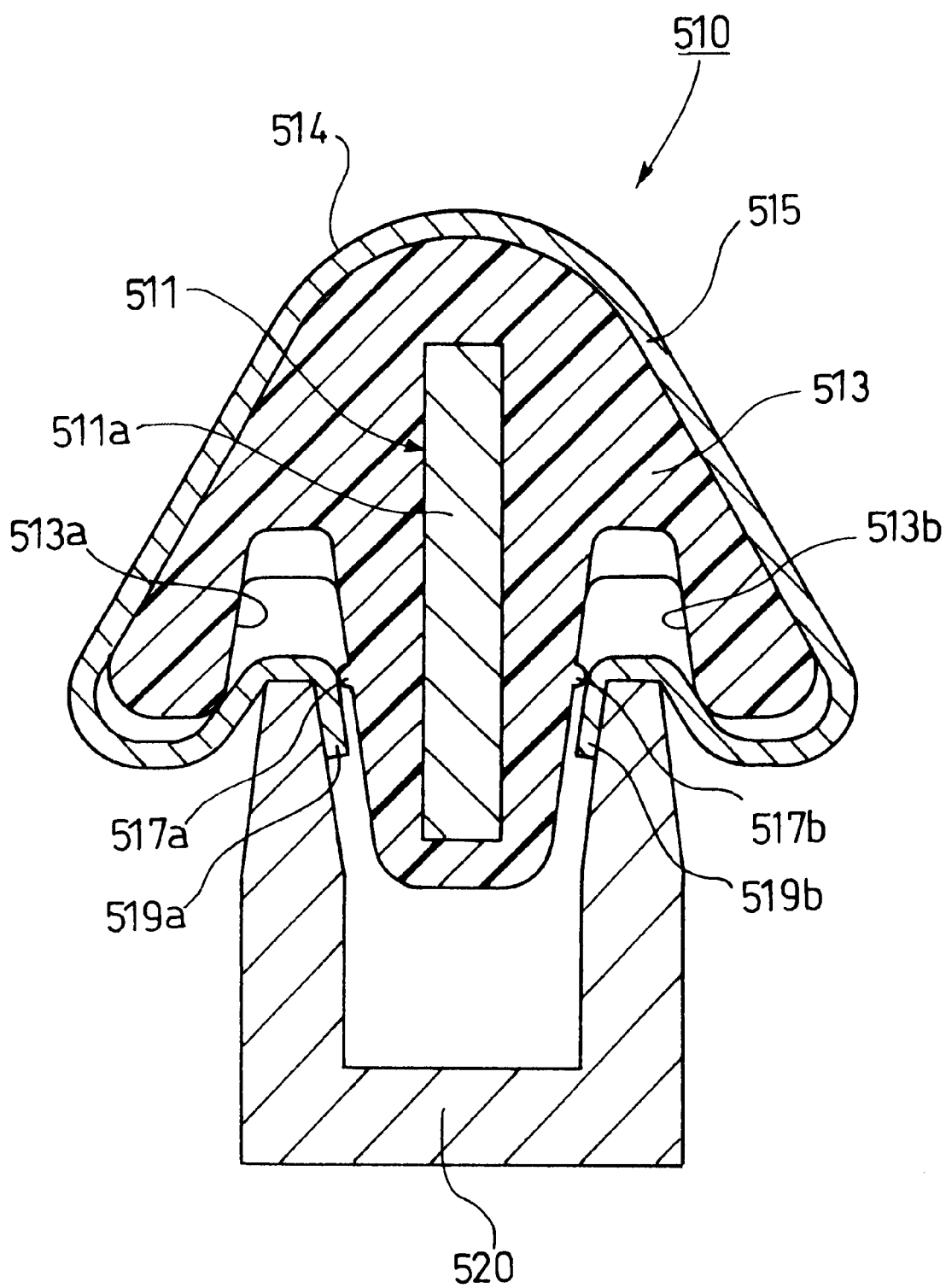
FIG. 42 is a sectional view showing the production process of the through anchor according to the twentieth embodiment.

When the fixture 520 continues to be inserted further into the fitting grooves 513a, 513b, the metal plate 515 is pulled toward the edge portions 519a, 519b thereof. When this happens, the metal plate 515 is deformed so as to follow the surface configuration of the coating resin 513. As shown in FIG. 42, the back side of the webbing sliding contact surface 514 of the metal plate 515 is brought into tight contact with the upper surface of the coating resin as shown in FIG. 42. The edge portions 519a, 519b of the metal plate 515 are then deformed so as to follow the surface configuration of the fixture 520, resulting in a state in which the edge portions 519a, 519b fit into the fitting grooves 513a, 513b, respectively.

Figure 43:
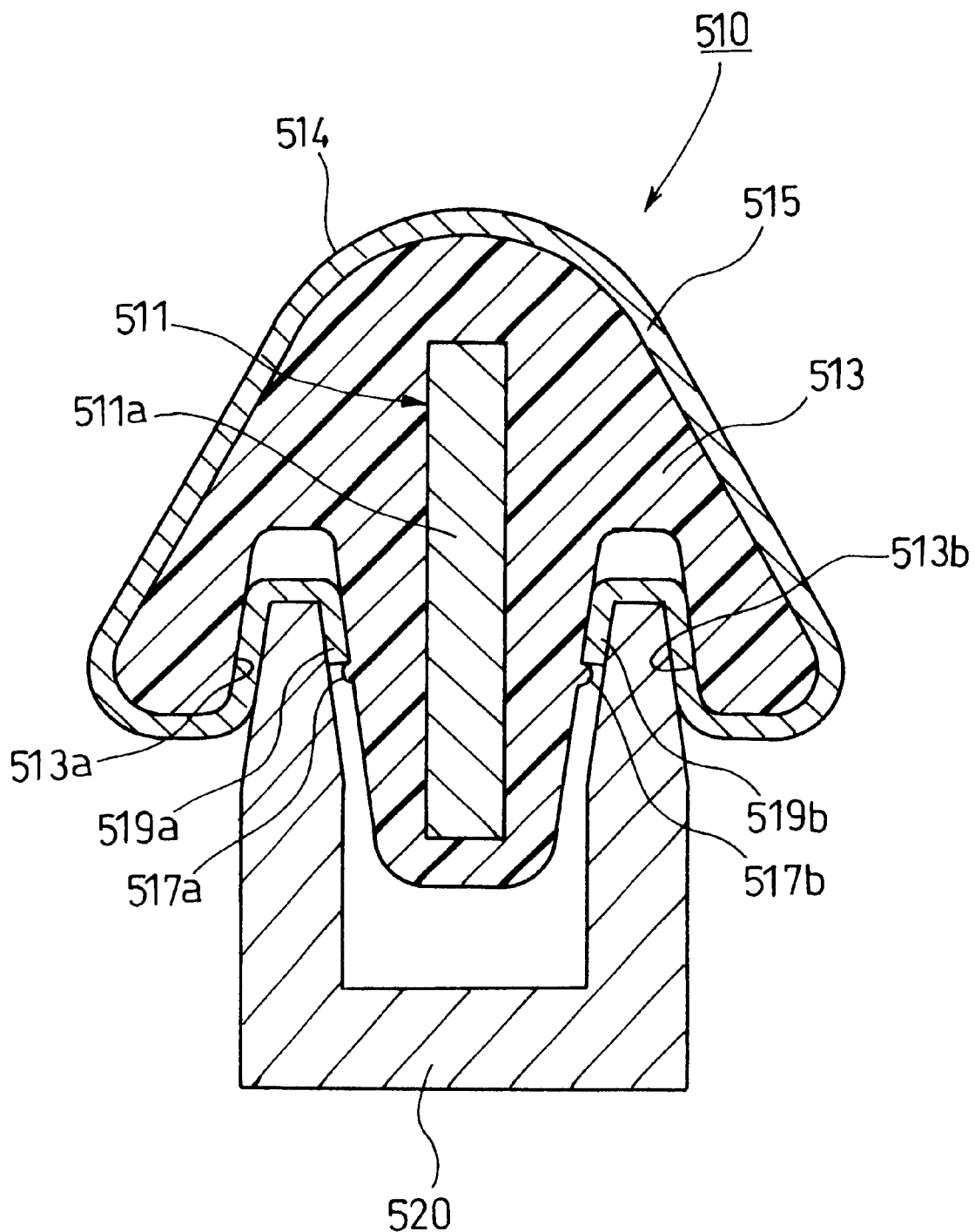
FIG. 43 is a sectional view showing the production process of the through anchor according to the twentieth embodiment.

When the fixture 520 continues to be inserted further from the state shown in FIG. 42, as the metal plate 515 is press fitted into the fitting grooves 513a, 513b, the metal plate 515 is deformed so as to follow the surface configuration of the coating resin 513. As a result of this, as shown in FIG. 43, the metal plate 515 is completely joined to and wound around the coating resin 513. Then, the edge portions 519a, 519b of the metal plate 515 are locked and held by the projections 517a, 517b.

Then, the fixture 520 is removed and therefore the state shown in FIG. 39 is produced. Thus, the attachment of the metal plate 515 is completed.

According to the above production method, since the metal plate 515 is tightly joined to the coating resin 515 for fixation thereto, for example, even when a large magnitude of load is applied in conjunction with the sliding of the webbing, the dislocation of the metal plate 515 can be prevented.

Figure 44:
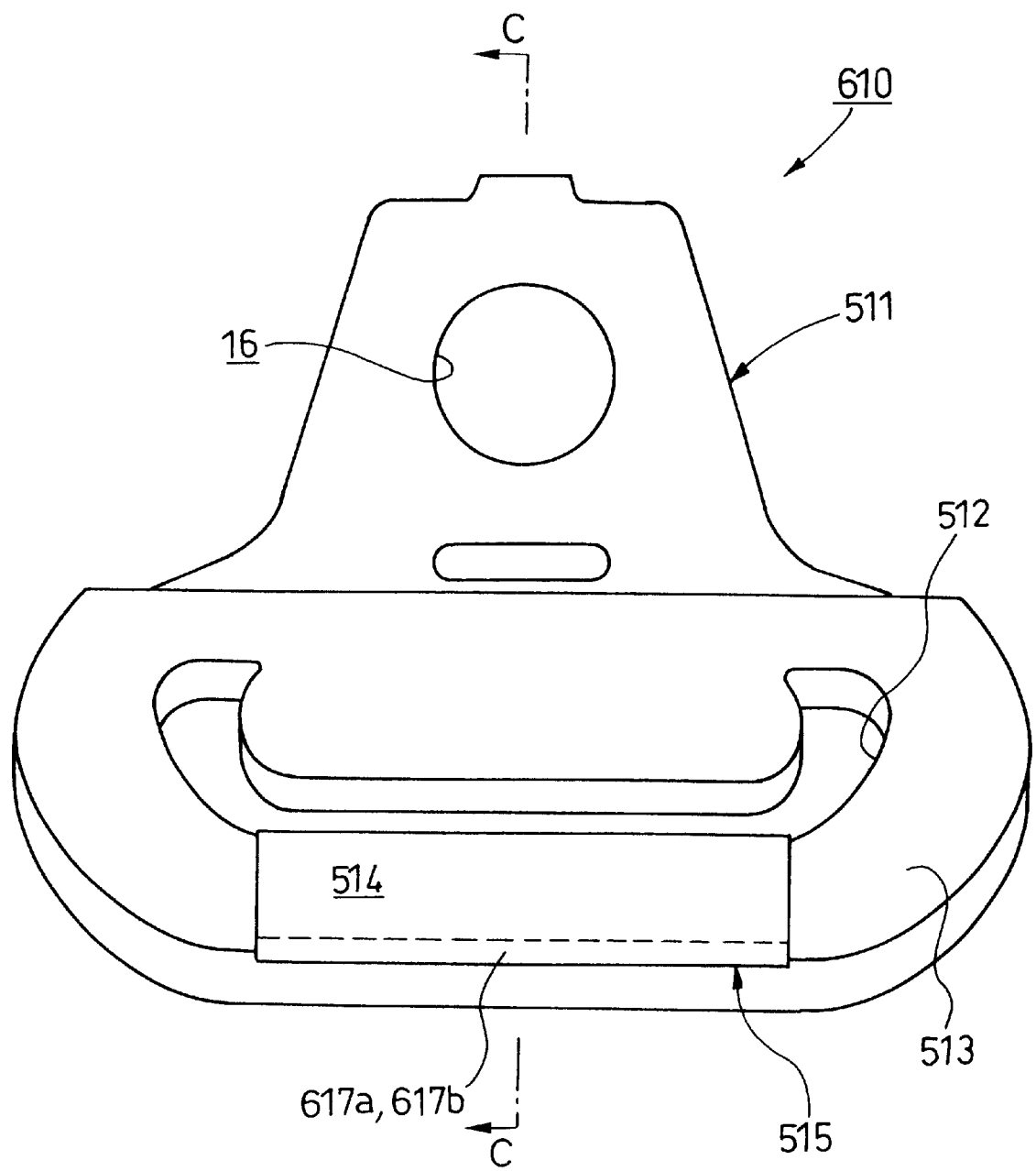
FIG. 44 is a front view of a through anchor according to a twenty-first embodiment of the invention.
Figure 45:
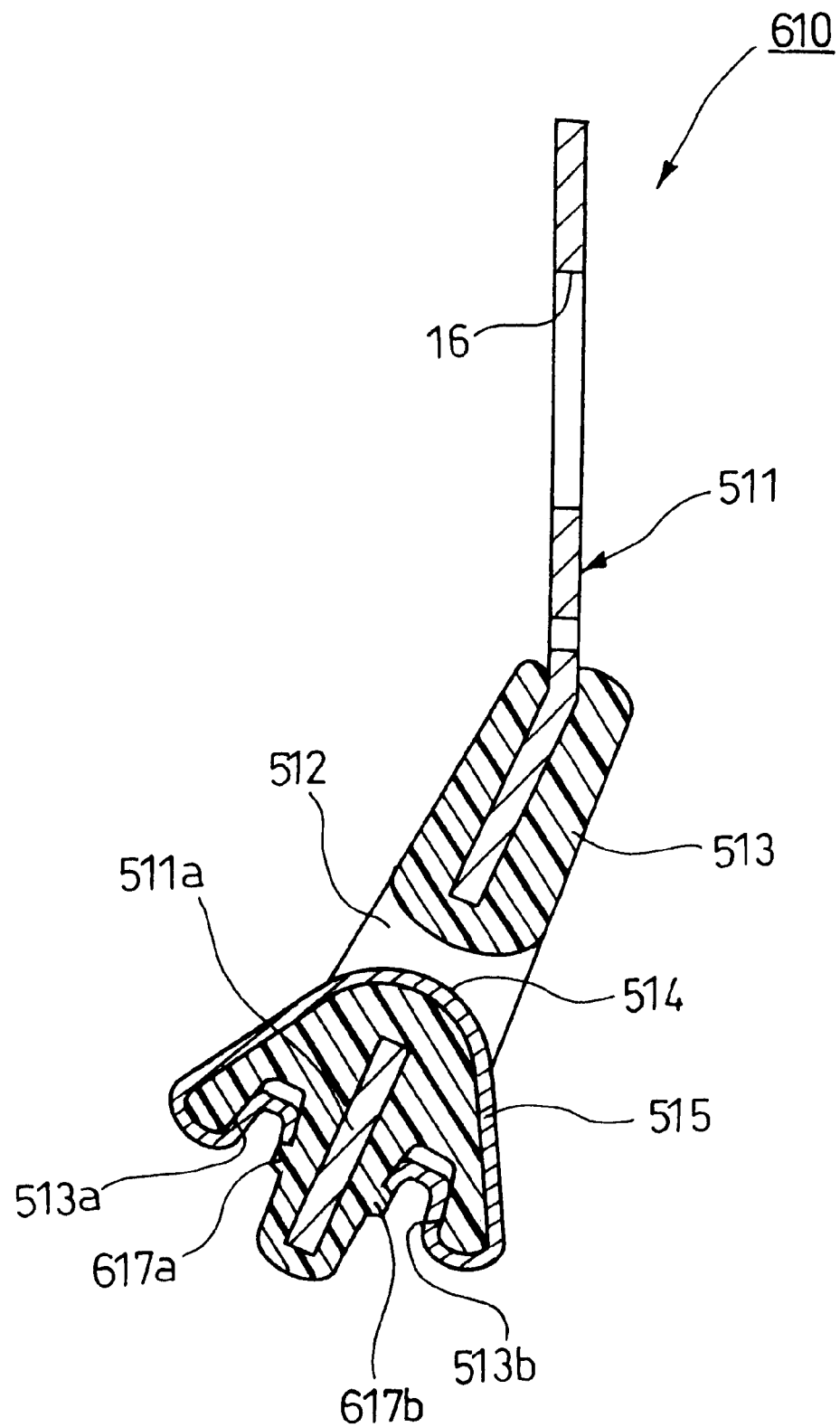
FIG. 45 is a sectional view of the through anchor of FIG. 44 as viewed in a direction indicated by arrows C.

Next, a twenty-first embodiment of the invention will be described. FIG. 44 is a front view showing a through anchor 610 according to the twenty-first embodiment of the invention, and FIG. 45 is a sectional view of the through anchor 610 of FIG. 44 as viewed in a direction indicated by arrows C.

The through anchor 610 of the twenty-first embodiment has in general substantially the same mode as that of the through anchor 510 of the twentieth embodiment, and like reference numerals to those of the through anchor 510 of the twentieth embodiment are given to like constituent components. The through anchor 610 is different from the through anchor 510 of the twentieth embodiment in projections 617a, 617b and a method for forming those projections.

Referring to FIGS. 46 to 49, a method for producing the through anchor 610 according to the twenty-first embodiment will be described below.

FIGS. 46 to 49 show a lower edge 511a of the through anchor 610 of the twenty-first embodiment, and an upper side of the through anchor 610 is omitted.

Figure 46:
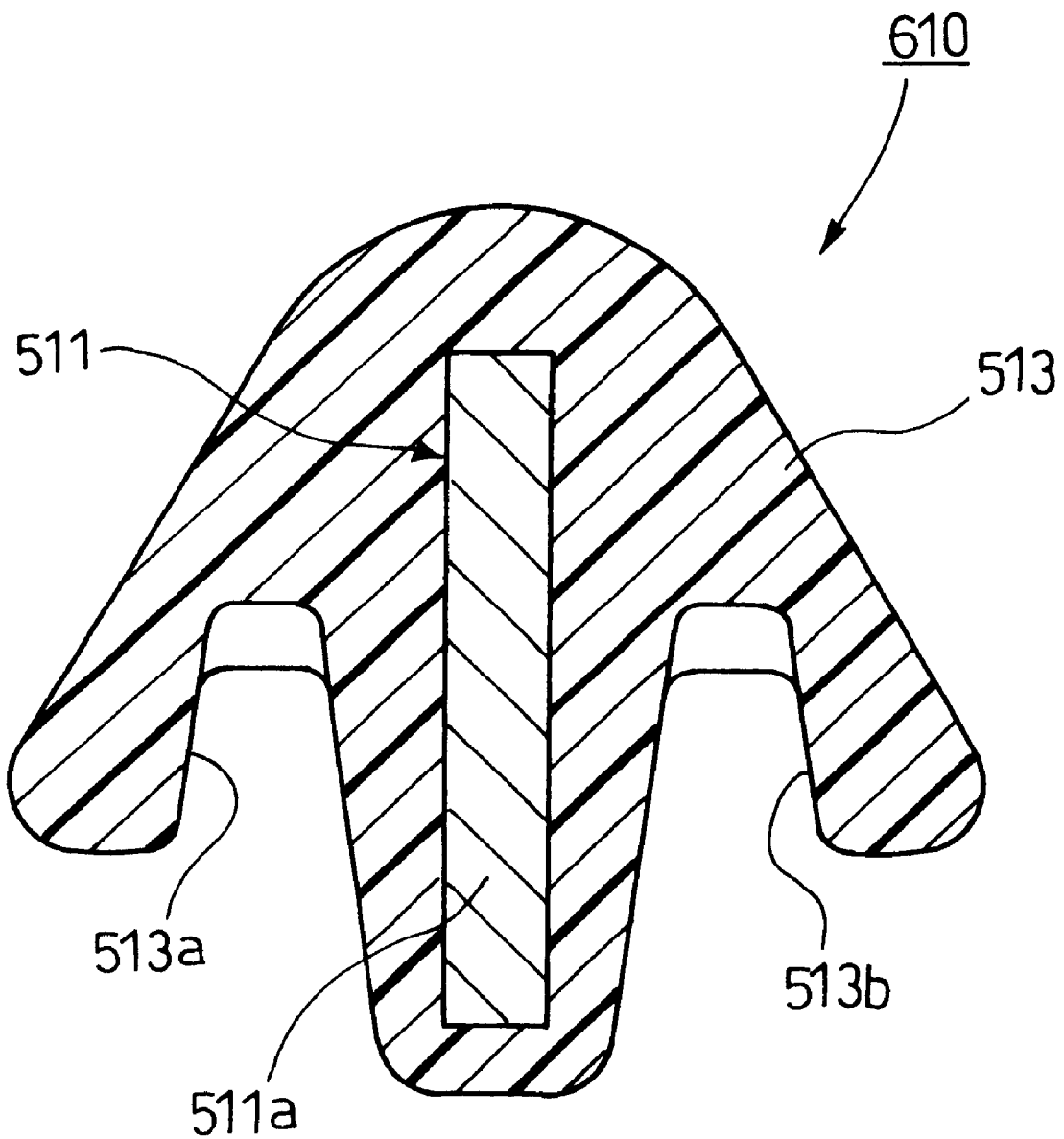
FIG. 46 is a sectional view showing a production process of a through anchor according to a twenty-first embodiment of the invention.

First, similarly to the twentieth embodiment, the periphery of a webbing pass-through opening 512 formed in the metal insert 511 is coated with the coating resin 513 in such a manner as to form a required configuration as shown in FIG. 46, and the fitting grooves 513a, 531b are formed. However, the projections 617a, 617b are not formed at this time.

Figure 47:
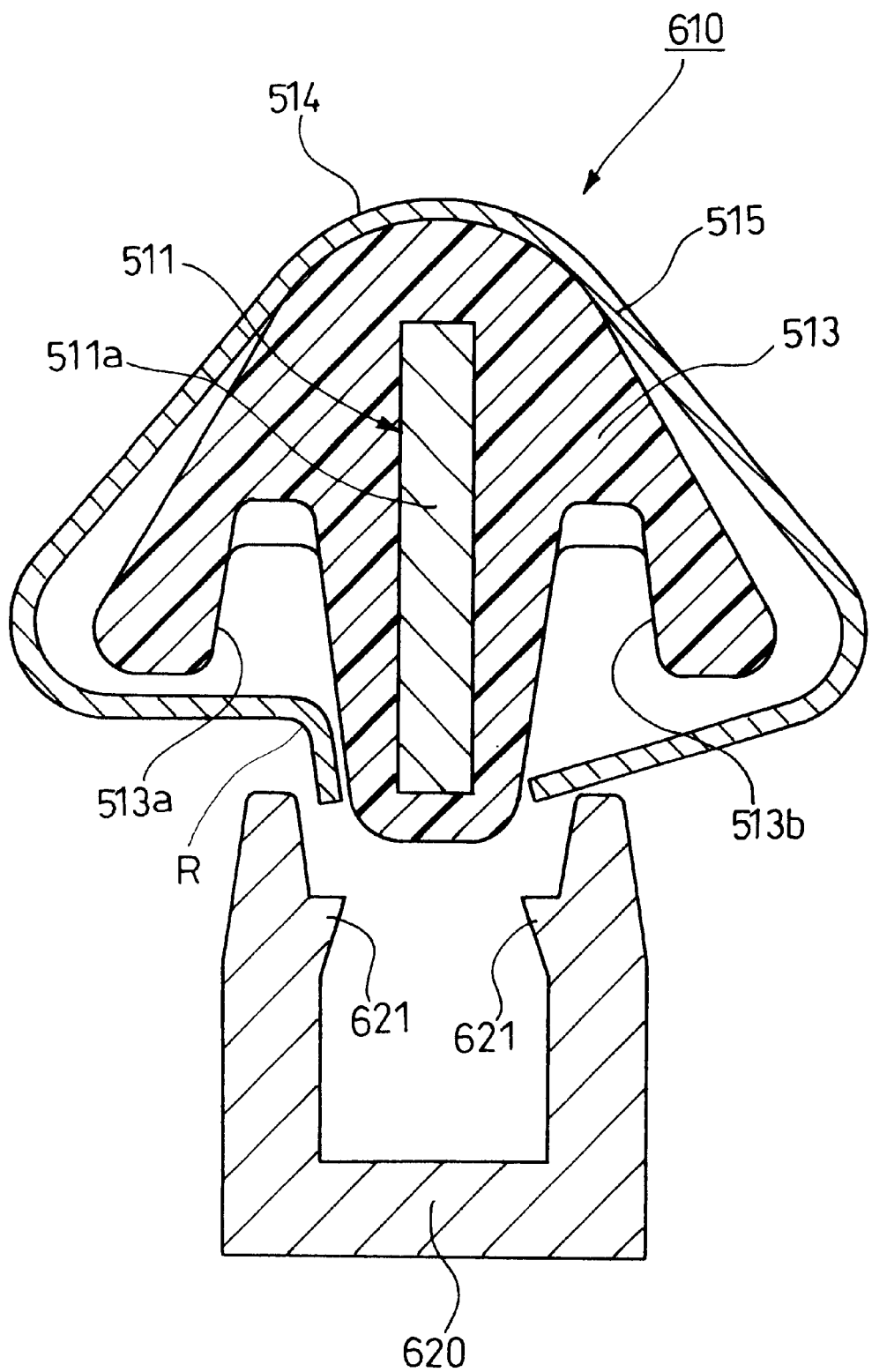
FIG. 47 is a sectional view showing the production process of the through anchor according to the twenty-first embodiment of the invention.

Next, as shown in FIG. 47, the metal plate 515 is wound around the surface of the coating resin 513, and the metal plate 515 is shaped in the vicinity of at least one of the edge portions 519a, 519b in the webbing sliding direction in such a manner as to be brought into contact with the surface of the coating resin 513 (reference sign R in FIG. 47). Furthermore, the metal plate 515 is press fitted into the fitting grooves 513a, 513b by inserting the fixture 620 into the fitting grooves 513a, 513b from a lower end to an upper end of the through anchor 510.

Figure 48:
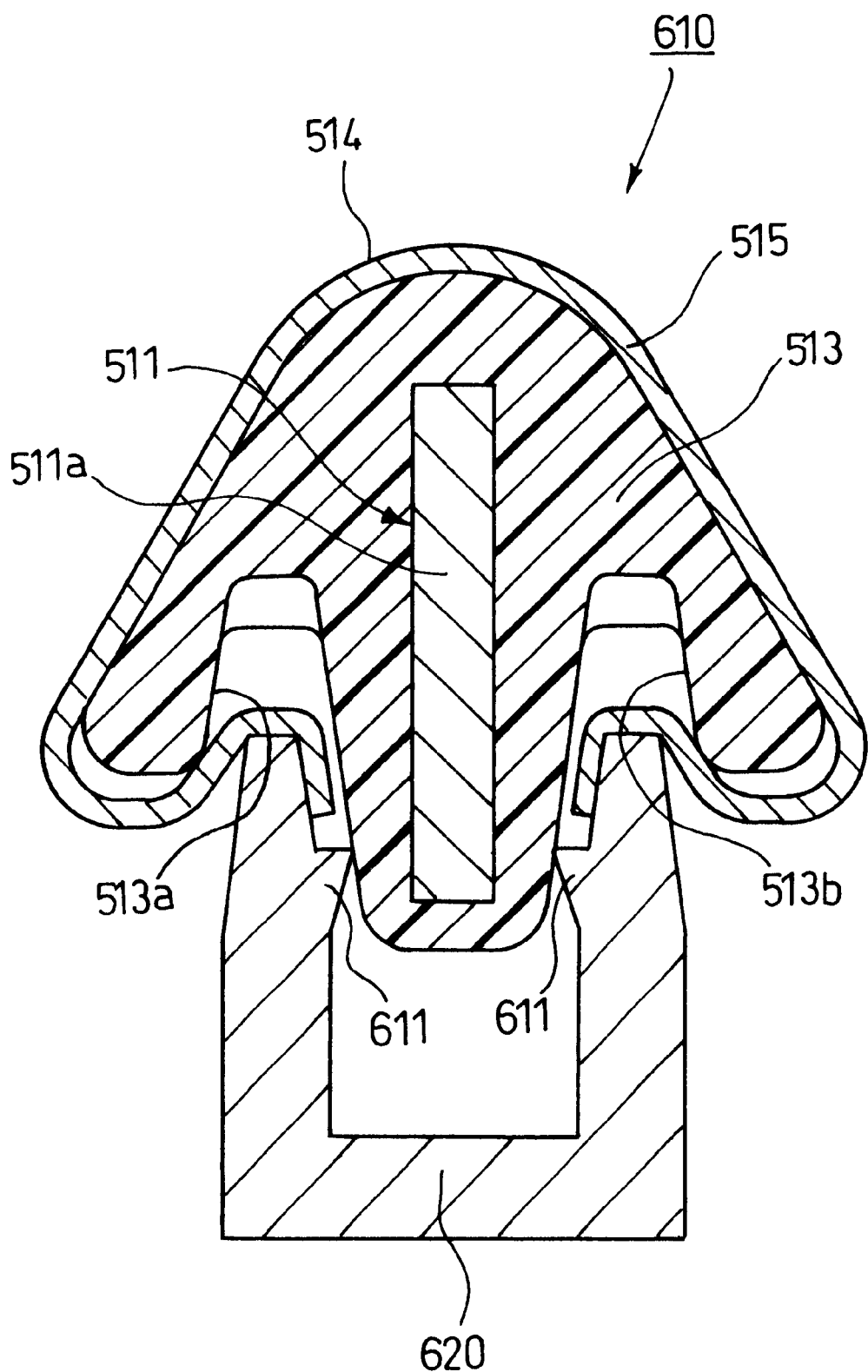
FIG. 48 is a sectional view showing the production process of the through anchor according to the twenty-first embodiment of the invention.

As the fixture 620 continues to be inserted, as with the twentieth embodiment, the metal plate 515 deforms so as to follow the surface configuration of the coating resin 513 and the surface configuration of the fixture 620. As shown in FIG. 48, the back side of the webbing sliding surface 514 of the metal plate 515 is joined to an upper surface of the coating resin 513 as shown in FIG. 48 and the edge portions 519a, 519b of the metal plate 515 deform so as to follow the surface configuration of the fixture 620, leading to a state in which the edge portions 519a, 519b fit into the fitting grooves 513a, 513b, respectively. During this process, claw portions 621 provided on the fixture 620 are brought into contact with the coating resin surface forming the fitting grooves 513a, 513b on the sides facing the metal insert.

Figure 49:
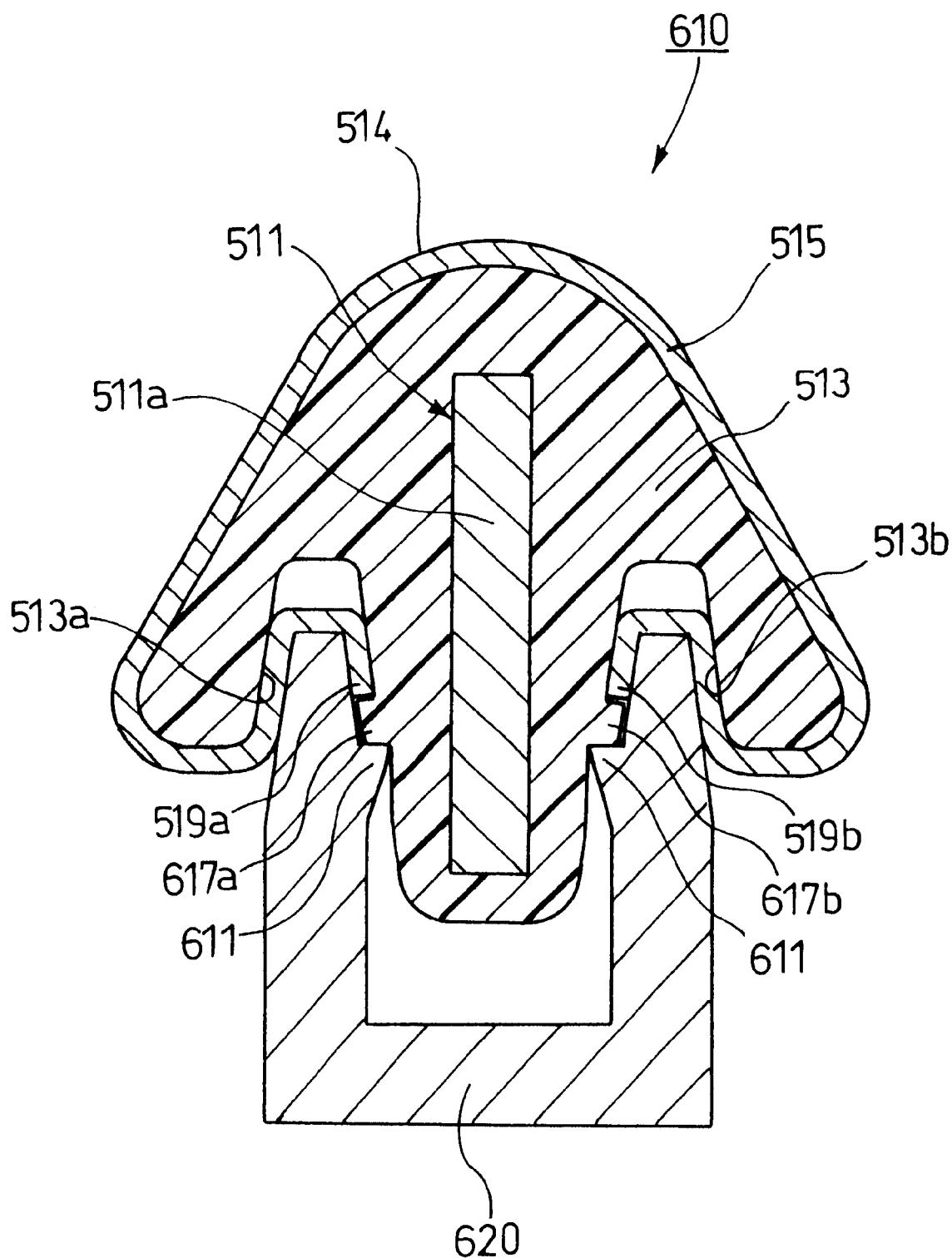
FIG. 49 is a sectional view showing the production process of the through anchor according to the twenty-first embodiment of the invention.

When the fixture 620 continues to be inserted further from the state shown in FIG. 48, as the metal plate 515 is press fitted into the fitting grooves 513a, 513b, the metal plate 515 further deforms so as to follow the surface configuration of the coating resin 513. As a result of this, as shown in FIG. 49, the metal plate 515 is completely joined to and wound around the coating resin 513. At the same time as this happens, the claws 611 of the fixture 620 build up a part of the surface of the coating resin forming the fitting grooves 513a, 513b toward the deepest side thereof on the sides of the coating resin facing the metal insert to thereby form projections 617a, 617b. Then, the edge portions 519a, 519b of the metal plate 515 are locked and held by the projections 671a, 671b.

Then, the fixture 620 is removed and therefore a state shown in FIG. 45 is produced. Thus the attachment of the metal plate 515 is completed.

According to this production method, since not only is a similar effect to that obtained with the production method according to the twentieth embodiment obtained, but also the projections 617a, 617b are formed at the same time as the metal plate 515 is attached to the coating resin 513, the production is further simplified when compared with the twentieth embodiment, and therefore the production cost can be suppressed.

Figure 50:
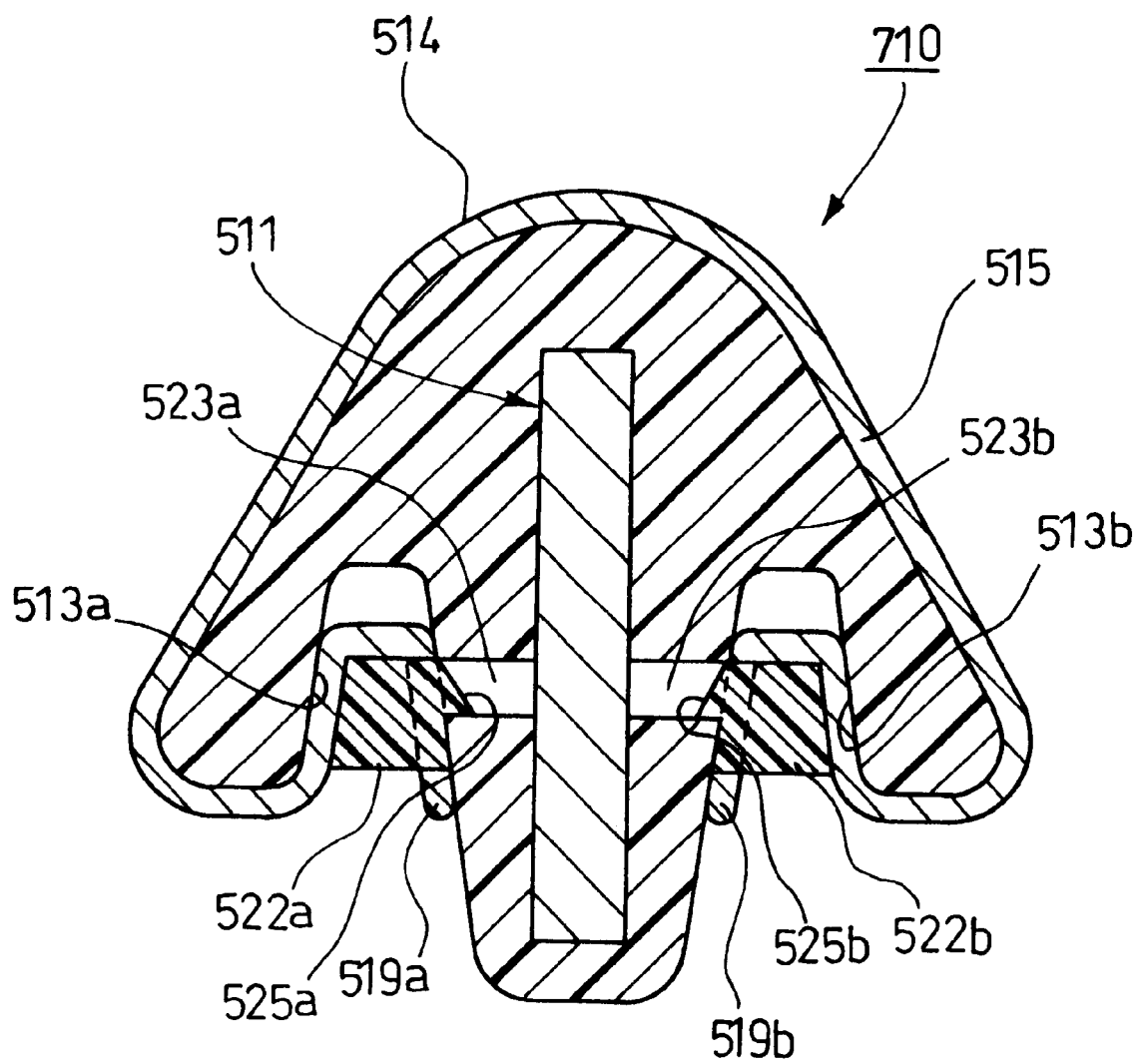
FIG. 50 is a sectional view showing a through anchor according to a twenty-second embodiment of the invention.

Next, a twenty-second embodiment of the invention will be described. FIG. 50 shows a sectional view of a through anchor 710 according to the twenty-second embodiment of the invention. The through anchor 710 is similar to the through anchors 410, 510, 610 of the nineteenth to twenty-first embodiments except for the lower edge 511a thereof, and therefore a drawing therefor is omitted. FIG. 50 shows the lower edge 511a of the through anchor 710 of the twenty-second embodiment, and an upper side of the through anchor 710 is omitted. Like reference numerals to those given to the through anchors 510, 610 of the twentieth and twenty-first embodiments are given to like constituent components to those of the twentieth and twenty-first embodiments.

Similarly with those of the twentieth and twenty-first embodiments, the through anchor 710 is covered with the coating resin 513 around the periphery of the webbing pass-through opening 512 formed in the metal insert 511 in such a manner as to form a required configuration as shown in FIG. 50. The fitting grooves 513a, 513b are formed in positions on the under side of the external surface of the coating resin 513 molded around the lower edge 511a of the webbing pass-through opening 512. Moreover, locking grooves 523a, 523b are formed extending from the fitting grooves 513a, 513b toward the insert member 511, respectively.

Similarly with the twentieth and twenty-first embodiments, the metal plate 515 is press fitted into the fitting grooves 513a, 513b, whereby the metal plate 515 is completely joined to and wound around the coating resin 513. In the fitting grooves 513a, 513b, fixtures 522a, 522b comprising a synthetic resin are press fitted thereinto in such a manner as to hold the metal plate 515 therebetween. Claw portions 525a, 525b of the fixtures 522a, 522b engage in locking grooves 523a, 523b on sides of widthwise ends of the metal plate 515. Since this firmly fixes the metal plate 515 relative to the coating resin 513, for example, even when a great magnitude of load is applied thereto in conjunction with the sliding of the webbing, the dislocation of the metal plate 515 can be prevented. It is desirable to fasten the fixtures 522a, 522b after the metal plate 515 is press fitted.

In this embodiment, while the fixtures 522a, 522b are formed from a synthetic resin, they may be formed of metal. Alternatively, they may be formed integrally rather than separately.

Figure 51:
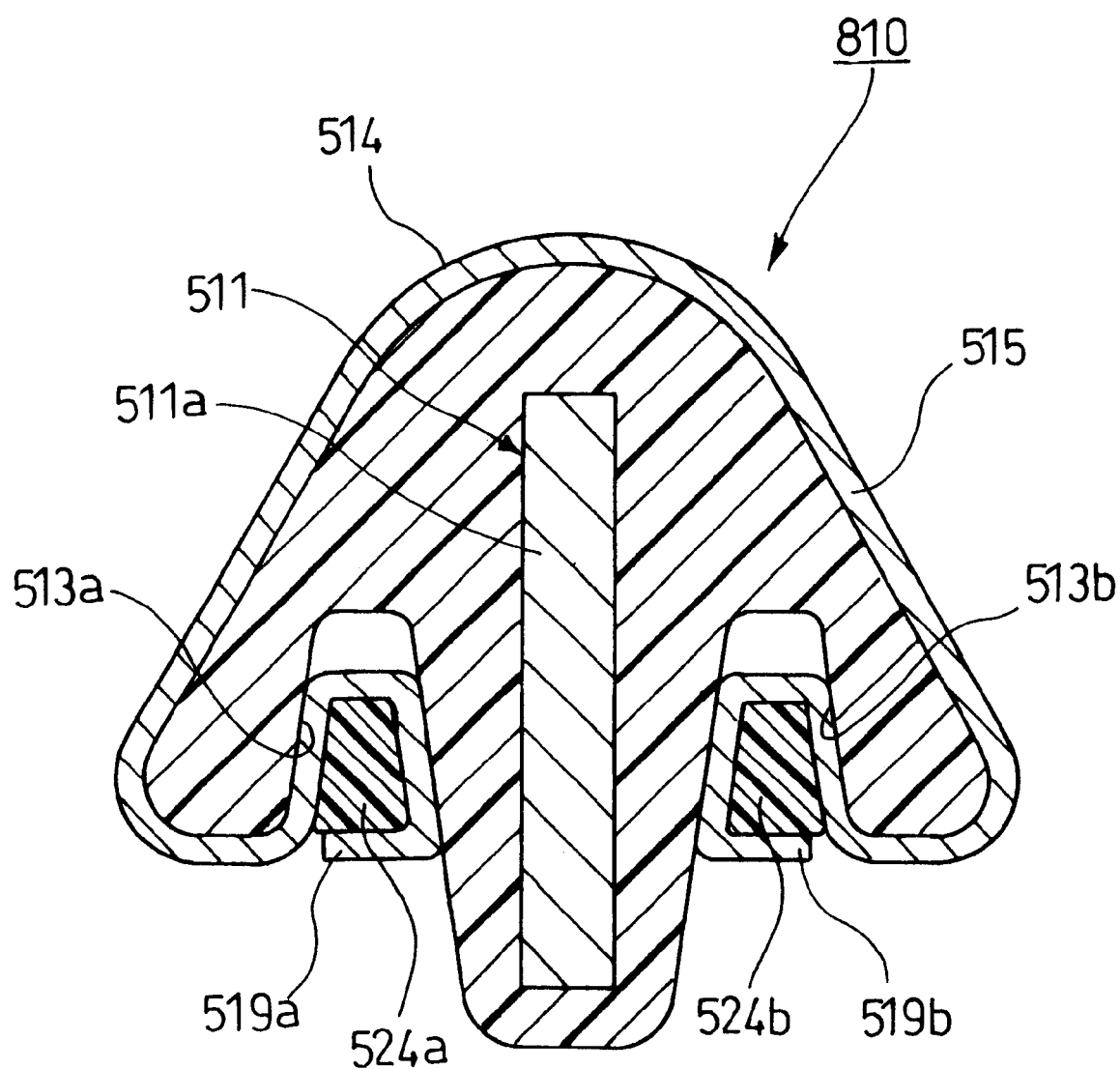
FIG. 51 is a sectional view showing a through anchor according to a twenty-third embodiment of the invention.
Figure 52:
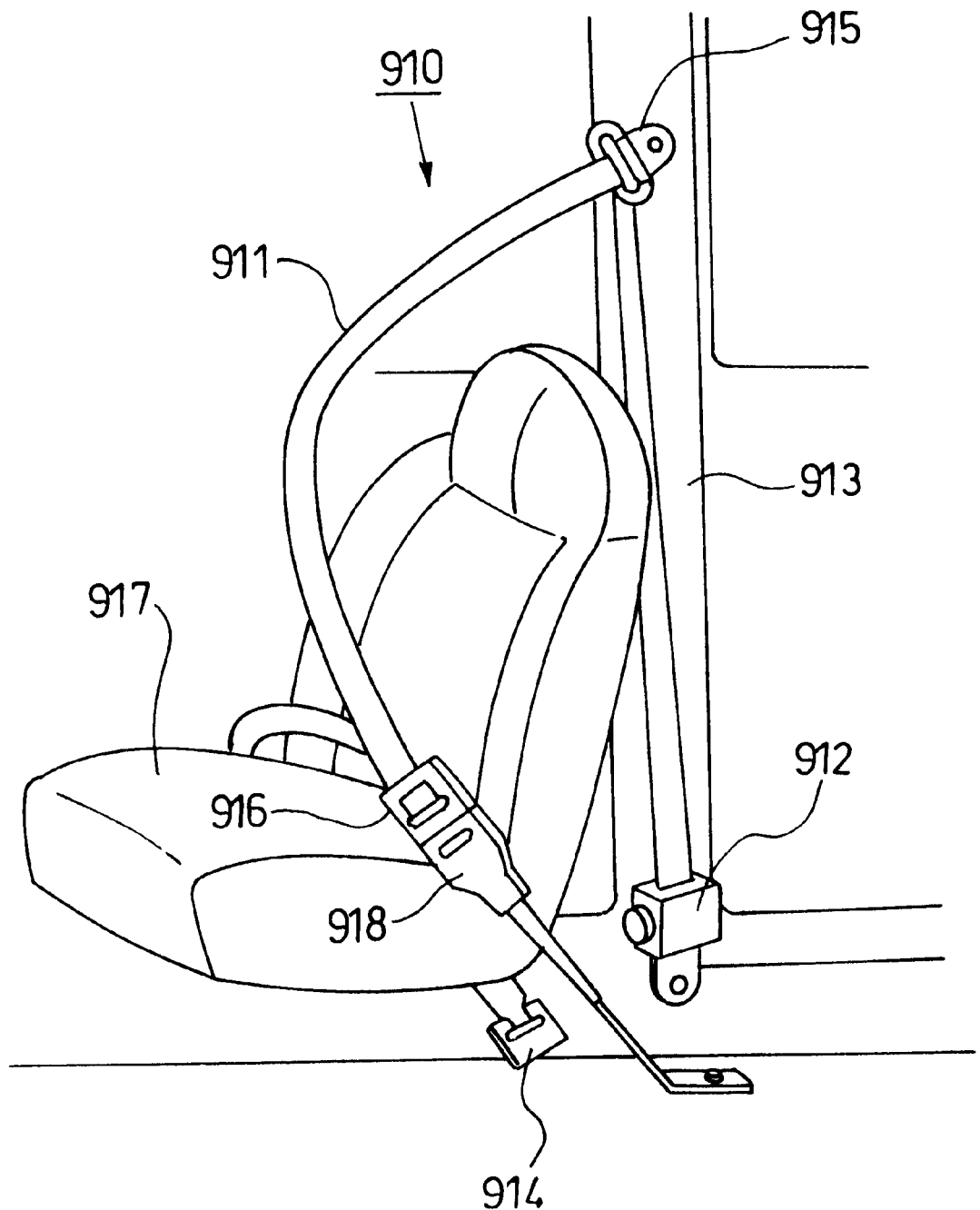
FIG. 52 is a perspective view showing a conventional seat belt assembly.
Figure 53:
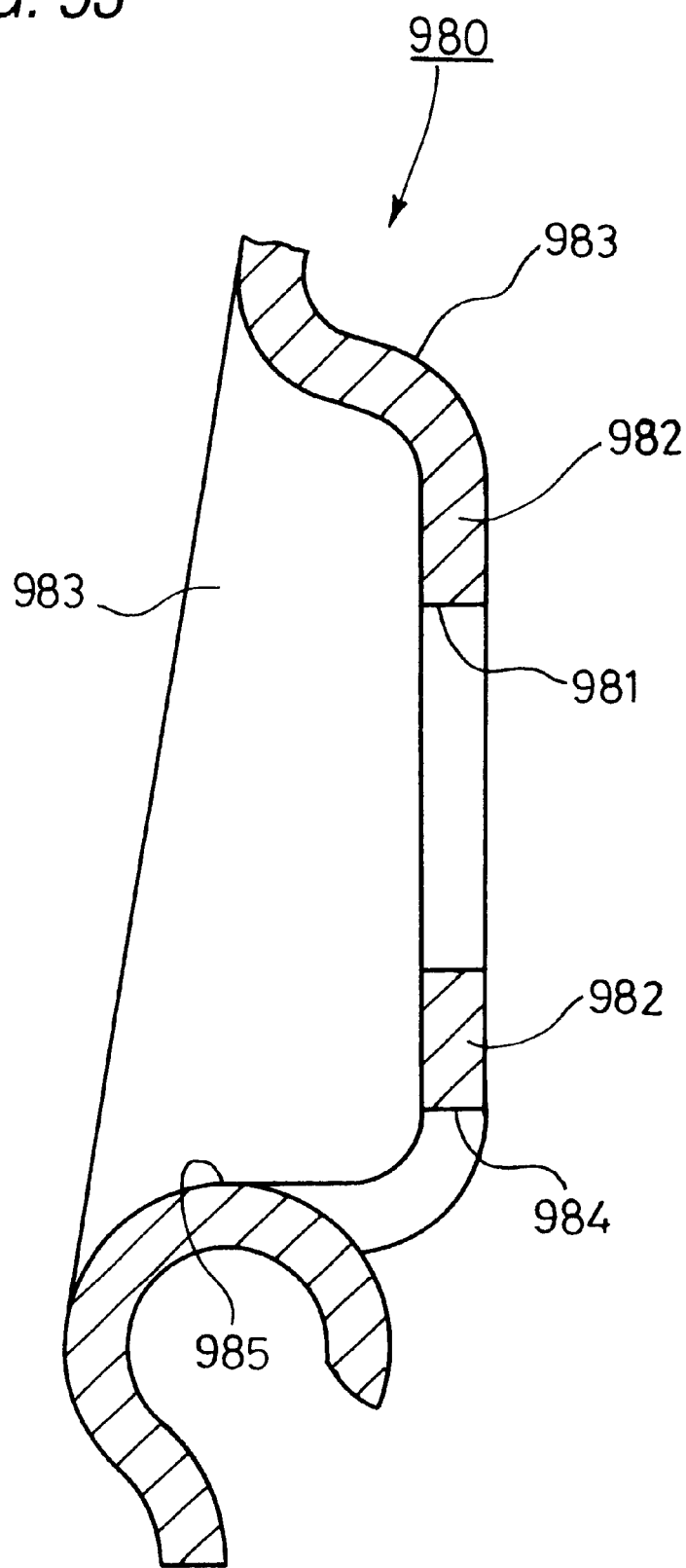
FIG. 53 is a sectional view showing one example of a conventional through anchor.

Next, a twenty-third embodiment of the invention will be described. FIG. 51 shows a sectional view of a through anchor 810 according to the twenty-second embodiment of the invention. The through anchor 810 is similar to the through anchors 410, 510, 610, 710 of the nineteenth to twenty-second embodiments except for the lower edge 511a thereof, and therefore a drawing therefor is omitted. FIG. 51 shows the lower edge 511a of the through anchor 810 of the twenty-third embodiment, and an upper side of the through anchor 810 is omitted. Like reference numerals to those given to the through anchors 510, 610, 710 of the twentieth to twenty-second embodiments are given to like constituent components to those of the twentieth to twenty-second embodiments.

Similarly with those of the twentieth to twenty-second embodiments, the through anchor 810 is covered with the coating resin 513 around the periphery of the webbing pass-through opening 512 formed in the metal insert 511 in such a manner as to form a required configuration as shown in FIG. 51. The fitting grooves 513a, 513b are formed in positions on the under side of the external surface of the coating resin 513 molded around the lower edge 511a of the webbing pass-through opening 512.

Similarly with the twentieth to twenty-second embodiments, the metal plate 515 is press fitted into the fitting grooves 513a, 513b, whereby the metal plate 515 is completely joined to and wound around the coating resin 513. In the fitting grooves 513a, 513b, resin rods 524a, 524b comprising a synthetic resin are press fitted into the metal plate 515, respectively. Then, the metal plate 515 is bent in the vicinity of the edge portions 519a, 519b in such a manner that the surface thereof comes into contact with the bottoms of the resin rods 524a, 524b, respectively, whereby these resin rods 524a, 524b are held by the metal plate 515. Therefore, the metal plate 515 is attached such that it is joined to the coating resin 513 by means of the resin rods 524a, 524b and the resin rods 524a, 524b are held by the edge portions 519a, 519b in the vicinity thereof, whereby the metal plate 515 is firmly fixed to the coating resin 513. Thus, even if a large magnitude of load is applied thereto as the webbing slides, the dislocation of the metal plate 515 is prevented. In addition, when the metal plate 515 is bent in the vicinity of the edge portions 519a, 519b, it is desirable that the edge portions 519a, 519b of the metal plate 515 are pressed upwardly as viewed in FIG. 51 so that the resin rods 524a, 524b are press fitted in further.

In addition, similarly with the nineteenth embodiment, the twentieth to twenty-third embodiments can easily be applied to the molded-type through anchor which currently constitutes the main stream of through anchors, and while good retractability and durability of the webbing can be obtained by constituting the webbing sliding contact surface 514 composed of the metal surface, configurations that can be obtained may easily be changed by changing the shapes of the coating resin 513 and the metal plate 515. Thus, this serves to eliminate any limitation to obtainable configurations, and therefore the production thereof can be made simple, this reducing the costs.

Thus, according to the present invention, at least a part of the webbing guide where the webbing is brought into sliding contact is the metal surface.

Therefore, while the cost can be reduced with the simple construction, it is possible to secure the superior sliding contact between the webbing guide and the webbing, whereby the good operability and superior durability of the webbing can be secured.

In addition, according to the present invention, at least a part of the webbing guide where the webbing is brought into sliding contact is the plated metal surface or the stainless steel surface.

Therefore, while the cost can be reduced with the simple construction, it is possible to secure the good sliding contact between the webbing guide and the webbing.

Furthermore, according to the present invention, the webbing guide is constructed by insert molding the metal insert with the coating resin, and the plated resin cover is fitted over the portion of the coating resin where the webbing is brought into sliding contact, whereby the surface of the resin cover constitutes the webbing sliding contact surface.

Consequently, since the adhesion of foreign particles thereto is prevented by the plating applied to the resin cover, the deterioration with age in sliding contact with the webbing is reduced, whereby the good sliding contact can be maintained.

Moreover, in the through anchor of the seat belt assembly according to the present invention, the metal plate is inserted into the webbing pass-through opening in the metal insert in the webbing pass-through direction and is caused to follow the external surface configuration of the coating resin molded around the lower edge of the webbing pass-through opening. The edge portions thereof in the webbing pass-through direction are fitted in the respective fitting grooves in the coating resin so as to be fixed to the external surface of the coating resin, whereby the webbing sliding contact surface is constituted by the external surface of the metal plate.

Consequently, while the good retractability and durability of the webbing can be obtained, there is no limitation imposed onto its configurations that can be obtained, whereby the production can be made simple, thus the cost reduction being aimed at.

In addition, the method for producing a through anchor according to the present invention comprises the steps of coating the periphery of a webbing pass-through opening formed in a metal insert with a coating resin and forming a pair of fitting grooves in predetermined positions on an external surface of the coating resin, thereafter inserting a metal plate in the webbing pass-through opening in the metal insert along a direction in which webbing is allowed to pass through the opening and causing the metal plate to fit to an external surface configuration of the coating resin on the periphery of a lower edge portion of the webbing pass-through opening, and fitting the edge portions of the metal plate in the webbing pass-through direction in the respective fitting grooves so that the metal plate is secured to the external surface of the coating resin.

Thus, while the good retractability and durability of the webbing can be obtained, there is no limitation imposed onto its configurations that can be obtained, whereby the production of through anchors can be made simple, thus the cost reduction being aimed at.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A seat belt assembly comprising:
   a webbing for restraining a body of an occupant in a seat, and
   a webbing guide for guiding a movement of said webbing in its longitudinal direction,
   wherein said webbing guide includes
      a metal insert having an opening through which said webbing passes,
      an insert molded resin portion integrally provided with said metal insert, and
      a metal material portion secured relative to at least one of said metal insert and said insert molded resin portion, said metal material portion having a portion across said opening, said metal material portion having a sliding metal surface with which said webbing is brought in slide contact.

2. The seat belt assembly according to claim 1, wherein said insert molded resin portion has at least one engaging groove portion formed in its outer surface, and said metal material portion has at least one engaged portion which is engaged with said engaging groove portion.

3. The seat belt assembly according to claim 2, wherein said metal material portion comprises
   an arc-shaped portion on which said sliding metal surface is formed, and
   a fitting portion adapted to be fitted on or adjacent to said lower edge portion of said opening.

4. The seat belt assembly according to claim 3, wherein said metal material portion comprises a metal plate, said arc-shaped portion is formed on an intermediate portion of said metal plate, and said fitting portion is formed on each of both end portions of said metal plate.

5. The seat belt assembly according to claim 1, wherein said metal material portion comprises a metal sheet which is mounted on at least part of the perimeter of said insert molded resin portion.

6. The seat belt assembly according to claim 5, wherein an raised portion is formed on the lower edge portion of said metal insert so as to brought in abutment with said metal sheet.

7. The seat belt assembly according to claim 5, wherein said metal sheet has an arc-shaped portion on which said sliding metal surface is formed, and fitting portions adapted to be fitted to each other, and wherein said arc-shaped portion is formed on an intermediate portion of said metal sheet, and said fitting portion is formed on each of both end portions of said metal sheet.

8. The seat belt assembly according to claim 7, further comprising:

a cover attachable to said metal sheet for covering said fitting portions which are formed on each of both end portions of said metal sheet.

9. The seat belt assembly according to claim 5, wherein said metal sheet is made of a shape memory alloy which matches a configuration of said insert molded resin portion.

10. The seat belt assembly according to claim 1, wherein said sliding metal surface is formed by plating said insert metal.

11. The seat belt assembly according to claim 1, wherein said insert metal is made of a stainless steel.

12. The seat belt assembly according to claim 1, wherein said metal material portion comprises a metal plate having an arc shaped portion on which said sliding metal surface is formed, said arc-shaped portion is formed on an intermediate portion of said metal plate, and said metal plate has a fitting portion that is formed on each of both end portions of said metal plate.

13. The seat belt assembly according to claim 1, wherein said insert mold resin portion has a pair of engaging groove portions formed in its outer surface, and said metal material portion has a pair of engaged portions which are respectively engaged with said pair of engaging groove portions.

14. The seat belt assembly according to claim 13, wherein a projection for preventing said metal material portion from disengaging from said insert molded resin portion is formed in the inner surface of each of said pair of engaging groove portions.

15. The seat belt assembly according to claim 13, wherein said webbing guide further includes fixtures for preventing disengagement of said metal material portion from said molded resin portion, the fixtures being pressed fitted into said respective engaging groove portions.

16. A method for producing a through anchor having a webbing sliding contact surface constituted by a metal surface, comprising the steps of:

coating a periphery of a webbing pass-through opening formed in a metal insert with a coating resin so as to form a coating resin portion integrally formed with said metal insert;

forming a pair of fitting grooves in an external surface of said coating resin portion;

thereafter inserting a metal plate in said webbing pass-through opening along a direction in which a webbing is allowed to pass through said opening;

causing said metal plate to fit to an external surface configuration at a portion of said coating resin portion which is located on the periphery of a lower edge portion of said webbing pass-through opening; and fitting edge portions of said metal plate in the webbing pass-through direction into said respective fitting grooves so as to secure said metal plate to the external surface of said coating resin portion.

* * * * *